(12) United States Patent
Mizuno et al.

(10) Patent No.: US 8,170,792 B2
(45) Date of Patent: May 1, 2012

(54) VEHICLE CONTROL DEVICE

(75) Inventors: Akira Mizuno, Tokyo (JP); Hisanori Shirai, Tokyo (JP); Munehisa Horiguchi, Tokyo (JP); Fumihiko Sakakibara, Tokyo (JP); Minoru Abe, Tokyo (JP); Takashi Naito, Tokyo (JP); Masao Ando, Tokyo (JP)

(73) Assignee: Equos Research Co., Ltd. (JP)

( * ) Notice: Subject to any disclaimer, the term of this patent is extended or adjusted under 35 U.S.C. 154(b) by 379 days.

(21) Appl. No.: 12/518,449

(22) PCT Filed: Dec. 18, 2007

(86) PCT No.: PCT/JP2007/074342
§ 371 (c)(1),
(2), (4) Date: Jun. 10, 2009

(87) PCT Pub. No.: WO2008/078612
PCT Pub. Date: Jul. 3, 2008

(65) Prior Publication Data
US 2010/0023213 A1 Jan. 28, 2010

(30) Foreign Application Priority Data

Dec. 22, 2006 (JP) .................................. 2006-346788
Mar. 30, 2007 (JP) .................................. 2007-094825

(51) Int. Cl.
*G01C 21/00* (2006.01)
(52) U.S. Cl. ........................................................ 701/409
(58) Field of Classification Search .................... 701/37, 701/41, 91, 116–119, 201, 208–209, 409
See application file for complete search history.

(56) References Cited

U.S. PATENT DOCUMENTS

| 4,752,079 A | 6/1988 | Fahrner | 280/112 |
| 6,347,802 B1 * | 2/2002 | Mackle et al. | 280/5.521 |
| 6,763,288 B2 | 7/2004 | Caretta et al. | 701/1 |

FOREIGN PATENT DOCUMENTS

| JP | 47-44599 | 12/1972 |
| JP | 02-185802 | 7/1990 |
| JP | 11-034629 | 2/1999 |
| JP | 2000-322695 | 11/2000 |
| JP | 2005-047316 | 2/2005 |

* cited by examiner

*Primary Examiner* — Kim T Nguyen
(74) *Attorney, Agent, or Firm* — Bacon and Thomas, PLLC

(57) ABSTRACT

A vehicle control device which can at least provide compatibility between a high grip performance and fuel efficiency or compatibility between quietness and fuel efficiency is provided. When a camber angle of a wheel 2 is adjusted to a negative camber, ground contact in a first tread 21 is increased and ground contact in a second tread 22 is decreased. Accordingly, the high grip performance or the quietness is provided. On the other hand, when the camber angle of the wheel 2 is adjusted to a positive camber, the ground contact in the first tread 21 is decreased and the ground contact in the second tread 22 is increased. Accordingly, a rolling resistance becomes low, and fuel saving is achieved. In this manner, by adjusting the camber angle of the wheel 2, the compatibility can be provided between conflicting performances of the high grip performance or the quietness and the fuel saving.

3 Claims, 27 Drawing Sheets

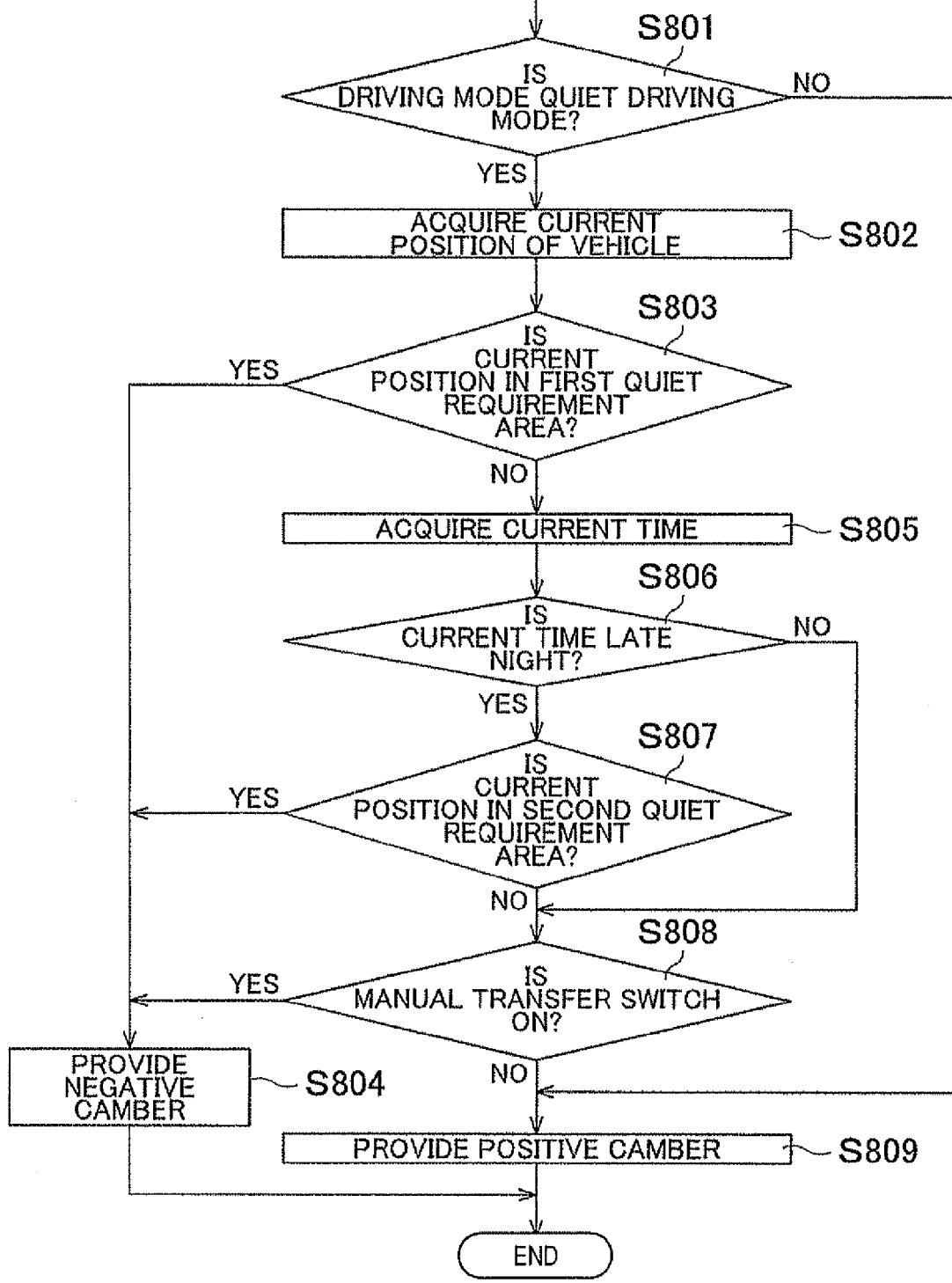

VEHICLE CONTROL DEVICE

TECHNICAL FIELD

The present invention relates to a vehicle control device which activates a camber angle adjustment device to control a camber angle of a wheel for a vehicle including the wheel and the camber angle adjustment device which adjusts the camber angle of the wheel, and particularly relates to a vehicle control device which can at least provide compatibility between high grip performance and fuel efficiency or compatibility between quietness and fuel efficiency.

BACKGROUND ART

Attempts have been made to sufficiently bring out the capability of a tire to improve the turning performance by providing a large camber angle (angle formed by the center line of a tire and the ground) of a wheel in a minus direction. This is because, when the camber angle is set to 0° for example, a tread contacts the ground in the entire region in the width direction during a straight-ahead driving, while the tread on the inside is caused to float from the ground by the inclination of the vehicle due to the centrifugal force at the time of turning such that a sufficient turning performance cannot be obtained. Thus, by providing the camber angle in the minus direction in advance, the tread can contact the ground in a large width at the time of turning, and the turning performance can be improved.

However, although the turning performance of the tire is improved when the wheel is mounted to the vehicle at a large camber angle in the minus direction, the ground pressure on a tread end portion on the inside during the straight-ahead driving is increased, and there has been a problem that the tire is worn uneconomically and the temperature in the tread end portion increases.

Thus, Japanese Patent Application Publication No. JP-A-2-185802 discloses technology of providing high rigidity by reinforcing a side portion on one side of a tire to be stronger than a side portion on the other side, and ensuring wear resistance, heat resistance, and high grip performance by dividing tread rubber into two such that the hardness is lower on one side than the other side or increasing the tread thickness in a tread end portion, in the case where a wheel is mounted to a vehicle at a large camber angle in a minus direction (Patent Document 1).

Also, U.S. Pat. No. 6,347,802 B1 discloses a suspension system which performs an active control of a camber angle of a wheel by the driving force of an actuator (Patent Document 2).

Patent Document 1: Japanese Patent Application Publication No, JP-A-2-185802

Patent Document 2: U.S. Pat. No. 6,347,802 B1

DISCLOSURE OF THE INVENTION

Problem to be Solved by the Invention

However, in the former technology, there has been a problem that the compatibility between high grip performance and fuel efficiency (low rolling resistance) has been insufficient, although sufficient performance can be obtained in maintaining the high grip performance at the time of turning. In the related-art technology described above, the high grip performance can be obtained only at the time of turning, and there has been a problem that the high grip performance cannot be sufficiently obtained at a sudden acceleration or a sudden brake during the straight-ahead driving, for example. In the same manner, in the latter technology, there has been a problem that the compatibility between the high grip performance and fuel efficiency is insufficient.

On a tread surface of a tire, a tread pattern configured of a plurality of grooves is carved in consideration of drainage performance. When a vehicle is driven, a block (portion encompassed by the groove) on the tread surface hits the road surface every time the tire rotates to cause impact noise (tire noise).

In this case, a low rolling resistance can be obtained by increasing rubber hardness of the tread. However, a reaction force applied to the block from the road surface increases to raise the noise level of the impact noise (tire noise). Therefore, in reducing the tire noise during driving, the rubber hardness of the tread is preferably made low (soft) so that the impact of hitting the road surface is mitigated.

However, although high grip performance can be obtained in the case where the rubber hardness of the tread is made low, an increase in the rotational resistance correspondingly leads to less fuel efficiency. That is, in the related art, there has been a problem that providing compatibility between quietness achieved by suppressing the tire noise during driving and fuel efficiency is difficult.

In order to solve the problem described above, it is an object of the present invention to provide a vehicle control device which can at least provide compatibility between high grip performance and fuel efficiency or compatibility between quietness and fuel efficiency.

Means for Solving the Problem

In order to achieve the object, a vehicle control device according to claim 1 activates a camber angle adjustment device which adjusts a camber angle of a wheel to control the camber angle of the wheel for a vehicle including the wheel and the camber angle adjustment device, and includes activation control means which controls an activation state of the camber angle adjustment device. The wheel includes a first tread and a second tread aligned in a width direction of the wheel with respect to the first tread and arranged on an inside or an outside of the vehicle. The first tread and the second tread are configured to have characteristics different from each other such that the first tread is configured to have a characteristic of a higher grip force compared to the second tread and the second tread is configured to have a characteristic of a smaller rolling resistance compared to the first tread. The activation control means includes: vicinity information acquisition means which acquires vicinity information on a vicinity of the vehicle; characteristic determination means which determines a characteristic necessary for the wheel based on the vicinity information acquired by the vicinity information acquisition means, and camber angle change means which activates the camber angle adjustment device to change the camber angle of the wheel such that the wheel exhibits the characteristic determined by the characteristic determination means.

A vehicle control device according to claim 2 is the vehicle control device according to claim 1 in which the vicinity information acquisition means includes: current position detection means which detects the current position of the vehicle; map data storage means which stores map data; and situation acquisition means which acquires a situation of a route that the vehicle is to follow as the vicinity information based on the map data stored in the map data storage means and the current position of the vehicle detected by the current position detection means. The characteristic determination means determines the characteristic necessary for the wheel based on the situation of the route to follow acquired as the vicinity information by the situation acquisition means.

A vehicle control device according to claim 3 is the vehicle control device according to claim 1 or 2 in which the vicinity information acquisition means includes relative position acquisition means which acquires a relative positional relation of the vehicle and another vehicle in question as the vicinity information. The characteristic determination means determines the characteristic necessary for the wheel based on the relative positional relation with the vehicle in question acquired as the vicinity information by the relative position acquisition means.

A vehicle control device according to claim 4 is the vehicle control device according to claim 1 or 2 in which the activation control means includes time acquisition means which acquires time, and the characteristic determination means determines the characteristic necessary for the wheel based on the time acquired by the time acquisition means and the vicinity information acquired by the situation acquisition means.

Effects Of The Invention

With the vehicle control device according to claim 1, when the activation control means performs the activation control of the camber angle adjustment device and the camber angle of the wheel is adjusted in the minus direction (negative camber direction), the ground contact (ground pressure or ground contact area) in the tread arranged on the inside of the vehicle (first tread or second tread) is increased while the ground contact (ground pressure or ground contact area) in the tread arranged on the outside of the vehicle (second tread or first tread) is decreased.

On the other hand, when the camber angle of the wheel is adjusted in the plus direction (positive camber direction), the ground contact (ground pressure or ground contact area) in the tread arranged on the inside of the vehicle (first tread or second tread) is decreased while the ground contact (ground pressure or ground contact area) in the tread arranged on the outside of the vehicle (second tread or first tread) is increased.

In this manner, with the vehicle control device according to the present invention, the ratio of the ground contact in the first tread of the wheel and the ground contact in the second tread of the wheel (including a state where only one tread contacts the ground and the other tread does not contact the road surface) can be changed in an arbitrary timing by controlling the activation state of the camber angle adjustment device by the activation control means to adjust the camber angle of the wheel. Thus, there is an effect that the compatibility can be provided between two performances one of which is obtained by the characteristic of the first tread and the other of which is obtained by the characteristic of the second tread.

With the vehicle control device according to the present invention, there is an effect that the compatibility can be provided between two performances of driving performance (for example, turning performance, acceleration performance, brake performance, or driving stability in the rain or on a snow road) and fuel saving performance or (and) two performances of quietness and fuel efficiency by adjusting the camber angle of the wheel to change the ratio of the ground contact in the first tread and the ground contact in the second tread (including the state where only one tread contacts the ground and the other tread does not contact the road surface), since the first tread is configured to have the characteristic of the higher grip force (characteristic of lower rubber hardness) compared to the second tread and the second tread is configured to have the characteristic of the smaller rolling resistance (characteristic of higher rubber hardness) compared to the first tread.

It has been impossible to achieve the compatibility between the two performances which conflict with each other in this manner in a vehicle of the related art, and changing between two types of tires corresponding to the respective performances has been necessary. In the present invention, it has become achievable for the first time by a configuration in which the camber angle of the wheel having the first and second treads is adjusted by the control of the activation state of the camber angle adjustment device by the activation control means. Accordingly, the compatibility between the two performances which conflict with each other can be achieved.

With the vehicle control device according to the present invention, since the tread configured to have the characteristic of the high grip force is arranged on the inside of the vehicle as the first tread, the wheel can be brought to a state where the negative camber is provided in the case where the first tread is used. Thus, there is an effect that the turning performance can further be improved as a result.

With the configuration in which the tread configured to have the characteristic of the high grip force is arranged on the inside of the vehicle as the first tread, the right and left wheels can be brought to a state where the negative camber is provided in the case where the first tread is used. Thus, there is an effect that the turning performance can further be improved correspondingly.

With the configuration in which the first tread is arranged on both sides (both sides in the width direction of the wheel) of the second tread, the right and left wheels can be brought to a state where the camber angle is provided in a direction to cause inclination to the inward side of the turn in the case where the first tread is used. Thus, there is an effect that the turning performance can further be improved correspondingly.

Since the vehicle control device according to the present invention has a configuration in which the vicinity information acquisition means which acquires the vicinity information on the vicinity of the vehicle is provided, the characteristic determination means determines the characteristic necessary for the wheel based on the vicinity information acquired by the vicinity information acquisition means, and the camber angle change means activates the camber angle adjustment device to change the camber angle of the wheel such that the wheel exhibits the characteristic determined by the determination means, the control (adjustment of the camber angle of the wheel) according to the situation in the vicinity of the vehicle can be performed.

Accordingly, for example, by increasing the influence of the high grip characteristic of the first tread to ensure the driving performance in a situation where the driving performance of the vehicle is necessary and increasing the influence of the low rolling characteristic of the second tread to ensure the fuel saving performance in a situation where the driving performance is not necessary, there is an effect that the respective characteristics of the two treads can be exhibited efficiently and the compatibility can be provided more efficiently between the two performances (driving performance and fuel saving performance) which conflict with each other.

Alternatively, for example, by increasing the influence of the high grip characteristic of the first tread (that is, the tread with the low rubber hardness) to ensure quietness in a situation where quietness during driving is necessary and increasing the influence of the low rolling characteristic of the second tread to ensure the fuel saving performance in a situation where the quietness is not necessary, there is an effect that the respective characteristics of the two treads can be exhibited efficiently and the compatibility can be provided more efficiently between the two performances (quiet performance and fuel saving performance) which conflict with each other.

With the configuration in which the vicinity information on the vicinity of the vehicle is acquired and the control according to the vicinity information (situation in the vicinity of the vehicle) is performed as in the present invention, the camber angle according to the situation in the vicinity of the vehicle (that is, wheel characteristic either emphasizing the driving performance or the quietness or emphasizing the fuel saving performance) can be provided to the wheel in advance. Thus, there is an effect that the characteristic of the wheel can be controlled appropriately without causing a control delay.

With the vehicle control device according to claim 2, in addition to the advantageous effects of the vehicle control device according to claim 1, there is an effect that the situation in the vicinity of the vehicle can be acquired easily and accurately, since the configuration is such that the situation of the route that the vehicle is to follow is acquired as the vicinity information by the situation acquisition means based on the map data stored in the map data storage means and the current position of the vehicle detected by the current position detection means and the characteristic necessary for the wheel is determined by the characteristic determination means based on the situation of the route to follow acquired as the vicinity information by the situation acquisition means.

As a result, the control (adjustment of the camber angle of the wheel) according to the situation in the vicinity of the vehicle can be performed more appropriately, and the compatibility can be provided more efficiently between the two performances (driving performance and fuel saving performance, or quiet performance and fuel saving performance) which conflict with each other.

With the configuration in which the vicinity information on the vicinity of the vehicle is acquired based on the map data stored in the map data storage means and the current position of the vehicle detected by the current position detection means as in the present invention, there is an effect that information on the vicinity of the vehicle can be acquired earlier. As a result, since the camber angle according to the situation in the vicinity of the vehicle (that is, wheel characteristic either emphasizing the driving performance or emphasizing the fuel saving performance or either emphasizing the quiet performance or emphasizing the fuel saving performance) can be provided to the wheel well in advance, the control delay in the control of the characteristic of the wheel can reliably be suppressed.

With the vehicle control device according to claim 3, in addition to the advantageous effects of the vehicle control device according to claim 1 or 2, the control (adjustment of the camber angle) according to the relative positional relation with others can be performed, since the configuration is such that the relative positional relation between the vehicle and another vehicle is acquired as the vicinity information by the relative position acquisition means and the characteristic necessary for the wheel is determined by the characteristic determination means based on the relative positional relation with another vehicle acquired as the vicinity information by the relative position acquisition means.

Accordingly, by increasing the influence of the high grip characteristic of the first tread to ensure the driving performance in a situation where the driving performance of the vehicle is necessary in terms of the relative positional relation with others (for example, in the case where the driver is expected to perform a brake operation along with the decrease in the inter-vehicle distance or in the case where the driver is expected to perform a turning operation to avoid a crash with an adjacent vehicle) and increasing the influence of the low rolling characteristic of the second tread to ensure the fuel saving performance in a situation where the driving performance is not necessary (for example, in the case where another vehicle does not exist within a predetermined range from the vehicle), there is an effect that the respective characteristics of the two treads can be exhibited efficiently and the compatibility can be provided more efficiently between the two performances (driving performance and fuel saving performance) which conflict with each other.

With the configuration in which the relative positional relation with another vehicle is acquired as the vicinity information as in the present invention, the control according to the relative positional relation with another vehicle, i.e., the control based on an estimation of a brake, turning operation, or the like and whether or not the driving performance needs to be emphasized, can be performed, Thus, there is an effect that a crash of the vehicle with another vehicle can be prevented while efficiently providing the compatibility between the two performances of the driving performance and the fuel saving performance.

With the vehicle control device according to claim 4, in addition to advantageous effects of the vehicle control device according to claim 1 or 2, the control (adjustment of the camber angle of the wheel) according to the time can be performed, since the configuration is such that the time is acquired by the time acquisition means and the characteristic necessary for the wheel is determined based on the time acquired by the time acquisition means and the vicinity information acquired by the situation acquisition means.

Accordingly, by increasing the influence of the high grip characteristic of the first tread (that is, the tread with the low rubber hardness) to ensure the quiet performance in a situation where quietness is necessary at the current time (for example, in the case of driving in a residential area late night) and increasing the influence of the low rolling characteristic of the second tread (that is, the tread with the high rubber hardness) to ensure the fuel saving performance in a situation where the quiet performance is not necessary at the current time (for example, in the case of driving in a residential area during daytime), there is an effect that the respective characteristics of the two treads can be exhibited efficiently and the compatibility can be provided more efficiently between the two performances (quiet performance and fuel saving performance) which conflict with each other.

According to the present invention, since the characteristic necessary for the wheel is determined not only based on the time acquired by the time acquisition means but also in consideration of the vicinity information acquired by the situation acquisition means in addition to the time, the compatibility can be achieved more efficiently between the quiet performance and the fuel saving performance.

That is, with the configuration in which the required characteristic of the wheel is determined not uniformly based on only the time but based on the time and the vicinity situation as in the present invention, the characteristic required for the wheel can be changed swiftly and with high precision, in such a manner as, for example, when emphasizing only the quiet performance (or emphasizing only the fuel saving performance) regardless of the time regarding one area while the performance to be emphasized (quiet performance or fuel saving performance) is changed according to hours regarding another area. Thus, the compatibility can be achieved efficiently between the quiet performance and the fuel saving performance.

BRIEF DESCRIPTION OF THE DRAWINGS

FIG. 27 is a flowchart showing a camber control process.

DESCRIPTION OF THE REFERENCE NUMERALS

100 Vehicle control device
1, 201, 301 Vehicle
2, 202, 302 Wheel
2FL Front wheel (wheel, left wheel)
2FR Front wheel (wheel, right wheel)
2RL Rear wheel (wheel, left wheel)
2RR Rear wheel (wheel, right wheel)
21, 221 First tread
22 Second tread
323 Third tread
4 Camber angle adjustment device
4FL to 4RR FL to RR actuators (camber angle adjustment devices)
4a to 4c Hydraulic pressure cylinder (part of camber angle adjustment device)
4d Hydraulic pressure pump (part of camber angle adjustment device)
758 Navigation device (current position detection means and map data storage means)

BEST MODES FOR CARRYING OUT THE INVENTION

Figure 1:
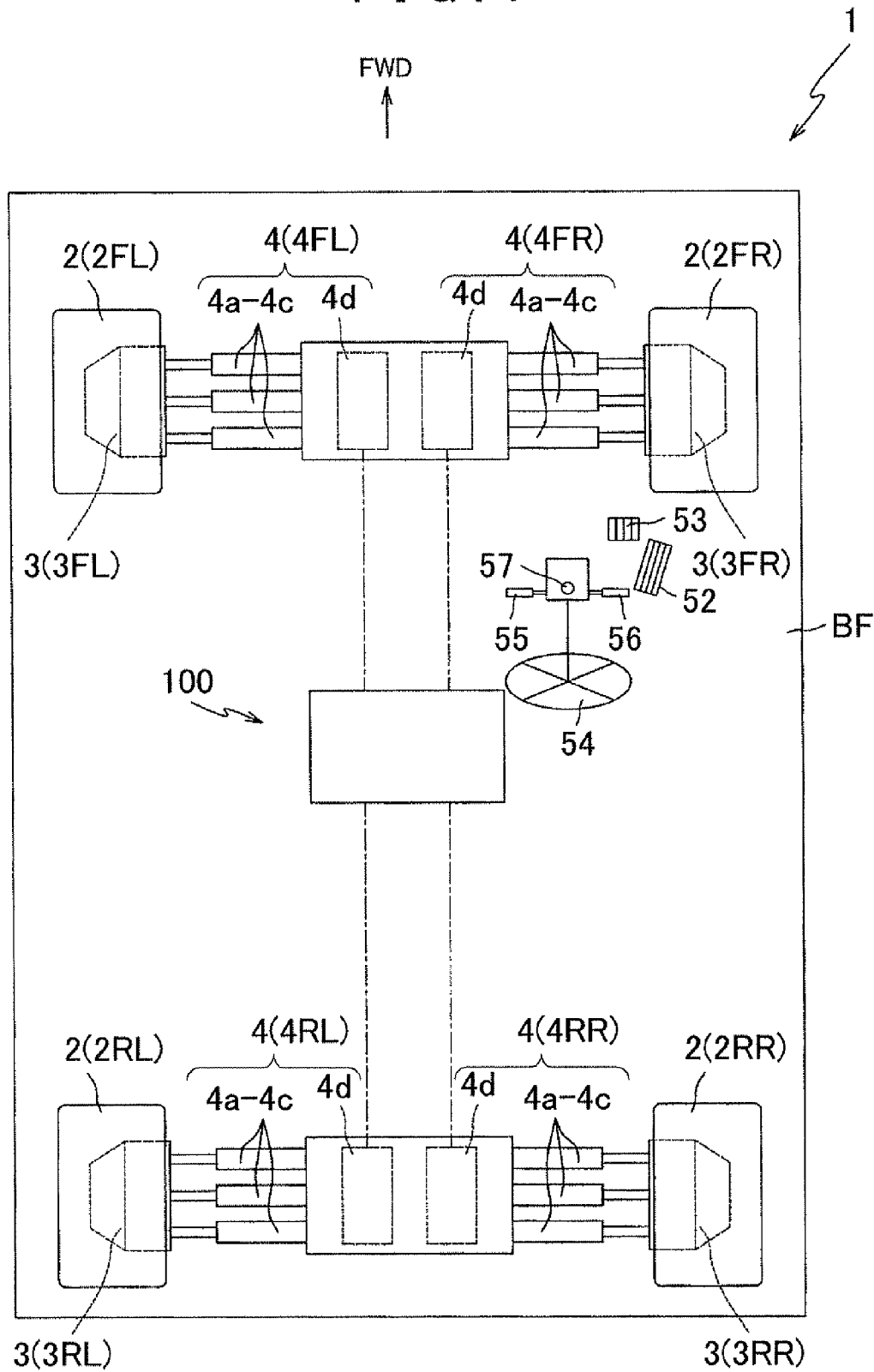
FIG. 1 is a schematic view showing a vehicle in which a vehicle control device according to a first embodiment of the present invention is mounted.

Hereinafter, preferred embodiments of the present invention will be described with reference to the accompanying drawings. FIG. 1 is a schematic view showing a vehicle 1 in which a vehicle control device 100 according to a first embodiment of the present invention is mounted. Note that an arrow FWD in FIG. 1 shows a forward direction of the vehicle 1.

First, the schematic configuration of the vehicle 1 will be described. As shown in FIG. 1, the vehicle 1 mainly includes a body frame BF, a plurality of (four in this embodiment) wheels 2 supported by the body frame BF, a wheel drive device 3 which rotates each wheel 2 independently, and a camber angle adjustment device 4 which performs steering, adjustment of a camber angle, and the like of each wheel 2, and is configured to achieve an improvement in driving performance and fuel saving by controlling the camber angle of the wheel 2 with the vehicle control device 100 and distinctly using two types of treads provided to the wheel 2 (see FIGS. 5 and 6).

Next, the detailed configuration of each portion will be described. As shown in FIG. 1, the wheels 2 include four wheels of right and left front wheels 2FL and 2FR located on the forward side in the proceeding direction of the vehicle 1 and right and left rear wheels 2RL and 2RR located on the rear side in the proceeding direction. The front and rear wheels 2FL to 2RR are configured to be independently rotatable by a rotational driving force provided from the wheel drive devices 3.

The wheel drive device 3 is a rotational driving device for rotating each wheel 2 independently, and is configured by arranging four electric motors (FL motor 3FL to RR motor 3RR) in the respective wheels 2 (that is, as in-wheel motors), as shown in FIG. 1. In the case where a driver operates an accelerator pedal 52, the rotational driving force is provided to each wheel 2 from each wheel drive device 3, and each wheel 2 is rotated at a rotational speed according to the operated amount of the accelerator pedal 52.

The wheels 2 (front and rear wheels 2FL to 2RR) are configured such that the steering angle and the camber angle can be adjusted by the camber angle adjustment device 4. The camber angle adjustment device 4 is a drive device for adjusting the steering angle and the camber angle of each wheel 2, and a total of four (FL actuator 4FL to RR actuator 4RR) are arranged in positions corresponding to the respective wheels 2, as shown in FIG. 1.

For example, in the case where the driver operates a steering wheel 54, a part (for example, only the front wheels 2FL and 2FR side) or all of the camber angle adjustment devices 4 are driven, and the steering angle according to the operated amount of the steering wheel 54 is provided to the wheel 2.

Accordingly, a steering operation of the wheel 2 is performed, and the vehicle 1 turns in a predetermined direction.

The vehicle control device 100 performs activation control of the camber angle adjustment device 4 to adjust the camber angle of the wheel 2 according to a state change of the driving state of the vehicle 1 (for example, whether being driven at a constant speed or being accelerated/decelerated, or whether proceeding straight or turning), the state of a road surface G (for example, whether the road surface is dry or the road surface is wet due to rain) on which the wheels 2 are to run, for example.

Figure 2A:
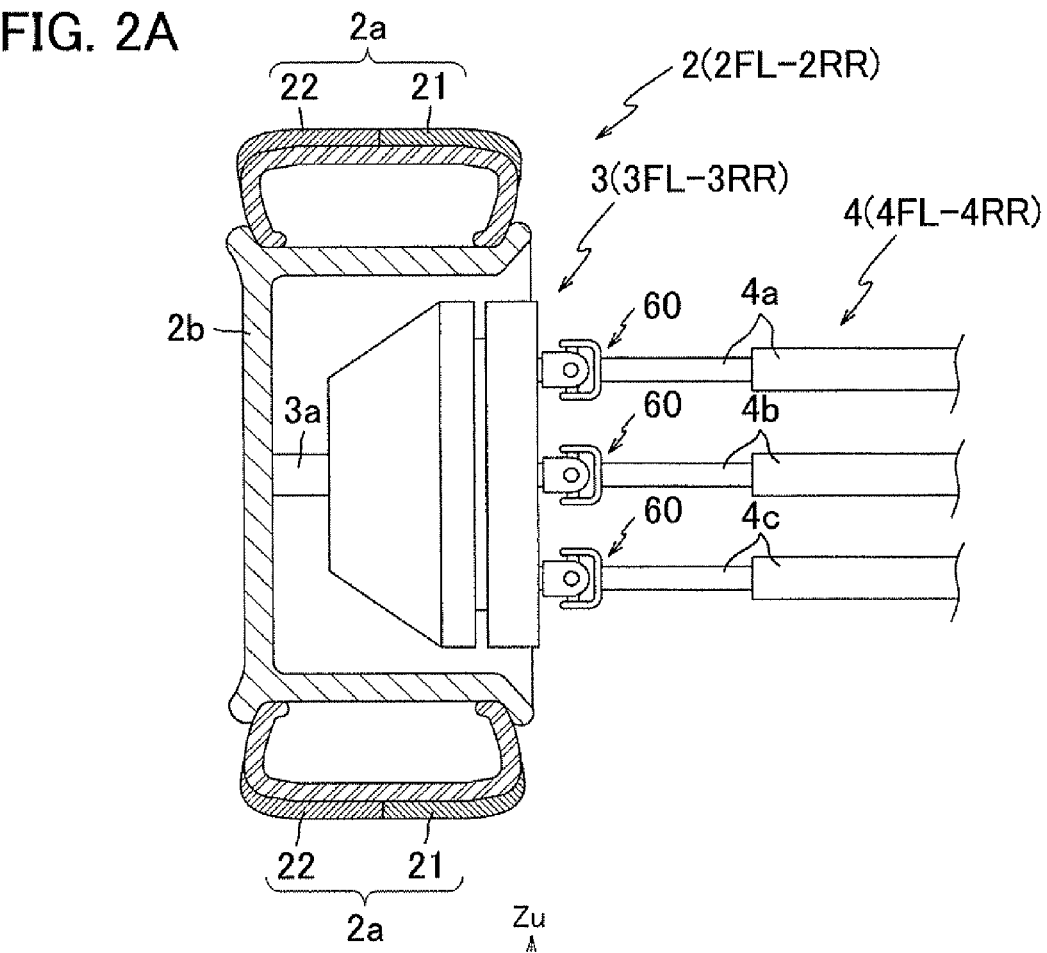
FIG. 2A is sectional view of a wheel.
Figure 2B:
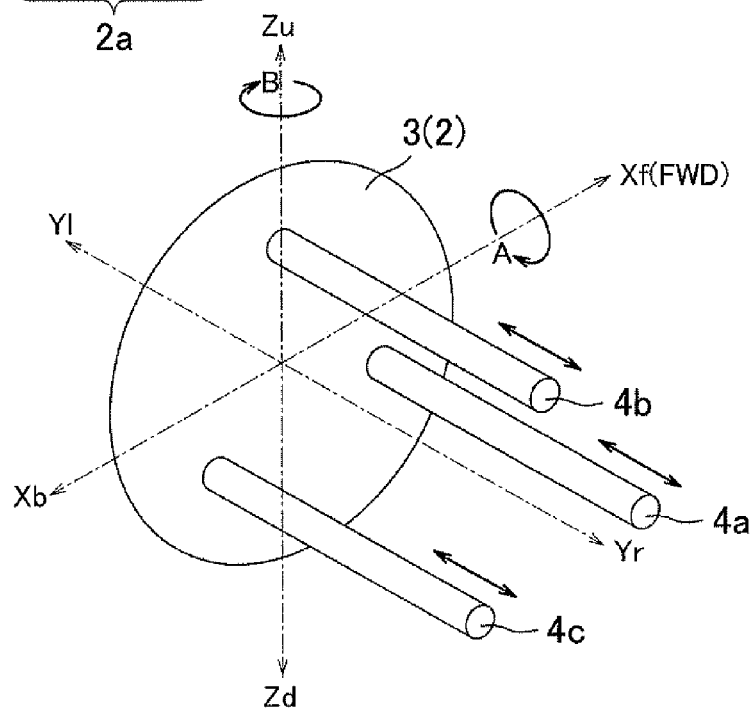
FIG. 2B is a schematic view illustrating an adjustment method of a steering angle and a camber angle of the wheel.

Referring to FIG. 2, the detailed configurations of the wheel drive device 3 and the camber angle adjustment device 4 will be described. FIG. 2A is a sectional view of the wheel 2, and FIG. 2B is a schematic view showing an adjustment method of the steering angle and the camber angle of the wheel 2.

Note that, in FIG. 2A, a power supply wiring and the like for supplying driving voltage to the wheel drive device 3 are omitted in the drawing. In FIG. 2B, a virtual axis Xf-Xb, a virtual axis Yl-Yr, and a virtual axis Zu-Zd respectively correspond to the front-back direction, the right-left direction, and the up-down direction of the vehicle 1.

As shown in FIG. 2A, the wheel 2 (front and rear wheels 2FL to 2RR) mainly includes a tire 2a configured of a rubber elastic material and a wheel rim 2b configured of an aluminum alloy or the like, and the wheel drive device 3 (FL motor 3FL to RR motor 3RR) is arranged as an in-wheel motor in an inner circumference portion of the wheel rim 2b.

The tire 2a includes a first tread 21 arranged on the inside of the vehicle 1 (right side in FIG. 2A) and a second tread 22 having a different characteristic from the first tread 21 and arranged on the outside of the vehicle 1 (left side in FIG. 2A). Note that the detailed configuration of the wheel 2 (tire 2a) will be described later with reference to FIG. 4.

In the wheel drive device 3, as shown in FIG. 2A, a drive shaft 3a protruding on the front surface side thereof (left side in FIG. 2A) is connected and fixed to the wheel rim 2b, such that the rotational driving force can be transmitted to the wheel 2 via the drive shaft 3a. On the back surface of the wheel drive device 3, the camber angle adjustment device 4 (FL actuator 4FL to RR actuator 4RR) is connected and fixed.

The camber angle adjustment device 4 includes a plurality of (three in this embodiment) hydraulic pressure cylinders 4a to 4c, and rod portions of the three hydraulic pressure cylinders 4a to 4c are connected and fixed to the back surface side (right side in FIG. 2A) of the wheel drive device 3 via a joint portion (universal joint in this embodiment) 60. Note that, as shown in FIG. 2B, the respective hydraulic pressure cylinders 4a to 4c are arranged at approximately equal intervals in the circumference direction (that is, at 120° intervals in the circumference direction), and one hydraulic pressure cylinder 4b is arranged on the virtual axis Zu-Zd.

Accordingly, by the respective hydraulic pressure cylinders 4a to 4c expanding or contracting the respective rod portions by predetermined lengths in predetermined directions, the wheel drive device 3 is swung about the virtual axes Xf-Xb and Zu-Xd as the center of the swing, and a predetermined camber angle and steering angle are provided to each wheel 2 as a result.

For example, as shown in FIG. 2B, when the rod portion of the hydraulic pressure cylinder 4b is contracted and the rod portions of the hydraulic pressure cylinders 4a and 4c are expanded in a state where the wheels 2 are in neutral positions (state where the vehicle 1 is proceeding straight), the wheel drive device 3 is rotated about the virtual axis Xf-Xb (as shown by an arrow A in FIG. 2B), and a camber angle (angle formed by a center line of the wheel 2 with respect to the virtual axis Zu-Zd) in a minus direction (as a negative camber) is provided to the wheel 2. On the other hand, when the hydraulic pressure cylinder 4b and the hydraulic pressure cylinders 4a and 4c are respectively expanded or contracted in the opposite directions, a camber angle in a plus direction (as a positive camber) is provided to the wheel 2.

When the rod portion of the hydraulic pressure cylinder 4a is contracted and the rod portion of the hydraulic pressure cylinder 4c is expanded in the state where the wheels 2 are in the neutral positions (state where the vehicle 1 is proceeding straight), the wheel drive device 3 is rotated about the virtual axis Zu-Zd (as shown by an arrow B in FIG. 2B), and a steering angle (which is an angle formed by the center line of the wheel 2 with respect to a reference line of the vehicle 1 and is an angle determined regardless of the proceeding direction of the vehicle 1) in a toe-in direction is provided to the wheel 2. On the other hand, when the hydraulic pressure cylinder 4a and the hydraulic pressure cylinder 4c are expanded or contracted in the opposite directions, a steering angle in a toe-out direction is provided to the wheel 2.

Note that the driving methods of the respective hydraulic pressure cylinders 4a to 4c exemplified herein are described for the case of driving from the state where the wheels 2 are in the neutral positions as described above. By combining the driving methods to control the expansion and contraction of the respective hydraulic pressure cylinders 4a to 4c, an arbitrary camber angle and steering angle can be provided to the wheel 2.

Returning to FIG. 1, the accelerator pedal 52 and a brake pedal 53 are operation members operated by the driver, and the driving speed or the brake force of the vehicle 1 is determined and the activation control of the wheel drive device 3 is performed according to the stepped state (such as stepped amount or stepped speed) of each of the pedals 52 and 53.

The steering wheel 54 is an operation member operated by the driver, and a turning radius and the like of the vehicle 1 are determined and the activation control of the camber angle adjustment device 4 is performed according to the operated state (such as rotation angle or rotational speed) thereof. A wiper switch 55 is an operation member operated by the driver, and the activation control of a wiper (not shown) is performed according to the operated state (such as operated position) thereof.

In the same manner, a turn signal switch 56 and a high grip switch 57 are operation members operated by the driver, and the activation control of a turn signal (not shown) is performed in the case of the former and the activation control of the camber angle adjustment device 4 is performed in the case of the latter according to the operated states (such as operated positions) thereof.

Note that a state where the high grip switch 57 is turned on corresponds to a state where high grip performance is selected as the characteristic of the wheel 2, and a state where the high grip switch 57 is turned off corresponds to a state where low rolling resistance is selected as the characteristic of the wheel 2.

The vehicle control device 100 is a vehicle control device for controlling the respective portions of the vehicle 1 configured in a manner described above, and controls, for example, the rotational speed of each wheel 2 by detecting the operated state of each of the pedals 52 and 53 and activating the wheel drive device 3 according to the detection result thereof.

Alternatively, the operated states of the accelerator pedal 52, the brake pedal 53, and the steering wheel 54 are detected, the camber angle adjustment device 4 is activated according to the detection results thereof and the camber angle of each wheel is adjusted, such that the two types of treads 21 and 22 provided to the wheel 2 are used distinctly (see FIGS. 5 and 6) to achieve an improvement in the driving performance and fuel saving. The detailed configuration of the vehicle control device 100 will now be described with reference to FIG. 3.

Figure 3:
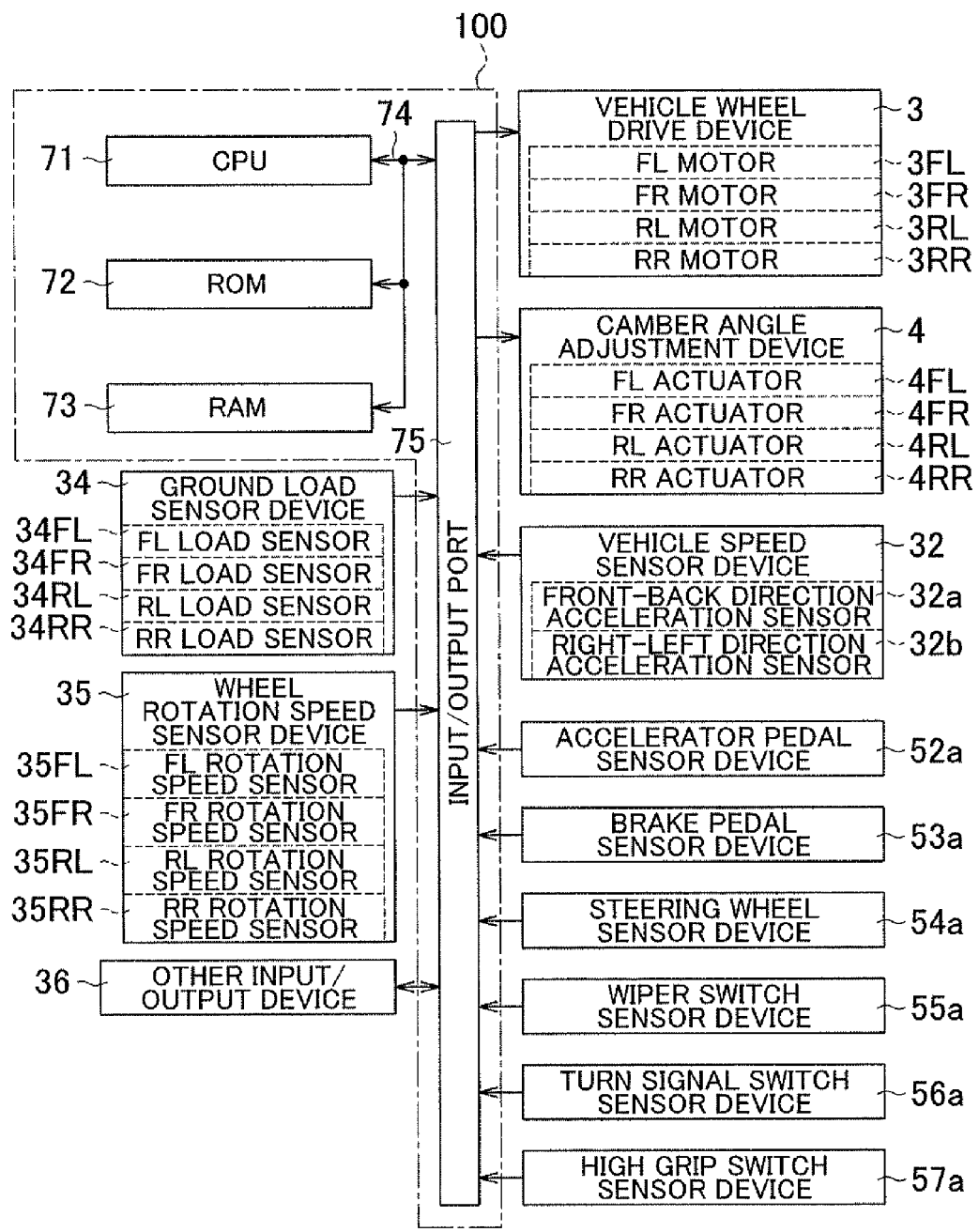
FIG. 3 is a block diagram showing the electrical configuration of the vehicle control device.

FIG. 3 is a block diagram showing the electrical configuration of the vehicle control device 100. As shown in FIG. 3, the vehicle control device 100 includes a CPU 71, a ROM 72, and a RAM 73, which are connected to an input/output port 75 via a bus line 74. To the input/output port 75, a plurality of devices such as the wheel drive device 3 are connected.

Figure 7:
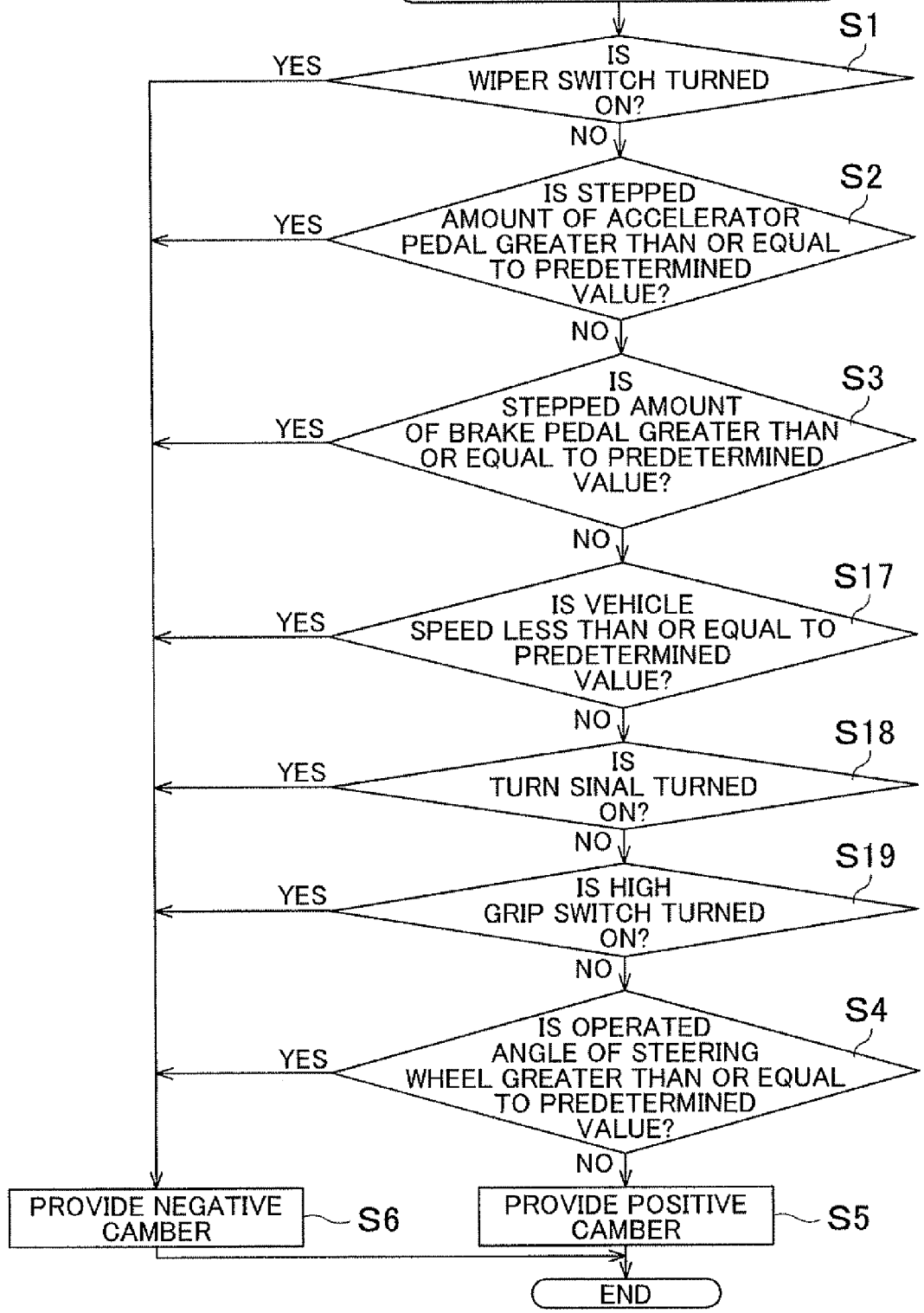
FIG. 7 is a flowchart showing a camber control process.

The CPU 71 is an arithmetic device which controls the respective portions connected by the bus line 74. The ROM 72 is a non-rewritable nonvolatile memory storing a control program executed by the CPU 71, fixed value data, and the like, and the RAM 73 is a memory for storing various rewritable data at the time of executing the control program. Note that, in the ROM 72, a program of a flowchart (camber control processing) shown in FIG. 7 is stored.

As described above, the wheel drive device 3 is a device for rotating each wheel 2 (see FIG. 1), and mainly includes the four motors, the FL motor 3FL to RR motor 3RR, which provide the rotational driving force to the respective wheels 2 and a driving circuit (not shown) which performs drive control of the respective motors 3FL to 3RR based on a command from the CPU 71.

As described above, the camber angle adjustment device 4 is a drive device for adjusting the steering angle and the camber angle of each wheel 2, and mainly includes the four actuators, the FL actuator 4FL to RR actuator 4RR, which provide the driving force for angle adjustments of the respective wheels 2 (wheel drive devices 3) and a driving circuit (not shown) which performs drive control of the respective actuators 4FL to 4RR based on a command from the CPU 71.

Note that the FL actuator 4FL to RR actuator 4RR mainly include the three hydraulic pressure cylinders 4a to 4c, a hydraulic pressure pump 4d (see FIG. 1) which supplies oil (hydraulic pressure) to the respective hydraulic pressure cylinders 4a to 4c, an electromagnetic valve (not shown) which switches the supply direction of the oil supplied from the hydraulic pressure pump to the respective hydraulic pressure cylinders 4a to 4c, and an expansion/contraction sensor (not shown) which detects the expansion/contraction amount of the respective hydraulic pressure cylinders 4a to 4c (rod portions).

When the driving circuit of the camber angle adjustment device 4 performs the drive control of the hydraulic pressure pump based on a command from the CPU 71, the respective hydraulic pressure cylinders 4a to 4c are expanded or contracted by the oil (hydraulic pressure) supplied from the hydraulic pressure pump. When the electromagnetic valve is turned on/off, the driving direction (expansion or contraction) of the respective hydraulic pressure cylinders 4a to 4c is switched.

The driving circuit of the camber angle adjustment device 4 monitors the expansion/contraction amount of the respective hydraulic pressure cylinders 4a to 4c through the expansion/contraction sensor, and the expansion/contraction of the hydraulic pressure cylinders 4a to 4c which have reached a target value (expansion/contraction amount) instructed by the CPU 71 is stopped. Note that the detection result by the expansion/contraction sensor is output from the driving circuit to the CPU 71, and the CPU 71 can obtain the current steering angle and the camber angle of each wheel 2 based on the detection result thereof.

A vehicle speed sensor device 32 is a device for detecting a ground speed (absolute value and proceeding direction) of the vehicle 1 with respect to the road surface G and outputting the detection result thereof to the CPU 71, and mainly includes front-back and right-left direction acceleration sensors 32a and 32b and a control circuit (not shown) which processes the detection results of the respective acceleration sensors 32a and 32b to be output to the CPU 71.

The front-back direction acceleration sensor 32a is a sensor which detects the acceleration of the vehicle 1 (body frame BF) in the front-back direction (up-down direction in FIG. 1), and the right-left direction acceleration sensor 32b is a sensor which detects the acceleration of the vehicle 1 (body frame BF) in the right-left direction (right-left direction in FIG. 1). Note that, in this embodiment, the respective acceleration sensors 32a and 32b are configured as piezoelectric sensors using a piezoelectric element.

The CPU 71 can time-integrate the detection results (acceleration values) of the respective acceleration sensors 32a and 32b input from the control circuit of the vehicle speed sensor device 32 to calculate the respective speeds in the two directions (front-back and right-left directions), and obtain the ground speed (absolute value and proceeding direction) of the vehicle 1 by synthesizing the components in the two directions.

A ground load sensor device 34 is a device for detecting the load applied to the ground contact area of each wheel 2 from the road surface G and outputting the detection result thereof to the CPU 71, and includes FL load sensor 34FL to RR load sensor 34RR which respectively detect the loads applied to the respective wheels 2 and a processing circuit (not shown) which processes the detection results of the respective load sensors 34FL to 34RR to be output to the CPU 71.

Note that, in this embodiment, the respective load sensors 34FL to 34RR are configured as piezoresistive three-shaft load sensors. The respective load sensors 34FL to 34R are arranged on a suspension shaft (not shown) of the respective wheels 2, and detect the loads applied to the wheels 2 described above from the road surface C in three directions of the front-back direction (virtual axis Xf-Xb direction), the right-left direction (virtual axis Yl-Yr direction), and the up-down direction (virtual axis Zu-Zd direction) of the vehicle 1 (see FIG. 2B).

The CPU 71 estimates a friction coefficient $\mu$ of the road surface G in the ground contact area of each wheel 2 in the following manner from the detection result (ground load) of the each of the load sensors 34FL to 34RR input from the ground load sensor device 34.

For example, looking at the front wheel 2FL, if the loads in the front-back direction, the right-left direction, and the up-down direction of the vehicle 1 detected by the FL load sensor 34FL are respectively Fx, Fy, and Fz, the friction coefficient $\mu$ of the road surface G in a portion corresponding to the ground contact area of the front wheel 2FL in the front-back direction of the vehicle 1 is Fx/Fz ($\mu x$=Fx/Fz) in a slip state where the front wheel 2FL is slipping with respect to the road surface G, and is estimated to be a greater value than Fx/Fz ($\mu x$>Fx/Fz) in a non-slip state where the front wheel 2FL is not slipping with respect to the road surface G.

Note that a friction coefficient $\mu y$ in the right-left direction of the vehicle 1 is shown as $\mu y$=Fy/Fz in the slip state and is estimated to be greater than Fy/Fz in the non-slip state in the same manner. The friction coefficient $\mu$ can obviously be detected by other methods. Examples of other methods include known technology disclosed in Japanese Patent Application Publication No. JP-A-2001-315633 and Japanese Patent Application Publication No. JP-A-2003-118554.

A wheel rotation speed sensor device 35 is a device for detecting the rotational speed of each wheel 2 and outputting the detection result thereof to the CPU 71, and includes four rotation sensors, FL rotation speed sensor 35FL to RR rotation speed sensor 35RR, which respectively detect the rotational speeds of the respective wheels 2 and a processing circuit (not shown) which processes the detection results of the respective rotation speed sensors 35FL to 35RR to be output to the CPU 71.

Note that, in this embodiment, the respective rotation sensors 35FL to 35RR are provided to the respective wheels 2, and detect the angular speeds of the respective wheels 2 as the rotational speeds. That is, the respective rotation sensors 35FL to 35RR are configured as electromagnetic pickup sensors including a rotation body which rotates in conjunction with each wheel 2 and a pickup which electromagnetically detects the presence or absence of a number of teeth formed in the circumference direction of the rotation body.

The CPU 71 can obtain the actual circumference speed of each wheel 2 from the rotational speed of each wheel 2 input from the wheel rotation speed sensor device 35 and the outer diameter of each wheel 2 stored in the ROM 72 in advance, and can determine whether each wheel 2 is slipping by comparing the circumference speed thereof and the driving speed (ground speed) of the vehicle 1.

An accelerator pedal sensor device 52a is a device for detecting the operated state of the accelerator pedal 52 and outputting the detection result thereof to the CPU 71, and mainly includes an angle sensor (not shown) which detects the stepped state of the accelerator pedal 52 and a control circuit (not shown) which processes the detection result of the angle sensor to be output to the CPU 71.

A brake pedal sensor device 53a is a device for detecting the operated state of the brake pedal 53 and outputting the detection result thereof to the CPU 71, and mainly includes an angle sensor (not shown) which detects the stepped state of the brake pedal 53 and a control circuit (not shown) which processes the detection result of the angle sensor to be output to the CPU 71.

A steering wheel sensor device 54a is a device for detecting the operated state of the steering wheel 54 and outputting the detection result thereof to the CPU 71, and mainly includes an angle sensor (not shown) which detects the operated state of the steering wheel 54 and a control circuit (not shown) which processes the detection result of the angle sensor to be output to the CPU 71.

A wiper switch sensor device 55a is a device for detecting the operated state of the wiper switch 55 and outputting the detection result thereof to the CPU 71, and mainly includes a positioning sensor (not shown) which detects the operated state (operated position) of the wiper switch 55 and a control circuit (not shown) which processes the detection result of the positioning sensor to be output to the CPU 71.

A turn signal switch sensor device 56a is a device for detecting the operated state of the turn signal switch 56 and outputting the detection result thereof to the CPU 71, and mainly includes a positioning sensor (not shown) which detects the operated state (operated position) of the turn signal switch 56 and a control circuit (not shown) which processes the detection result of the positioning sensor to be output to the CPU 71.

A high grip switch sensor device 57a is a device for detecting the operated state of the high grip switch 57 and outputting the detection result thereof to the CPU 71, and mainly includes a positioning sensor (not shown) which detects the operated state (operated position) of the high grip switch 57 and a control circuit (not shown) which processes the detection result of the positioning sensor to be output to the CPU 71.

Note that, in this embodiment, the respective angle sensors are configured as contact-type potentiometers using electrical resistance. The CPU 71 can obtain the stepped amount of each of the pedals 52 and 53 and the operated angle of the steering wheel 54 from the detection results input from the control circuits of the respective sensor devices 52a to 54a, and obtain the stepped speed (operated speed) of each of the pedals 52 and 53 and the rotational speed (operated speed) of the steering wheel 54 by time-integrating the detection results thereof.

Examples of other input/output devices 35 shown in FIG. 3 include a rainfall sensor which detects the rainfall or an optical sensor which detects the state of the road surface G without contact.

Figure 4:
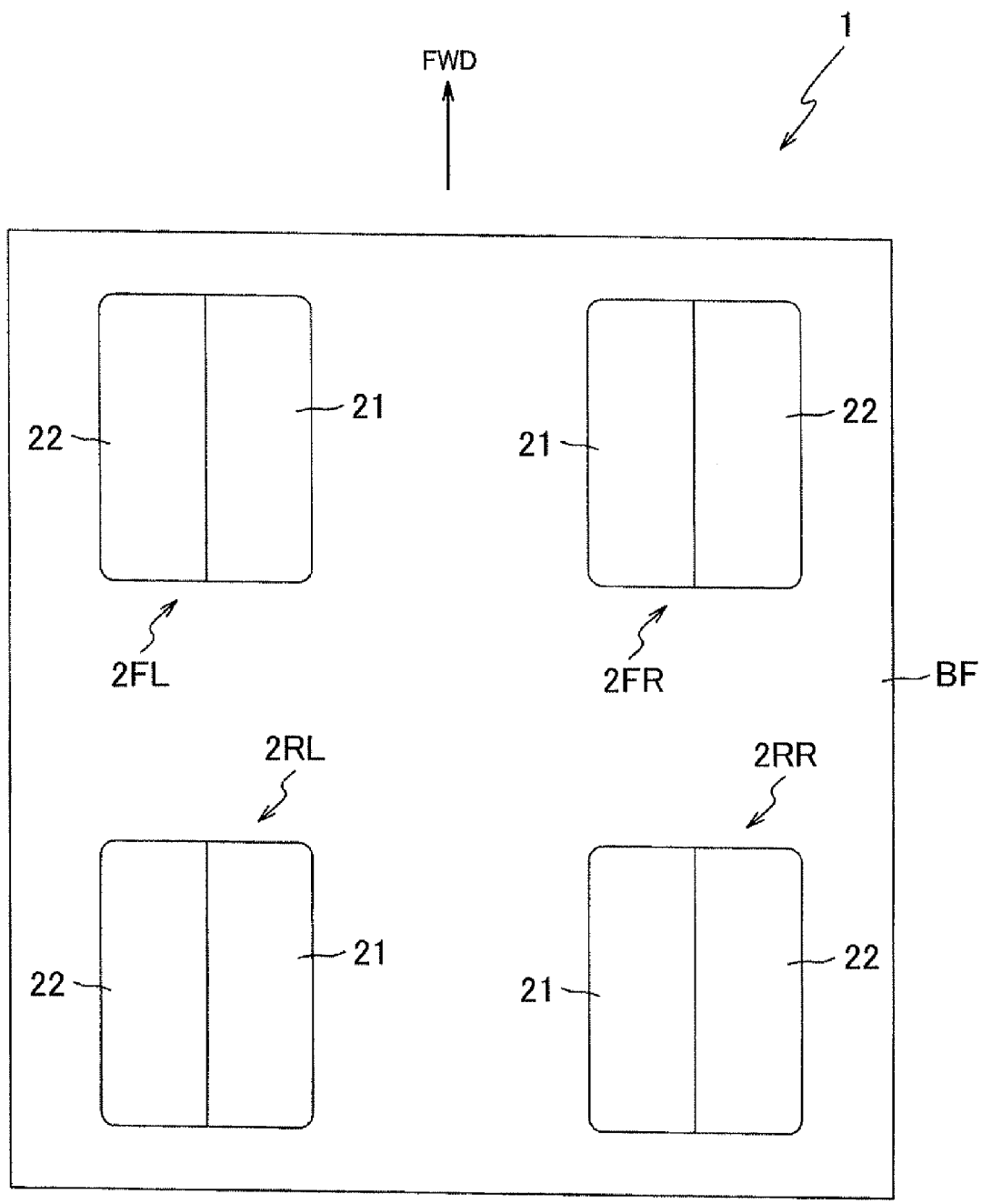
FIG. 4 is a schematic view showing an upper view of the vehicle.
Figure 5:
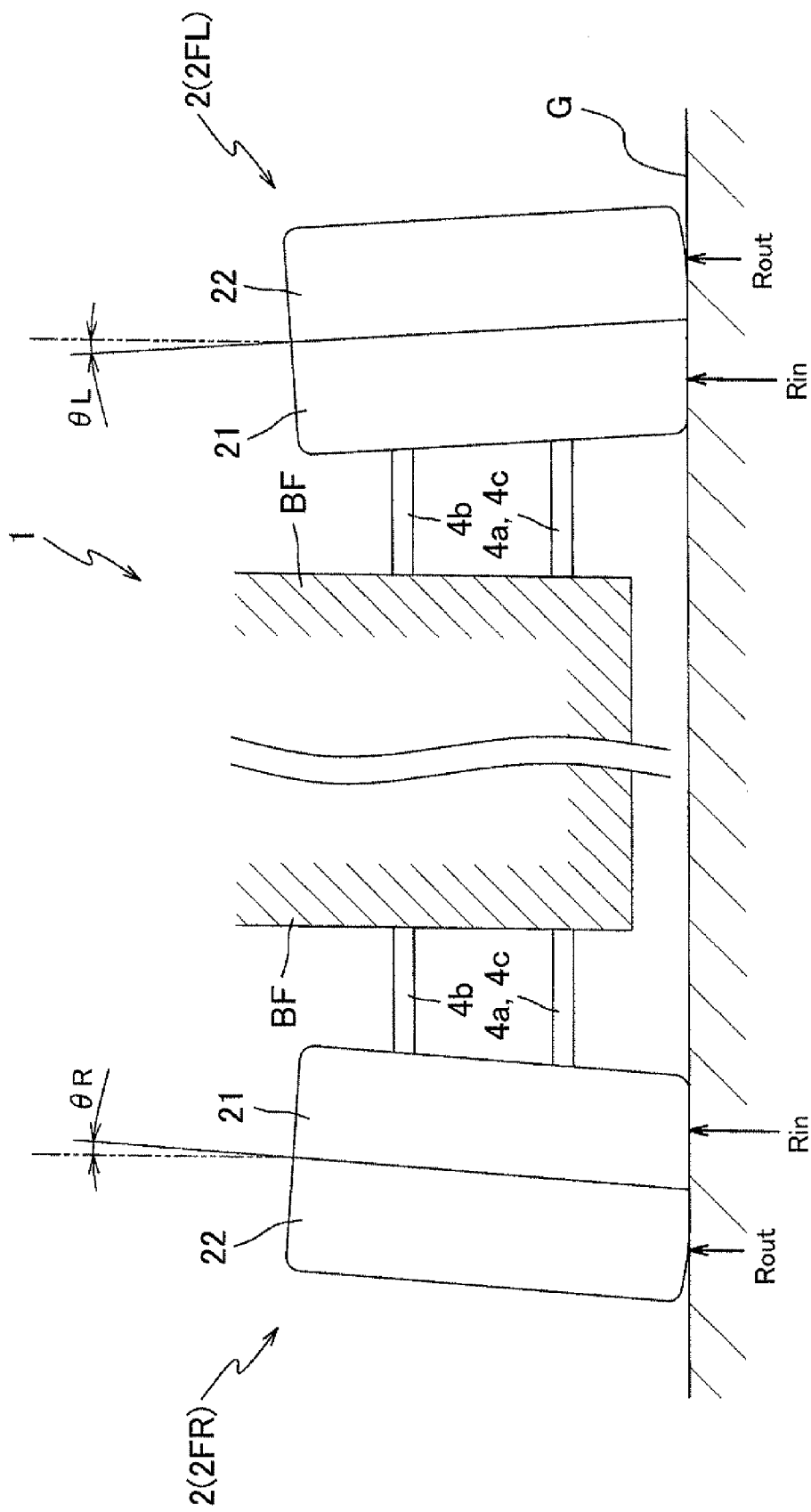
FIG. 5 is a schematic view showing a front view of the vehicle in a state where the wheel is provided with a negative camber.
Figure 6:
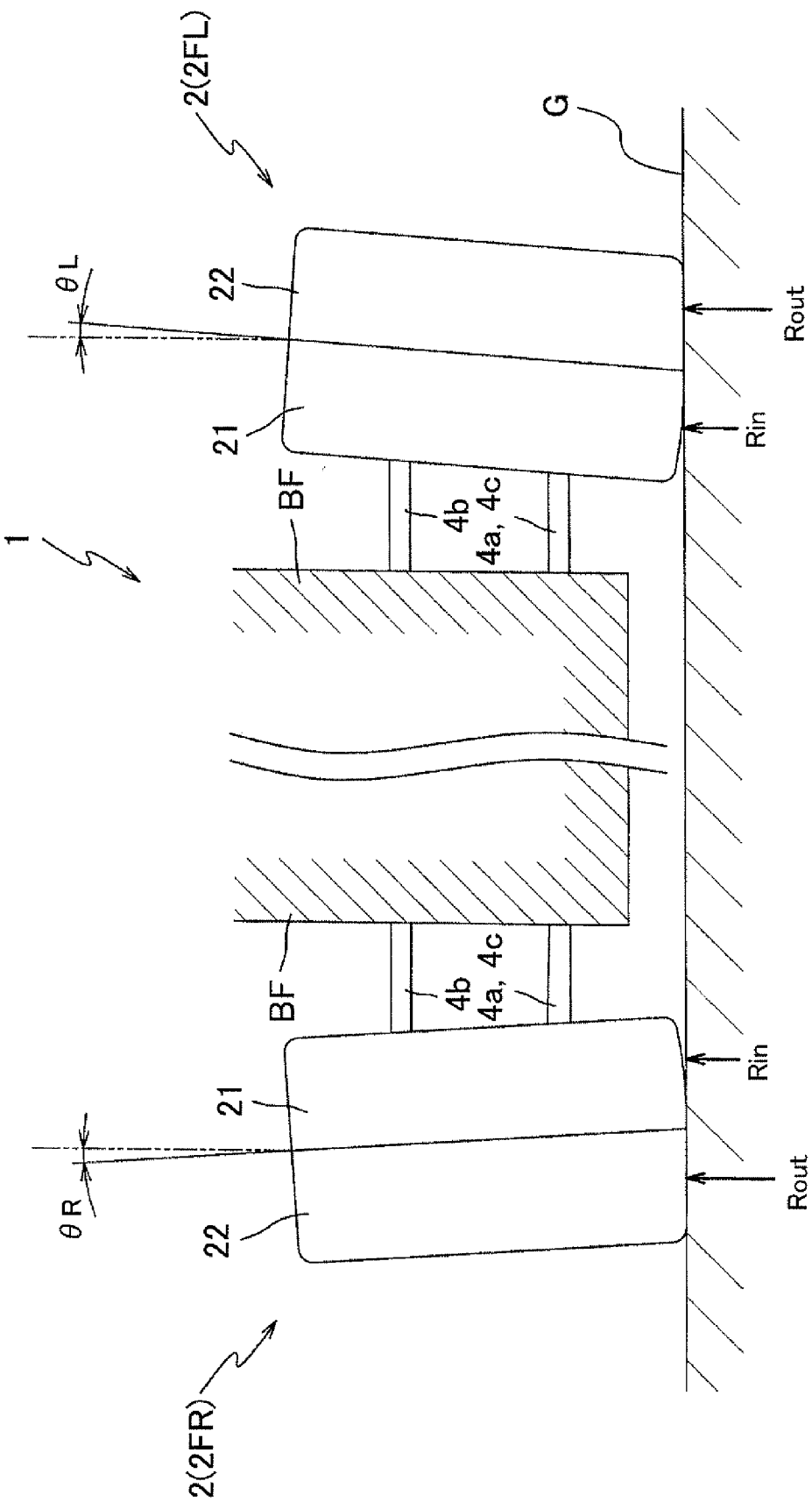
FIG. 6 is a schematic view showing a front view of the vehicle in a state where the wheel is provided with a positive camber.

Next, the detailed configuration of the wheel 2 will be described with reference to FIGS. 4 to 6. FIG. 4 is a schematic view showing the upper view of the vehicle 1. FIGS. 5 and 6 are schematic views showing the front views of the vehicle 1. FIG. 5 shows a state where the wheel 2 is provided with a negative camber, and FIG. 6 shows a state where the wheel 2 is provided with a positive camber.

As described above, the wheel 2 includes the two types of treads, the first tread 21 and the second tread 22. As shown in FIG. 4, in each of the wheels 2 (front wheels 2FL and 2FR and rear wheels 2RL and 2RR), the first tread 21 is arranged on the inside of the vehicle 1, and the second tread 22 is arranged on the outside of the vehicle 1.

In this embodiment, the two treads 21 and 22 are configured to have the same width dimensions (dimensions in the right-left direction in FIG. 4). The first tread 21 is configured to have a characteristic of a higher grip force (higher grip performance) compared to the second tread 22. On the other hand, the second tread 22 is configured to have a characteristic of a smaller rolling resistance (lower rolling resistance) compared to the first tread 21. That is, the first tread 21 is set to have a lower value in the rubber hardness (lower hardness) compared to the second tread 22. In other words, the second tread 22 is set to have a higher value in the rubber hardness (higher hardness) compared to the first tread 21.

For example, when the activation control of the camber angle adjustment device 4 is performed and camber angles θL and θR of the wheels 2 are adjusted in the minus direction (as negative cambers) as shown in FIG. 5, a ground contact (ground pressure or ground contact area) Rin in the first tread 21 arranged on the inside of the vehicle 1 is increased and a ground contact (ground pressure or ground contact area) Rout in the second tread 22 arranged on the outside of the vehicle 1 is decreased. Accordingly, by leveraging the high grip performance of the first tread 21, the driving performance (for example, the turning performance, the acceleration performance, the brake performance, or the vehicle stability in the rain) can be improved.

On the other hand, when the activation control of the camber angle adjustment device 4 is performed and the camber angles θL and θR of the wheels 2 are adjusted in the plus direction (positive camber direction) as shown in FIG. 6, the ground contact (ground pressure or ground contact area) in the first tread 21 arranged on the inside of the vehicle 1 is decreased and the ground contact (ground pressure or ground contact area) in the second tread 22 arranged on the outside of the vehicle 1 is increased. Accordingly, by leveraging the low rolling resistance of the second tread 22, the fuel saving performance can be improved.

Next, a camber control process will be described with reference to FIG. 7. FIG. 7 is a flowchart showing the camber control process. This process is a process executed repeatedly (for example, at intervals of 0.2 ms) by the CPU 71 while the power of the vehicle control device 100 is activated, such that the compatibility between two performances of the driving performance and the fuel saving performance described above is provided by adjusting the camber angle provided to the wheel 2.

The CPU 71 first determines whether the wiper switch 55 is turned on, i.e., whether a wiping operation of a wiper for a windshield is instructed by the driver (S1), regarding the camber control process. In the case where it is determined that the wiper switch 55 is turned on as a result (S1: Yes), it is estimated that there is a possibility of the current weather being rainy and a water film being formed on the road surface G, and therefore the negative camber is provided to the wheel 2 (S6) to terminate the camber process.

Accordingly, the ground contact (ground pressure or ground contact area) Rin in the first tread 21 is increased and the ground contact (ground pressure or ground contact area) Rout in the second tread 22 is decreased (see FIG. 5). Thus the vehicle stability in the rain can be improved leveraging the high grip performance of the first tread 21.

In the case where it is determined that the wiper switch 55 is not turned on in the process of S1 (S1: No), it is estimated that it is not rainy and the state of the road surface G is good, and therefore whether the stepped amount of the accelerator pedal 52 is greater than or equal to a predetermined value, i.e., whether an acceleration of a predetermined level or greater (sudden acceleration) is instructed by the driver, is determined next (S2).

In the case where it is determined that the stepped amount of the accelerator pedal 52 is greater than or equal to the predetermined value as a result (S2: Yes), the sudden acceleration is instructed by the driver and the wheel 2 may slip. Thus, the negative camber is provided to the wheel 2 (S6) to terminate the camber process.

Accordingly, in the same manner as the case described above, the ground contact (ground pressure or ground contact area) Rin in the first tread 21 is increased and the ground contact (ground pressure or ground contact area) Rout in the second tread 22 is decreased (see FIG. 5). Thus, a slip of the wheel 2 can be prevented and the acceleration performance of the vehicle 1 can be improved by leveraging the high grip performance of the first tread 21.

In the case where it is determined that the stepped amount of the accelerator pedal 52 does not reach the predetermined value in the process of S2 (S2: No), the sudden acceleration is not instructed and it is estimated as moderate acceleration or constant-speed driving. Thus, whether the stepped amount of the brake pedal 53 is greater than or equal to a predetermined value, i.e., whether a brake of a predetermined level or greater (sudden brake) is instructed by the driver, is determined next (S3).

In the case where it is determined that the stepped amount of the brake pedal 53 is greater than or equal to the predetermined value as a result (S3: Yes), the sudden brake is instructed by the driver and the wheel 2 may lock. Thus, the negative camber is provided to the wheel 2 (S6) to terminate the camber process.

Accordingly, in the same manner as the case described above, the ground contact (ground pressure or ground contact area) Rin in the first tread 21 is increased and the ground contact (ground pressure or ground contact area) Rout in the second tread 22 is decreased (see FIG. 5). Thus, a lock of the wheel 2 can be prevented and the brake performance of the vehicle 1 can be improved by leveraging the high grip performance of the first tread 21.

In the case where it is determined that the stepped amount of the brake pedal 53 does not reach the predetermined value in the process of S3 (S33 No), the sudden brake is not instructed and it is estimated as moderate brake or constant-speed driving. Thus, whether the vehicle speed (ground speed) is less than or equal to a predetermined value (for example, 15 km per hour), i.e., whether it is a low-speed driving, is determined next (S17).

In the case where it is determined that the vehicle speed is less than or equal to the predetermined value (that is, in the low-speed driving) as a result (S17; Yes), the vehicle 1 has a higher possibility of then decelerating to stop or accelerating compared to a case where the vehicle speed exceeds the predetermined value. Thus, in such cases, since it is necessary to ensure the grip force or the stopping force of the vehicle 1 (wheel 2), the negative camber is provided to the wheel 2 (S6) to terminate the camber process.

Accordingly, in the same manner as the case described above, the ground contact (ground pressure or ground contact area) Rin in the first tread 21 is increased and the ground contact (ground pressure or ground contact area) Rout in the second tread 22 is decreased (see FIG. 5). Thus, a lock or a slip of the wheel 2 can be prevented by increasing the grip force to improve the brake performance and the acceleration performance of the vehicle 1 by leveraging the high grip performance of the first tread 21.

Since the stopping force of the vehicle 1 (wheel 2) can be ensured by leveraging the high grip performance of the first tread 21 after the vehicle 1 is stopped, the vehicle 1 can be stopped in a stable state. Further, in the case of restarting after the stop, the ground contact (ground pressure or ground contact area) Rin is increased in advance, so that the wheel 2 can be prevented from slipping to perform the restart of the vehicle 1 smoothly and promptly.

In the case where it is determined that the vehicle speed is higher than the predetermined value in the process of S17 (S17; No), the vehicle speed is not low and it is estimated that the driving force or brake force at the time of acceleration or deceleration has a relatively small value. Thus, whether the turn signal switch 56 is turned on, i.e., whether a command for a right or left turn or a lane change is made by the driver, is determined next (S18).

In the case where it is determined that the turn signal switch 56 is turned on as a result (S18: Yes), there is a high possibility of a turning operation of the vehicle 1 or a deceleration as a preparation therefor being performed along with the right or left turn or the lane change. Thus, the negative camber is provided to the wheel 2 (S6) to terminate the camber process.

Accordingly, in the same manner as the case described above, the ground contact (ground pressure or ground contact area) Rin in the first tread 21 is increased and the ground contact (ground pressure or ground contact area) Rout in the second tread 22 is decreased (see FIG. 5). Thus, a slip of the wheel 2 can be prevented and the turning performance of the vehicle 1 can be improved by leveraging the high grip performance of the first tread 21.

In the case where it is determined that the turn signal switch 56 is not turned on in the process of S18 (S18: No), it is estimated that the turning operation of the vehicle 1 along with the right or left turn or the lane change is not performed. Thus, whether the high grip switch 57 is turned on, i.e., whether a command for selecting the high grip performance as the characteristic of the wheel 2 is made by the driver, is determined next (S19).

In the case where it is determined that the high grip switch 57 is turned on as a result (S19: Yes), the high grip performance is selected as the characteristic of the wheel 2. Thus, the negative camber is provided to the wheel 2 (S6) to terminate the camber process.

Accordingly, in the same manner as the case described above, the ground contact (ground pressure or ground contact area) Rin in the first tread 21 is increased and the ground contact (ground pressure or ground contact area) Rout in the second tread 22 is decreased (see FIG. 5). Thus, a slip of the wheel 2 can be prevented and the brake performance, the acceleration performance, or the turning performance of the vehicle 1 can be improved by leveraging the high grip performance of the first tread 21.

In the case where it is determined that the high grip switch 57 is not turned on in the process of S19 (S19: No), whether the operated angle of the steering wheel 54 is greater than or equal to a predetermined value, i.e., whether a turn of a predetermined level or greater (tight turn) is instructed by the driver, is determined next (S4).

In the case where it is determined that the operated angle of the steering wheel 54 is greater than or equal to the predetermined value as a result (S4: Yes), the tight turn is instructed by the driver and the wheel 2 may slip to spin the vehicle 1. Thus, the negative camber is provided to the wheel 2 (S6) to terminate the camber process.

Accordingly, in the same manner as the case described above, the ground contact (ground pressure or ground contact area) Rin in the first tread 21 is increased and the ground contact (ground pressure or ground contact area) Rout in the second tread 22 is decreased (see FIG. 5). Thus, a slip of the wheel 2 (spin of the vehicle 1) can be prevented and the turning performance of the vehicle 1 can be improved by leveraging the high grip performance of the first tread 21.

On the other hand, in the case where it is determined that the operated angle of the steering wheel 54 does not reach the predetermined value in the process of S4 (S4: No), the tight turn is not instructed and it is estimated that it is a moderate turn or a straight-ahead driving, and that the road surface is in a good state and the sudden acceleration or the sudden brake is not instructed from the processes of S1 to S3 (S1 No, S2: No, S3: No).

Thus, in this case (S1: No, S2: No, S3: No, S4: No), since it can be determined that it is not necessary to obtain the high grip performance as the performance of the wheel 2 and that it is preferable to obtain the fuel saving performance by the low rolling resistance, the positive camber is provided to the wheel 2 (S5) to terminate the camber process.

Accordingly, the ground contact (ground pressure or ground contact area) Rin in the first tread 21 is decreased and the ground contact (ground pressure or ground contact area) Rout in the second tread 22 is increased (see FIG. 6). Thus, the rolling efficiency of the wheel 2 can be improved and the fuel saving performance of the vehicle 1 can be improved by leveraging the low rolling resistance of the second tread 21.

In this manner, in this embodiment, the compatibility can be provided between the two performances of the acceleration performance/brake performance and the fuel saving performance which conflict with each other by adjusting the camber angles θR and θL of the wheel 2 with the camber angle adjustment device 4 to change the ratio of the ground contact (ground pressure or ground contact area) Rin in the first tread 21 and the ground contact (ground pressure or ground contact area) Rout in the second tread 22.

Figure 8:
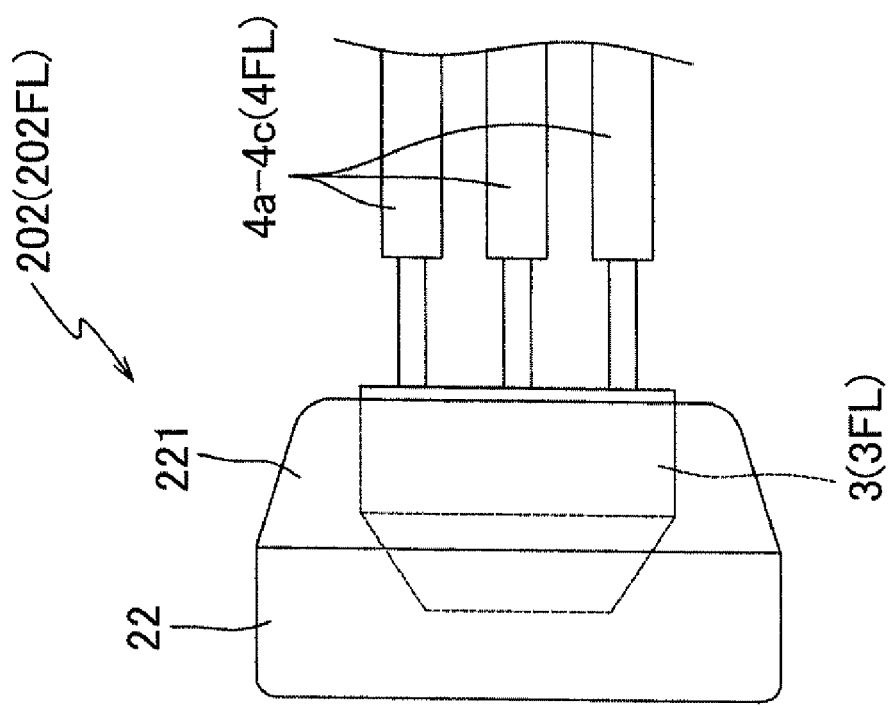
FIG. 8 is an upper view of a wheel according to a second embodiment.

Next, a second embodiment will be described with reference to FIGS. 8 to 11. FIG. 8 is an upper view of a wheel 202 of the second embodiment, and FIG. 9 is a schematic view showing an upper view of a vehicle 201.

Figure 10:
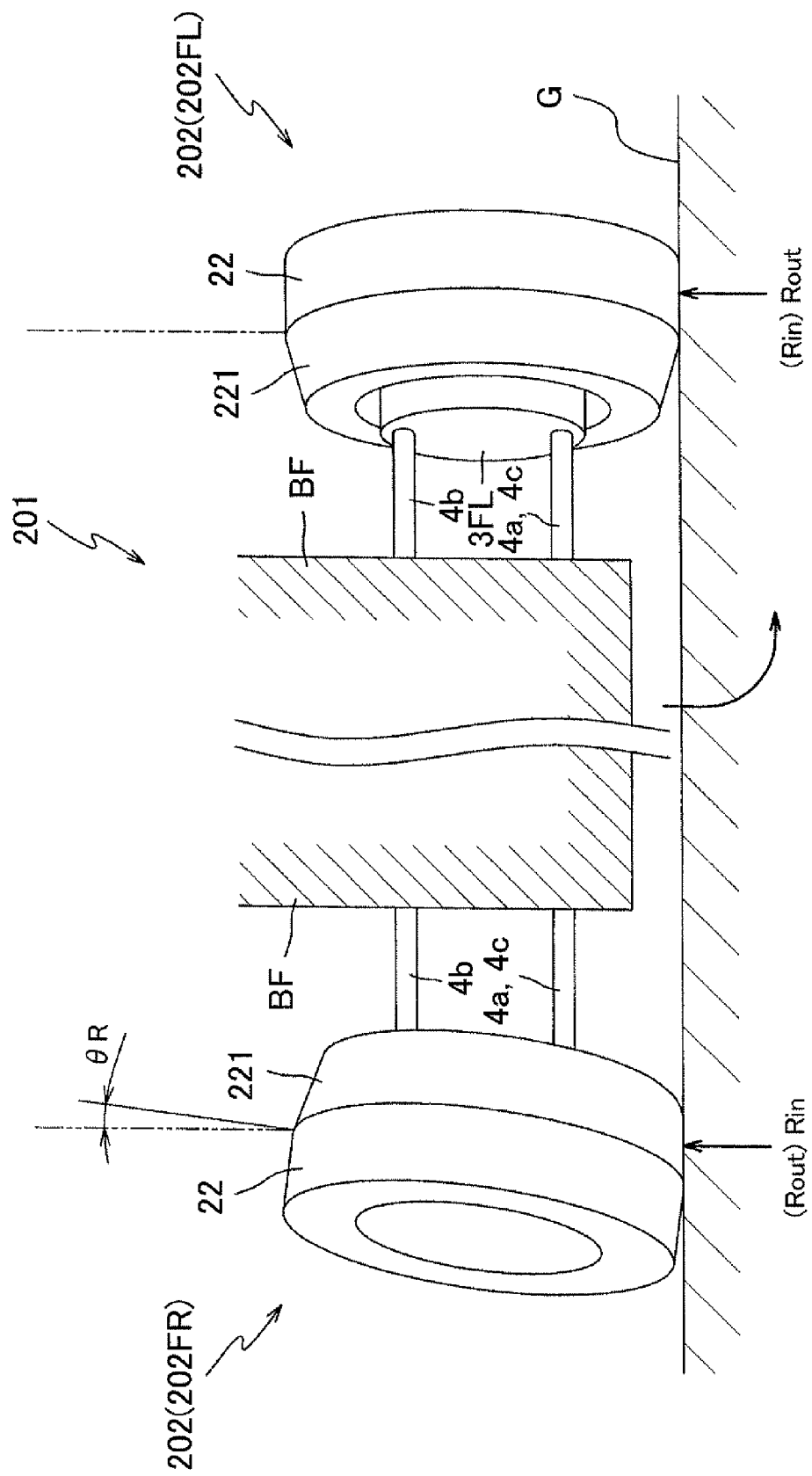
FIG. 10 is a schematic view showing a front view of the vehicle making a left turn in a state where right and left wheels are provided with steering angles for a left turn, a turning outer wheel (right front wheel) is provided with a negative camber, and a turning inner wheel (left wheel) is provided with a constant camber angle.

FIG. 10 is a schematic view showing a front view of the vehicle 201 making a left turn in a state where the right and left wheels 2 are provided with steering angles for a left turn, the turning outer wheel (right front wheel 202FR) is provided with a negative camber, and the turning inner wheel (left wheel 202FL) is provided with a constant camber angle.

In the first embodiment, the case where the outer diameters of the two treads 21 and 22 of the wheel 2 are constant in the width direction has been described, but the wheel 2 of the second embodiment is configured such that the outer diameter of a first tread 221 is gradually decreased. Note that the same portions as those of the first embodiment described above are denoted by the same reference numerals, and descriptions thereof will be omitted.

Figure 9:
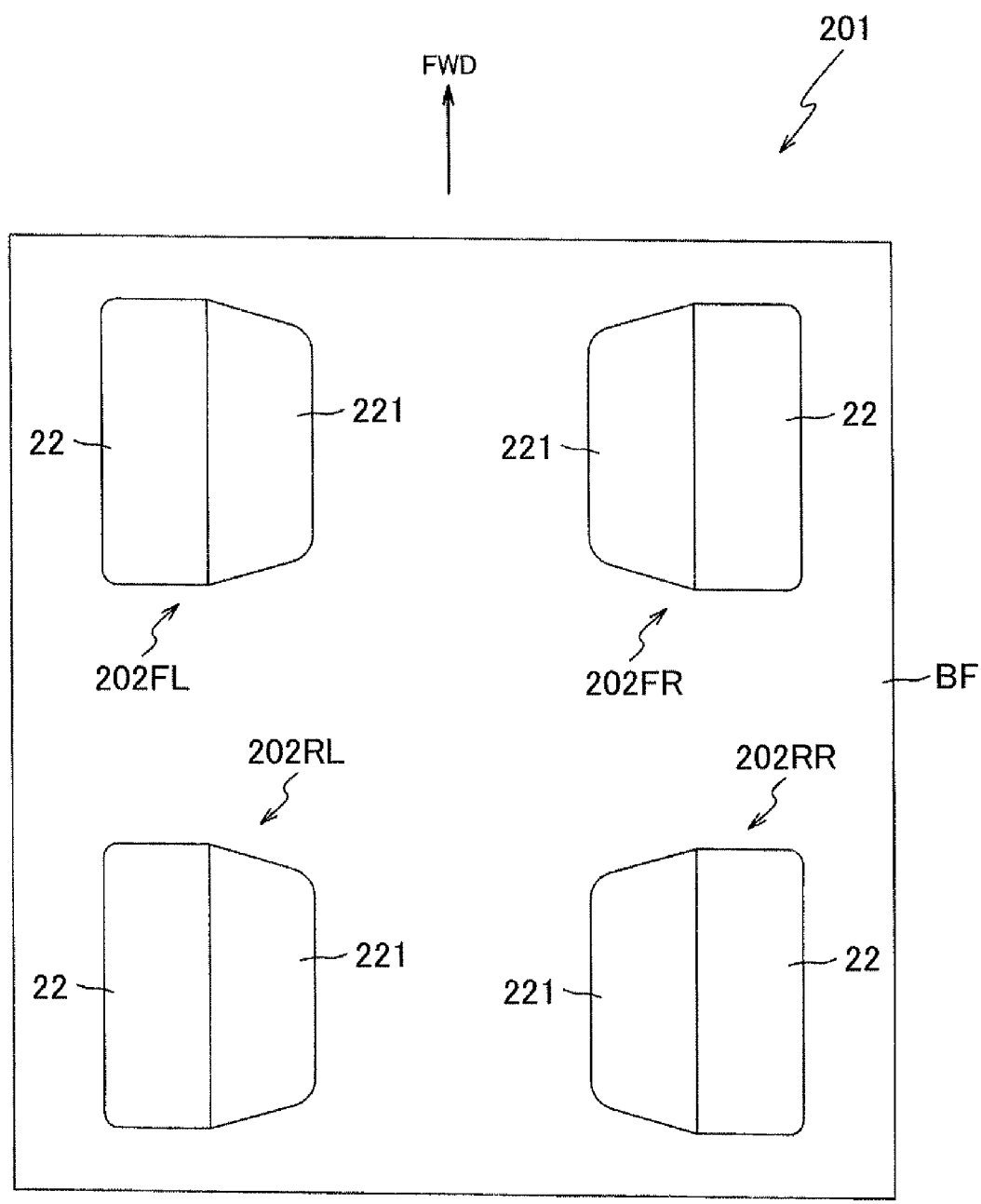
FIG. 9 is a schematic view showing an upper view of a vehicle.

As shown in FIGS. 8 and 9, the wheel 202 of the second embodiment includes the first tread 221 arranged on the inside of the vehicle 201 (right side in FIG. 8) and the second tread 22 having a different characteristic from the first tread 221 and arranged on the outside of the vehicle 201 (left side in FIG. 8).

Note that the first tread 221 is configured to have a characteristic of a higher grip force (higher grip performance) compared to the second tread 22, and the second tread 22 is configured to have a characteristic of a smaller rolling resistance (lower rolling resistance) compared to the first tread 221. That is, the first tread 221 is set to have a lower value in the rubber hardness (lower hardness) compared to the second tread 22. In other words, the second tread 22 is set to have a higher value in the rubber hardness (higher hardness) compared to the first tread 221.

As shown in FIGS. 8 and 9, although the wheel 202 is configured such that the width dimensions (dimensions in the right-left direction in FIG. 8) of the two treads 221 and 22 are the same, the second tread 22 is configured to have an outer diameter approximately constant in the width direction (right-left direction in FIG. 8) while the first tread 221 is configured to have an outer diameter which gradually decreases from the second tread 22 side (left side in FIG. 8) toward the inside of the vehicle 201 (right side in FIG. 8).

Accordingly, as shown in FIG. 10, only the second tread 22 can be caused to contact the ground in a state where the first tread 221 does not contact the road surface even if a large camber angle is not provided (i.e., the camber angle is set to 0°) in the wheel 202 (left front wheel 202FL). As a result, the rolling resistance of the entire wheel 2 can be reduced to further improve the fuel saving performance. Simultaneously, by the first tread 221 not contacting the ground and the second tread 22 contacting the ground at a smaller camber angle, the wear of the two treads 221 and 22 can be suppressed to achieve a longer duration of life.

In the case where the camber angle in the minus direction (negative camber) is provided to the wheel 202 (right front wheel 202FR) to cause the first tread 221 to contact the ground as shown in FIG. 10, the ground pressure on the first tread 221 can be made uniform in the entire region in the width direction (right-left direction in FIG. 8) since the outer diameter of the first tread 221 is gradually decreased, and a concentration of the ground pressure on a tread end portion can be suppressed.

Thus, by using the first tread 221 having the high grip performance efficiently, the driving performance (such as the turning performance, the acceleration performance, the brake performance, and the driving stability in the rain) can further be improved, and the deflection wear of the first tread 221 can be suppressed to achieve a longer duration of life.

Figure 11:
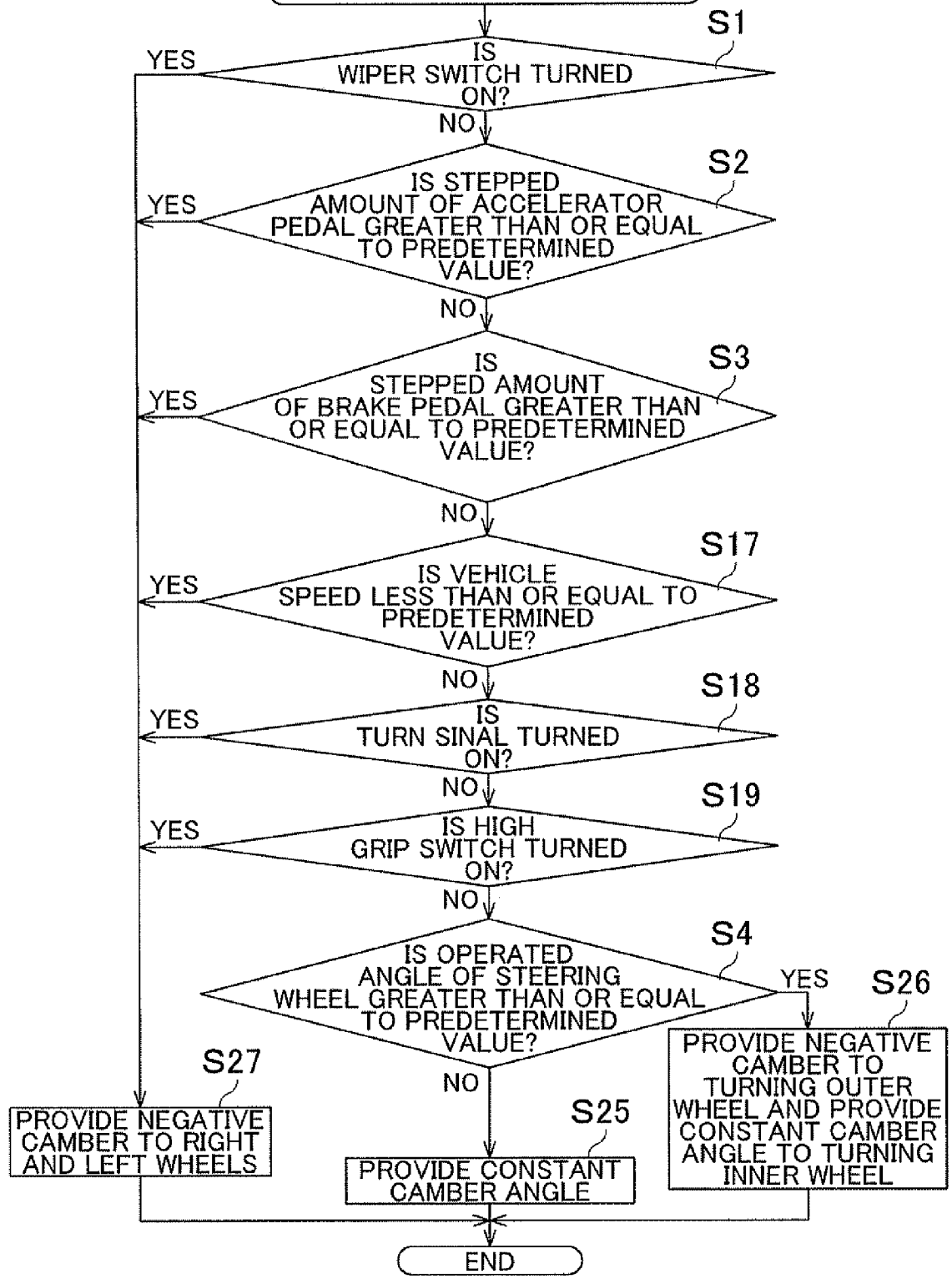
FIG. 11 is a flowchart showing a camber control process.

Next, a camber control process of the second embodiment will be described with reference to FIG. 11. FIG. 11 is a flowchart showing the camber control process. This process is a process executed repeatedly (for example, at intervals of 0.2 ms) by the CPU 71 while the power of the vehicle control device 100 is activated.

In the case where it is determined that the wiper switch 55 is turned on (S1: Yes), in the case where it is determined that the stepped amount of the accelerator pedal 52 is greater than or equal to the predetermined value (S1: No, S2: Yes), in the case where it is determined that the stepped amount of the brake pedal 53 is greater than or equal to the predetermined value (S1: No, S2: No, S3: Yes), in the case where it is determined that the vehicle speed is less than or equal to the predetermined value (S1: No, S2: No, S3; No, S17; Yes), in the case where it is determined that the turn signal switch 56 is turned on (S1: No, S2: No, S3: No, S17: No, S18: Yes), or in the case where it is determined that the high grip switch 57 is turned on (S1: No, S2: No, S3: No, S17: No, S18: Yes) by the CPU 71 regarding the camber control process, the water film is formed on the road surface C, the sudden acceleration or sudden brake is instructed, a generation of large driving force or stopping the vehicle is expected, the turning operation along with the right or left turn or the lane change is expected, or the selection of the high grip performance is instructed, as described above in the first embodiment, and it is necessary to leverage the high grip performance of the first tread 221.

Thus, in this case, the negative cambers (camber angles by which at least the second tread 22 is made distant from the road surface G in this embodiment, see the right front wheel 202FR shown in FIG. 10) are provided to the right and left wheels 2 (S27) to terminate the camber process.

Accordingly, in the same manner as the case of the first embodiment described above, the ground contact (ground pressure or ground contact area) Rin in the first tread 221 is increased and the ground contact (ground pressure or ground contact area) Rout in the second tread 22 is decreased (the ground contact (ground pressure or ground contact area) Rout becomes zero in this embodiment). Thus, a slip or lock of the wheel 2 can be prevented and the driving stability and the acceleration/brake performance of the vehicle 201 can be improved by leveraging the high grip performance of the first tread 221.

Note that the camber angles θR and θL provided to the right and left wheels 2 are preferably the same angles during the straight-ahead driving. The camber angles θR and θL are preferably angles greater than those by which the second tread 22 is made distant from the road surface G.

In the case where it is determined that the operated angle of the steering wheel 54 does not reach the predetermined value in the process of S4 (S4; No), the tight turn is not instructed, and it is estimated that it is a moderate turn or a straight-ahead driving, and that the road surface is in a good state, the sudden acceleration or the sudden brake is not instructed, the generation of a large driving force or stopping the vehicle is not expected, the turning operation along with the right or left turn or the lane change is not expected, and the selection of the high grip performance is further not instructed from the processes of S1 to S3 (S1: No, S2: No, S3: No, S17: No, S18: No, S19 No).

Thus, in this case (S1: No, S2: No, S3: No, S17: No, S18: No, S19: No, S4: No), since it can be determined that it is not necessary to obtain the high grip performance as the performance of the wheel 2 and that it is preferable to obtain the fuel saving performance by the low rolling resistance, the constant camber angle is provided to the wheel 2 (S25) to terminate the camber process. Note that, in this embodiment, the constant camber angle is set to 0° (see the left front wheel 202FL shown in FIG. 10).

Accordingly, since only the second tread 22 can be caused to contact the ground in the state where the first tread 221 does not contact the road surface G, the rolling resistance of the entire wheel 202 can be reduced to further improve the fuel saving performance. In this case, by the first tread 221 not contacting the ground and the second tread 22 contacting the ground at the camber angle of 0°, the wear of the two treads 221 and 22 can be suppressed to achieve a longer duration of life.

In the case where it is determined that the operated angle of the steering wheel 54 is greater than or equal to the predetermined value in the process of S4 (S4: Yes), the tight turn is instructed by the driver and the wheel 2 may slip to spin the vehicle 201. Thus, in this embodiment, the negative camber is provided to the turning outer wheel (right front wheel 202FR in FIG. 10) and the constant camber angle is provided (S26) to the turning inner wheel (left front wheel 202FL in FIG. 10) to terminate the camber process.

Accordingly, the cost of the control drive can be reduced while ensuring the turning performance. That is, by the ground contact (ground pressure or ground contact area) Rin in the first tread 221 being increased and the ground contact (ground pressure or ground contact area) Rout in the second tread 22 being decreased (becoming zero in this embodiment) in the turning outer wheel (see FIG. 10), a slip of the wheel 202 (spin of the vehicle 201) can be prevented and the turning performance of the vehicle 201 can be improved by leveraging the high grip performance of the first tread 221. On the other hand, by making the change of the camber angle in the turning inner wheel smaller than that of the turning outer wheel (that is, maintaining the camber angle during the straight-ahead driving), the cost of the control by the vehicle control device 100 or the cost of the drive by the camber angle adjustment device 4 can be reduced.

Figure 12:
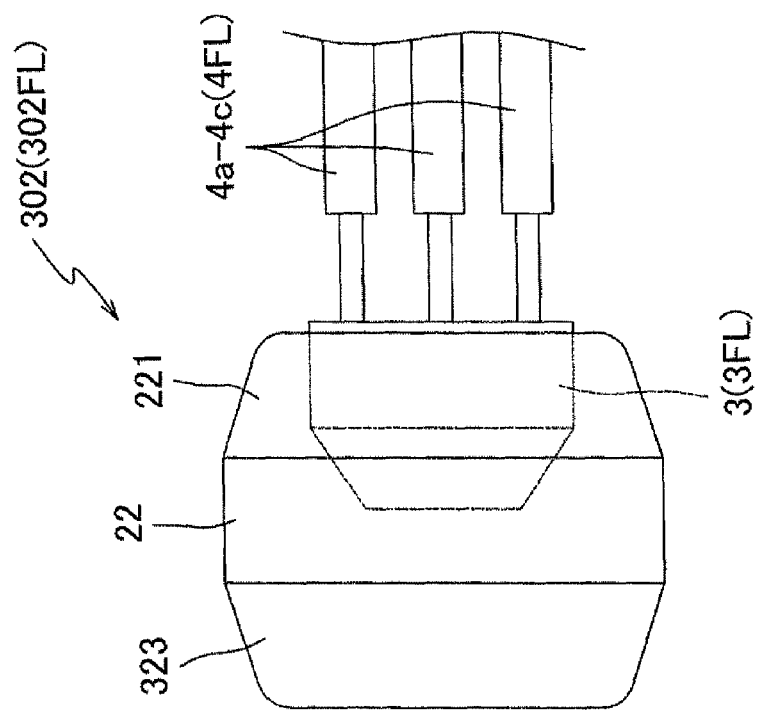
FIG. 12 is an upper view of a wheel according to a third embodiment.
Figure 13:
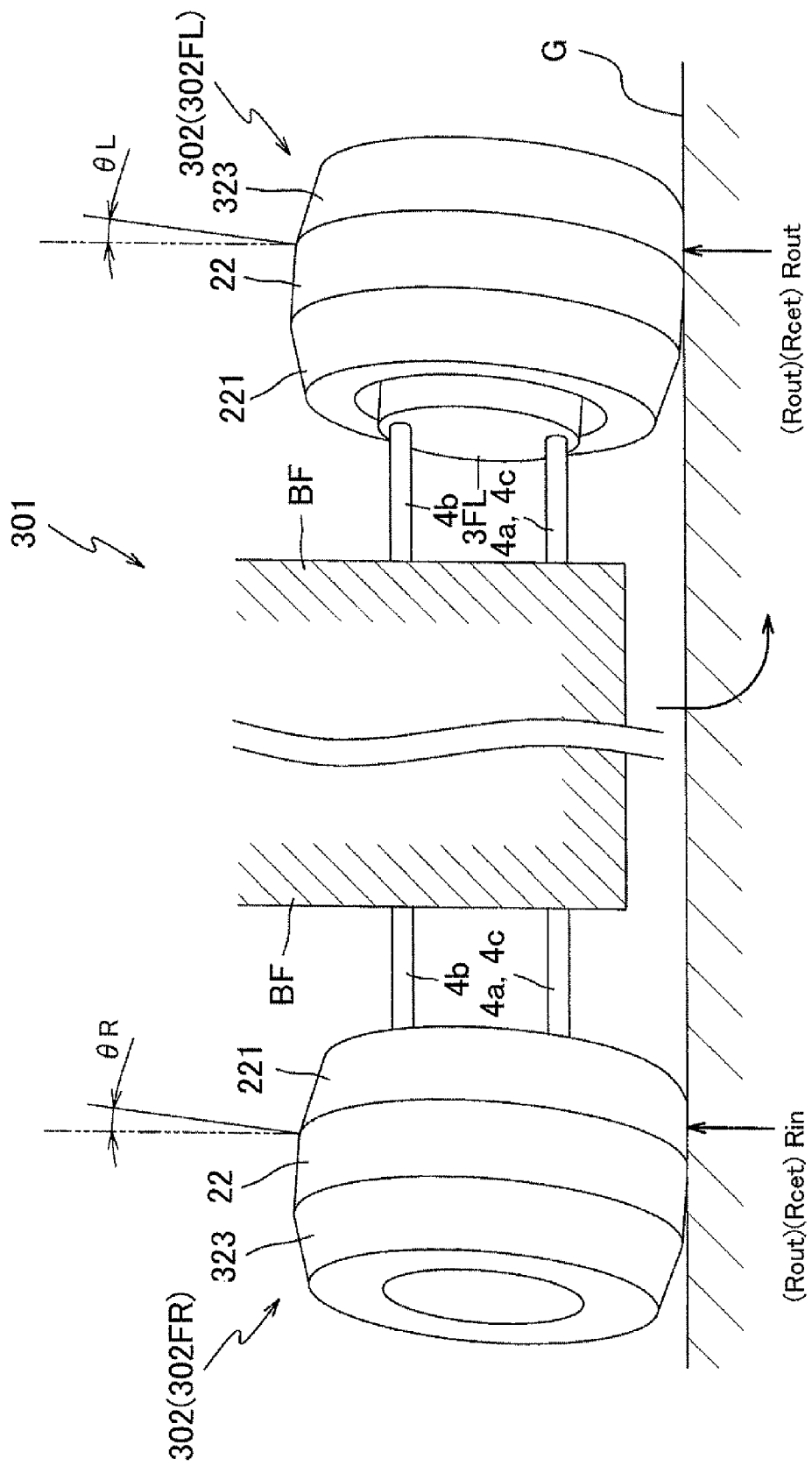
FIG. 13 is a schematic view showing a front view of a vehicle making a left turn in a state where right and left wheels are provided with steering angles for a left turn, a turning outer wheel (right front wheel) is provided with a negative camber, and a turning inner wheel (left wheel) is provided with a positive camber.
Figure 14:
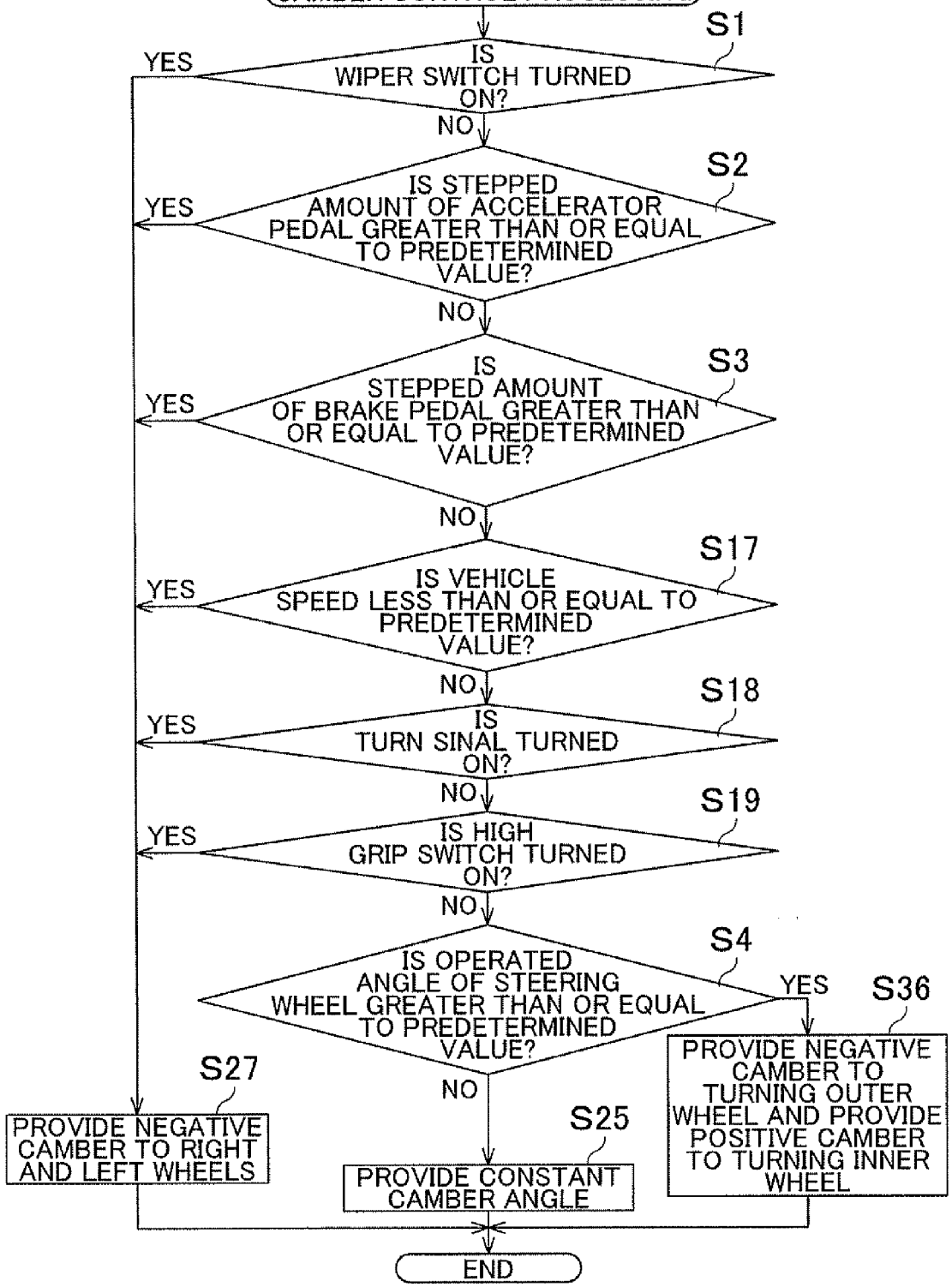
FIG. 14 is a flowchart showing a camber control process.

Next, a third embodiment will be described with reference to FIGS. 12 to 14. FIG. 12 is an upper view of a wheel 302 of the third embodiment. FIG. 13 is a schematic view showing a front view of a vehicle 301 making a left turn in a state where the right and left wheels 2 are provided with steering angles for a left turn, a turning outer wheel (right front wheel 202FR) is provided with the negative camber, and a turning inner wheel (left wheel 202FL) is provided with the positive camber.

In the first embodiment, the case where the outer diameters of the two treads 21 and 22 of the wheel 2 are constant in the width direction has been described, but the wheel 2 of the third embodiment is configured such that the outer diameter of a first tread 221 and the outer diameter of a third tread 323 are gradually decreased. Note that the same portions as those of the respective embodiments described above are denoted by the same reference numerals, and descriptions thereof will be omitted.

As shown in FIG. 12, the wheel 302 of the third embodiment includes the third tread 323, and the first tread 221 is arranged on the inside of the vehicle 301 (right side in FIG. 12), the third tread 323 is arranged on the outside of the vehicle 301 (left side in FIG. 12), and the second tread 22 is arranged between the first tread 221 and the third tread 323.

The third tread 323 is configured to have a characteristic of a higher grip force at least compared to the second tread 22, and the third tread 323 is configured such that the diameter gradually decreases from the second tread 22 side (right side in FIG. 12) toward the outside of the vehicle 301 (left side in FIG. 12), as shown in FIG. 12.

That is, the third tread 323 is set to have a lower value in the rubber hardness (lower hardness) at least compared to the second tread 22. In other words, at least the second tread 22 is set to have a higher value in the rubber hardness (higher hardness) compared to the third tread 323.

Accordingly, only the second tread 22 can be caused to contact the ground in a state where the first tread 221 and the third tread 323 do not contact the road surface G without providing a large camber angle to the wheel 302 (for example, even if the camber angle is set to 0°). Accordingly, the rolling resistance of the entire wheel 302 can be reduced to further improve the fuel saving performance.

Simultaneously, by the first tread 221 and the third tread 323 not contacting the ground and the second tread 22 contacting the ground at a smaller camber angle, the wear of the respective treads 221, 22, and 323 can be suppressed to achieve a longer duration of life.

In the case where the camber angle in the plus direction (positive camber) is provided to the wheel 302 to cause the third tread 323 to contact the ground, the ground pressure on the third tread 323 can be made uniform in the entire region in the width direction (right-left direction in FIG. 12) since the outer diameter of the third tread 323 is gradually decreased, and a concentration of the ground pressure on a tread end portion can be suppressed.

Thus, by using the third tread 323 having the high grip performance efficiently, the driving performance (such as the turning performance, the acceleration performance, the brake performance, and the driving stability in the rain) can further be improved, and the deflection wear can be suppressed to achieve a longer duration of life.

Next, a camber control process of the third embodiment will be described with reference to FIG. 14. FIG. 14 is a flowchart showing the camber control process. This process is a process executed repeatedly (for example, at intervals of 0.2 ms) by the CPU 71 while the power of the vehicle control device 100 is activated.

In the case where the CPU 71 determines that the operated angle of the steering wheel 54 does not reach the predetermined value in the process of S4 (S4: No), the tight turn is not instructed, and it is estimated that it is a moderate turn or a straight-ahead driving, and that the road surface is in a good state, the sudden acceleration or the sudden brake is not instructed, the generation of a large driving force or stopping the vehicle is not expected, the turning operation along with the right or left turn or the lane change is not expected, and the selection of the high grip performance is further not instructed from the processes of S1 to S3 and S17 to S19 (S1: No, S2: No, S3: No, 317: No, S18; No, S19: No).

Thus, in this case (S1: No, S2: No, S3: No, S17: No, S18: No, S19: No, S4: No), since it can be determined that it is not necessary to obtain the high grip performance as the performance of the wheel 302 and that it is preferable to obtain the fuel saving performance by the low rolling resistance, the constant camber angle is provided to the wheel 2 (S25) to terminate the camber process. Note that, in this embodiment, the constant camber angle is set to 0° (see the left front wheel 202FL shown in FIG. 10).

Accordingly, since only the second tread 22 can be caused to contact the ground in the state where the first tread 221 and the third tread 323 do not contact the road surface G, the rolling resistance of the entire wheel 302 can be reduced to further improve the fuel saving performance. In this case, by the first tread 221 and the third tread 323 not contacting the ground and the second tread 22 contacting the ground at the camber angle of 0°, the wear of the respective treads 221, 22, and 323 can be suppressed to achieve a longer duration of life.

In the case where it is determined that the operated angle of the steering wheel 54 is greater than or equal to the predetermined value in the process of S4 (S4: Yes), the tight turn is instructed by the driver, and the wheel 2 may slip to spin the vehicle 301. Thus, in this embodiment, the negative camber is provided to the turning outer wheel (right front wheel 202FR in FIG. 13) and the positive camber is provided (S36) to the turning inner wheel (left front wheel 202FL in FIG. 13) to terminate the camber process.

That is, as shown in FIG. 13, since the camber angles θR and θL are provided such that the right and left wheels 320 are both inclined to the inward side of the turn (right side in FIG. 13) in the process of S36, lateral forces can be applied to the respective right and left wheels 302 to use the lateral forces of the two wheels 302 as the turning force. Therefore, the turning performance can further be improved.

Figure 15:
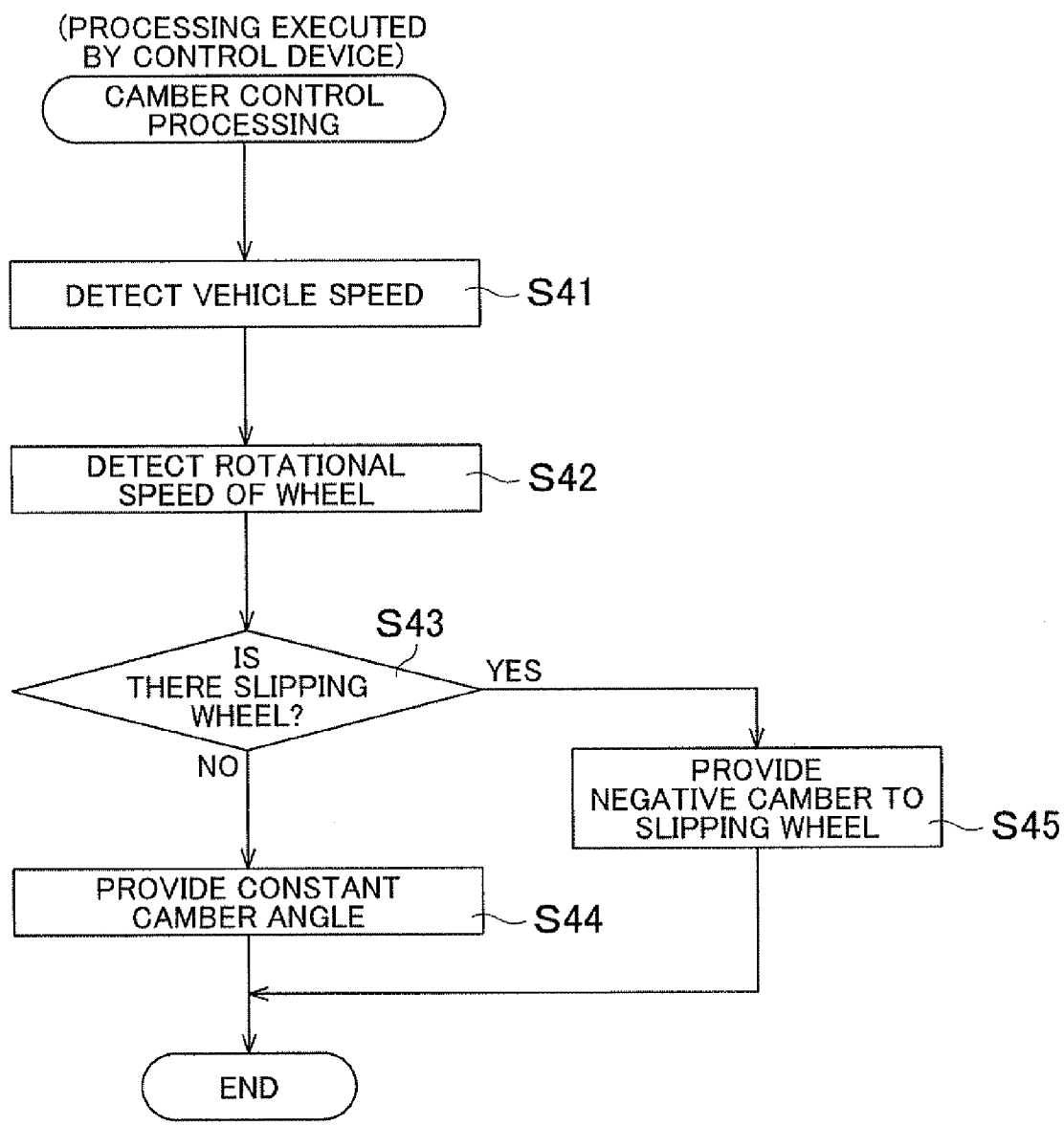
FIG. 15 is a flowchart showing a camber control process according to a fourth embodiment.

Next, a fourth embodiment will be described with reference to FIG. 15. FIG. 15 is a flowchart showing a camber control process of the fourth embodiment. This process is a process executed repeatedly (for example, at intervals of 0.2 ms) by the CPU 71 while the power of the vehicle control device 100 is activated.

In the first embodiment, the case where the camber angle of the wheel 2 is adjusted when, for example, the sudden acceleration or the tight turn is instructed by the driver has been described, but the fourth embodiment is configured such that the camber angle of the wheel 202 is adjusted in the case where any of the wheels 202 are slipping.

Note that the same portions as those of the respective embodiments described above are denoted by the same reference numerals, and the descriptions thereof will be omitted. In the fourth embodiment, a case where the vehicle 201 (wheel 202) of the second embodiment is controlled by the vehicle control device 100 will be described as an example.

In the process of S4 for the camber angle, the CPU 71 first detects the vehicle speed (S41), detects the rotational speed (circumferential speed) of the wheel 202 (S42), and determines whether any of the wheel 202 are slipping (S43) based on the vehicle speed and the circumferential speed of the wheel 202. Note that the vehicle speed and the circumferential speed of the wheel 202 are calculated by the vehicle speed sensor device 32 and the wheel rotation speed sensor device 35 as described above.

In the case where it is determined that there is no wheel 202 slipping, i.e., all of the wheels 202 are gripped to the road surface G to be driven, in the process of S43 as a result (S43: No), it can be determined that it is not necessary to obtain the high grip performance as the performance of the wheel 202 and that it is preferable to obtain the fuel saving performance by the low rolling resistance. Thus, the constant camber angle (0° in the same manner as in the case of the second embodiment) is provided to the wheel 202 (S44) to terminate the camber process.

Accordingly, since only the second tread 22 can be caused to contact the ground in the state where the first tread 221 does not contact the road surface G, the rolling resistance of the entire wheel 202 can be reduced to further improve the fuel saving performance. In this case, by the first tread 221 not contacting the ground and the second tread 22 contacting the ground at the camber angle of 0°, the wear of the two treads 221 and 22 can be suppressed to achieve a longer duration of life.

On the other hand, in the case where it is determined that there is a wheel 202 slipping in the process of the S43 (S43: Yes), the acceleration performance or the driving stability of the vehicle 201 may be affected. Thus, the negative camber is provided to the slipping wheel 202 (S45) to terminate the camber process.

Accordingly, in the same manner as the case of the first embodiment described above, the ground contact (ground pressure or ground contact area) Rin in the first tread 221 is increased and the ground contact (ground pressure or ground contact area) Rout in the second tread 22 is decreased (the ground contact (ground pressure or ground contact area) Rout becomes zero in this embodiment) Thus, a slip of the wheel 202 can be prevented and the acceleration performance and the driving stability of the vehicle 201 can be improved by leveraging the high grip performance of the first tread 221.

Next, a fifth embodiment will be described with reference to FIGS. 16 to 19. In the first embodiment, the case where the negative camber or the positive camber is provided to the wheel 2 and the camber angle has a constant value regardless of the driving state of the vehicle 1 has been described, but the fifth embodiment is configured such that the size of the camber angle provided to the wheel 2 increases or decreases according to the driving state of the vehicle 1.

Note that the same portions as those of the respective embodiments described above are denoted by the same reference numerals, and descriptions thereof will be omitted. In the fifth embodiment, a case where the vehicle 1 (wheel 2) of the first embodiment is controlled by a vehicle control device 500 will be described as an example.

Figure 16:
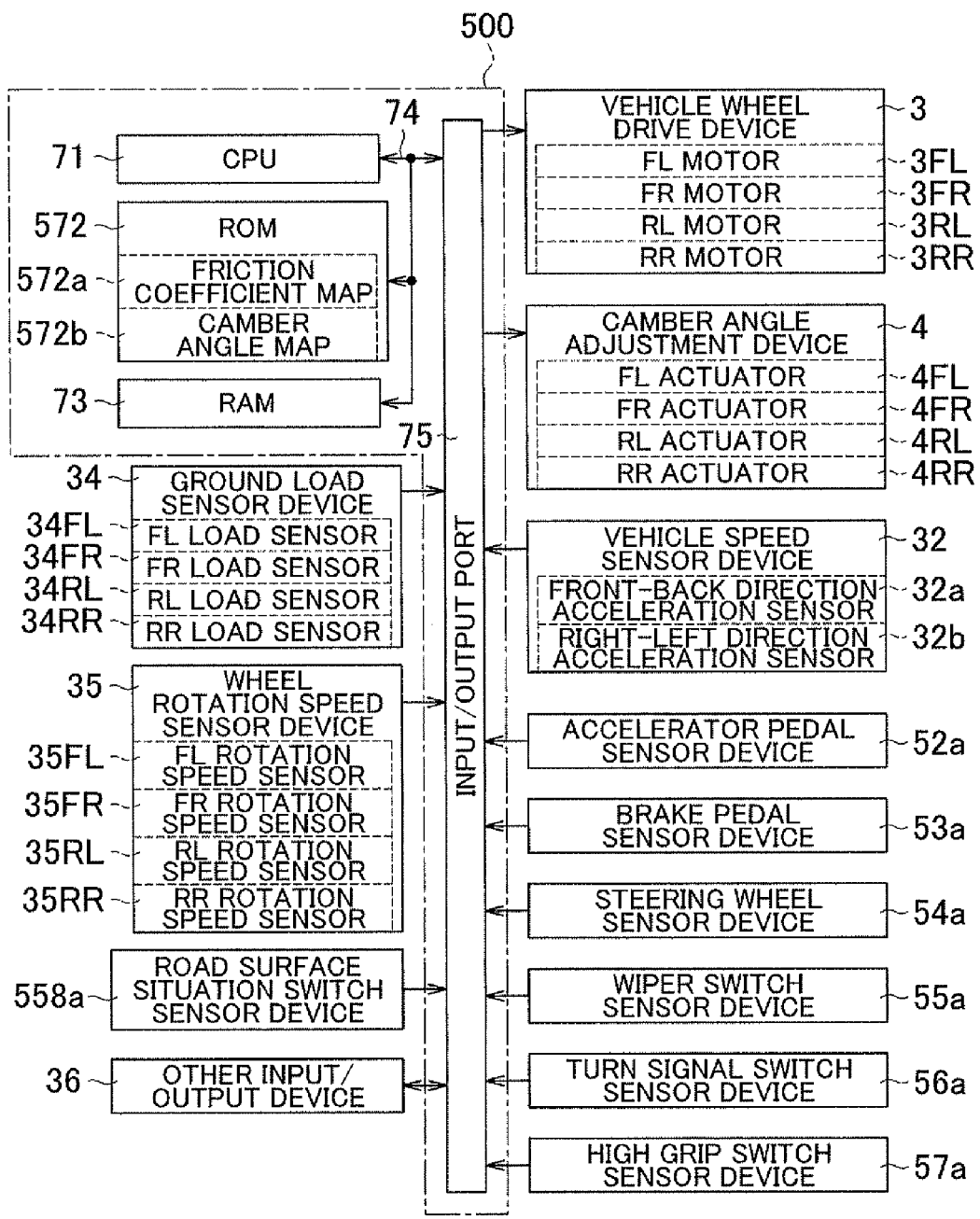
FIG. 16 is a block diagram showing the electrical configuration of a vehicle control device according to a fifth embodiment.

FIG. 16 is a block diagram showing the electrical configuration of the vehicle control device 500 according to the fifth embodiment. As shown in FIG. 16, the vehicle control device 500 includes the CPU 71, a ROM 572, and the RAM 73, which are connected to the input/output port 75 via the bus line 74. In the ROM 572 of the fifth embodiment, a friction coefficient map 572a and a camber angle map 572b are provided. Note that the details of the two maps 572a and 572b will be described later with reference to FIGS. 17 and 18.

A road surface situation switch sensor device 558a is a device for detecting the operated state of a road surface situation switch (not shown) and outputting the detection result thereof to the CPU 71, and mainly includes a positioning sensor (not shown) which detects the operated state (operated position) of the road surface situation switch and a control circuit (not shown) which processes the detection result of the positioning sensor to be output to the CPU 71.

Note that the road surface situation switch is an operation member operated by the driver, and the activation control of the camber angle adjustment device 4 is performed by the CPU 71 according to the operated state (operated position) thereof when the road surface situation switch is switched by the driver according to the situation of the road surface to run on. Specifically, the road surface situation switch is configured as a three-step (three-position) locker switch, in which a first position corresponds to a state where the road surface to run on is a dry paved road, a second position corresponds to a state where the road surface to run on is an unpaved road, and a third position corresponds to a state where the road surface to run on is a paved road in the rain.

Figure 17:
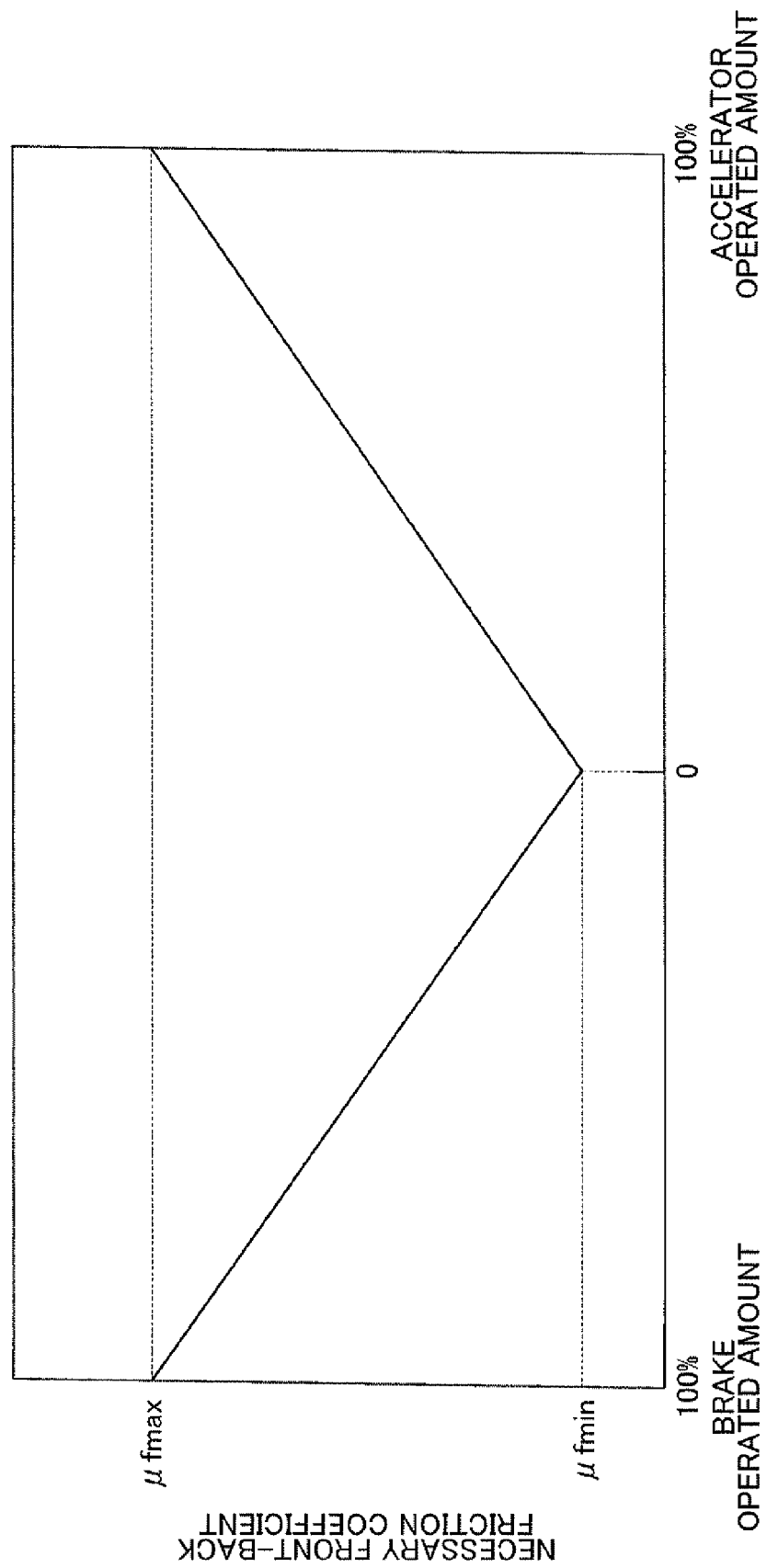
FIG. 17 is a schematic view showing the content of a friction coefficient map.

FIG. 17 is a schematic view showing the content of the friction coefficient map 572a. The friction coefficient map 572a is a map storing the relation of the stepped amounts (operated amounts) of the accelerator pedal 52a and the brake pedal 53 and a necessary front-back friction coefficient.

The CPU 71 calculates the friction coefficient to be exhibited by the wheel 2 (that is, the friction coefficient necessary for preventing a slip or a lock of the wheel 2) in the current driving state of the vehicle 1 based on the content of the friction coefficient map 572a. Note that the necessary front-back friction coefficient represented by the ordinate is a friction coefficient in the front-back direction of the vehicle (up-down direction in FIG. 1) necessary for preventing a slip or a lock of the wheel 2.

According to the friction coefficient map 572a, as shown in FIG. 17, the necessary front-back friction coefficient is set as a minimum value $\mu$ fmin in a state where the accelerator pedal 52 and the brake pedal 53 are not operated (stepped amounts of an accelerator and brake equal zero), the necessary front-back friction coefficient changes linearly in proportion to the operated amount (stepped amount) of the accelerator pedal 52 or the brake pedal 53, and the necessary front-back friction coefficient is set as a maximum value $\mu$ fmax in a state where the operated amount of the accelerator pedal 52 or the brake pedal 53 is maximum (accelerator operated amount is 100%).

Figure 18:
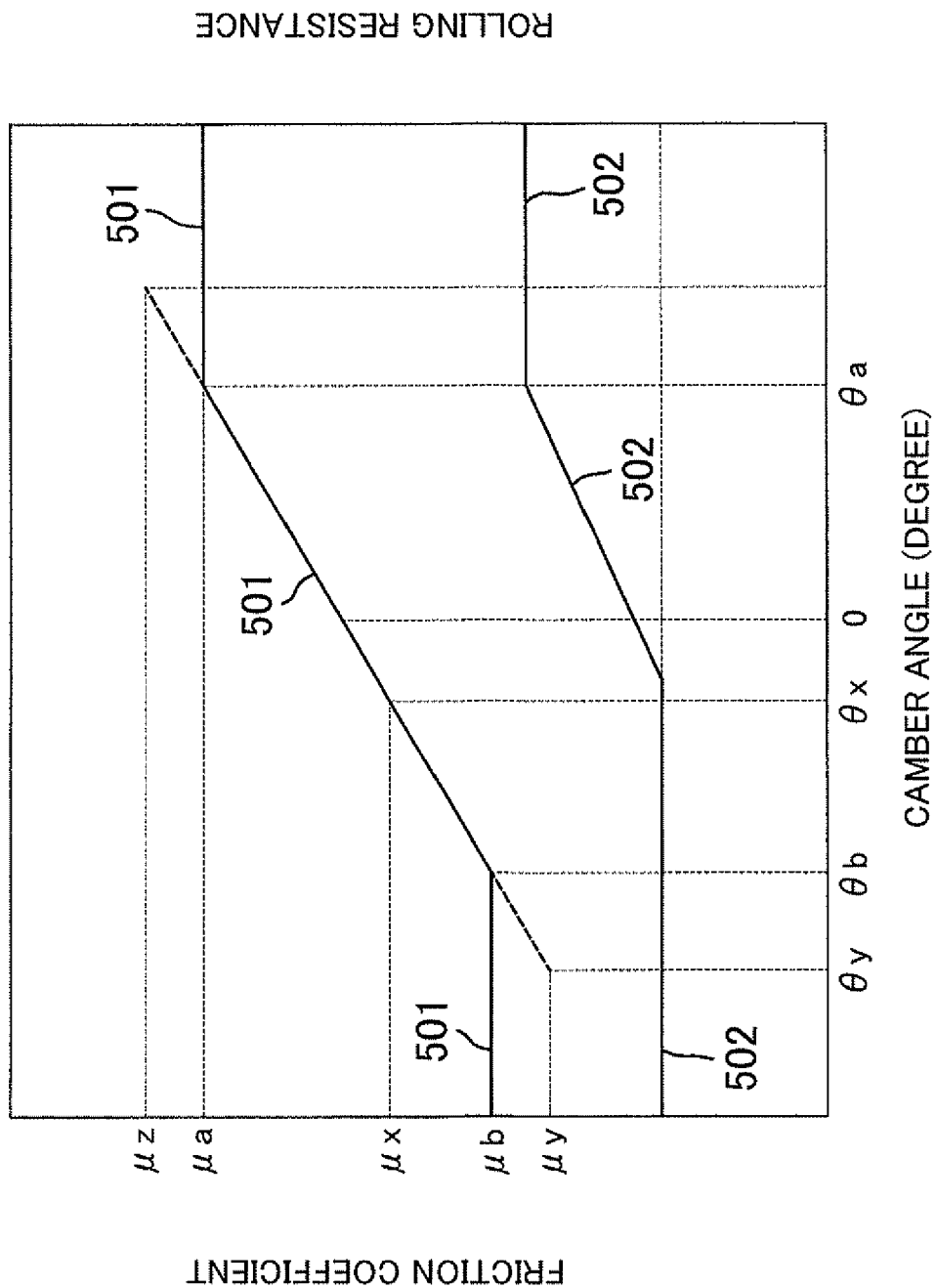
FIG. 18 is a schematic view showing the content of a camber angle map.

FIG. 18 is a schematic view showing the content of the camber angle map 572b. The camber angle map 572b is a map storing the relation of the friction coefficient as well as the rolling resistance with the camber angle of the wheel 2, and stores values measured in a preliminary test using the wheel 2.

The CPU 71 calculates the camber angle to be provided to the wheel 2 based on the content of the camber angle map 572b.

Note that, in FIG. 18, a solid line 501 corresponds to the friction coefficient, and a solid line 502 corresponds to the rolling resistance. Regarding the camber angle represented by the abscissa, the right side in FIG. 18 ($\theta$a side with respect to a 0-degree angle) corresponds to the negative camber (that is, the side on which the ground contact (ground pressure or ground contact area) in the first tread 21 with the high grip characteristic increases, see FIG. 5), and the left side in FIG. 18 ($\theta$b side with respect to the 0-degree angle) corresponds to the positive camber (that is, the side on which the ground contact (ground pressure or ground contact area) in the second tread 22 with the low rolling resistance increases, see FIG. 6).

The camber angle map 572b stores three types of maps corresponding to three types of the operated states of the road surface situation switch described above. In FIG. 18, only one type of the map (dry paved road map) is shown as a representative example and the other two types are omitted for simplification and an easier understanding of the drawing.

That is, the camber angle map 572b stores three types of maps of the dry paved road map, an unpaved road map, and a paved-road-in-rain map. The CPU 71 detects the operated state of the road surface situation switch, reads the dry paved road map in the case where the dry paved road is instructed, the unpaved road map in the case where the unpaved road is instructed, or the paved-road-in-rain map in the case where the paved road in the rain is instructed, and performs the activation control of the camber angle adjustment device 4 based on the content thereof.

According to the camber angle map 572b, as shown in FIG. 18, when there is a change from a state where the camber angle is 0 degrees (that is, a state where the first tread 21 and the second tread 22 contact the ground equally) toward the negative camber side ($\theta$a side), the friction coefficient (and the rolling resistance) is set to gradually increase as the ground contact (ground pressure or ground contact area) in the first tread 21 with the high grip characteristic gradually increases (the ground contact (ground pressure or ground contact area) in the second tread 22 with the low rolling resistance gradually decreases) along with the change.

When the camber angle reaches the $\theta$a (hereinafter referred to as "second camber angle $\theta$a"), the friction coefficient reaches a maximum value $\mu$a by the second tread 22 departing from the road surface to run on to cause a state where only the first tread 21 contacts the road surface to run on.

Note that, even if the camber angle changes from the second camber angle θa toward the negative camber side, the friction coefficient barely changes and the friction coefficient is maintained at the maximum value μa since the second tread 22 is already distant from the road surface to run on. The rolling resistance changes in the same manner to become a maximum value at the second camber angle θa and to be maintained at approximately a constant value thereafter.

On the other hand, as shown in FIG. 18, when there is a change from a state where the camber angle is 0 degrees (that is, the state where the first tread 21 and the second tread 22 contact the ground equally) toward the positive camber side (θb side), the friction coefficient (and the rolling resistance) is set to gradually decrease as the ground contact (ground pressure or ground contact area) in the second tread 22 with the low rolling resistance gradually increases (the ground contact (ground pressure or ground contact area) in the first tread 21 with the high grip characteristic gradually decreases) along with the change.

When the camber angle reaches the θb (hereinafter referred to as "first camber angle θb"), the friction coefficient reaches a minimum value μb by the first tread 21 departing from the road surface to run on to cause a state where only the second tread 22 contacts the road surface to run on.

Note that, even if the camber angle changes from the first camber angle θb toward the positive camber side, the friction coefficient barely changes and the friction coefficient is maintained at the minimum value μb since the first tread 21 is already distant from the road surface to run on. The rolling resistance changes in the same manner to become a minimum value at the first camber angle θb and to be maintained at approximately a constant value thereafter.

The unpaved road map and the paved-road-in-rain map omitted in FIG. 18 have characteristics obtained by a parallel shift of the solid lines in the dry paved road map in a direction of reducing the friction coefficient. That is, the camber angle at which the friction coefficient becomes a minimum value or a maximum value is the first camber angle θa or the second camber angle θb in both maps.

Figure 19:
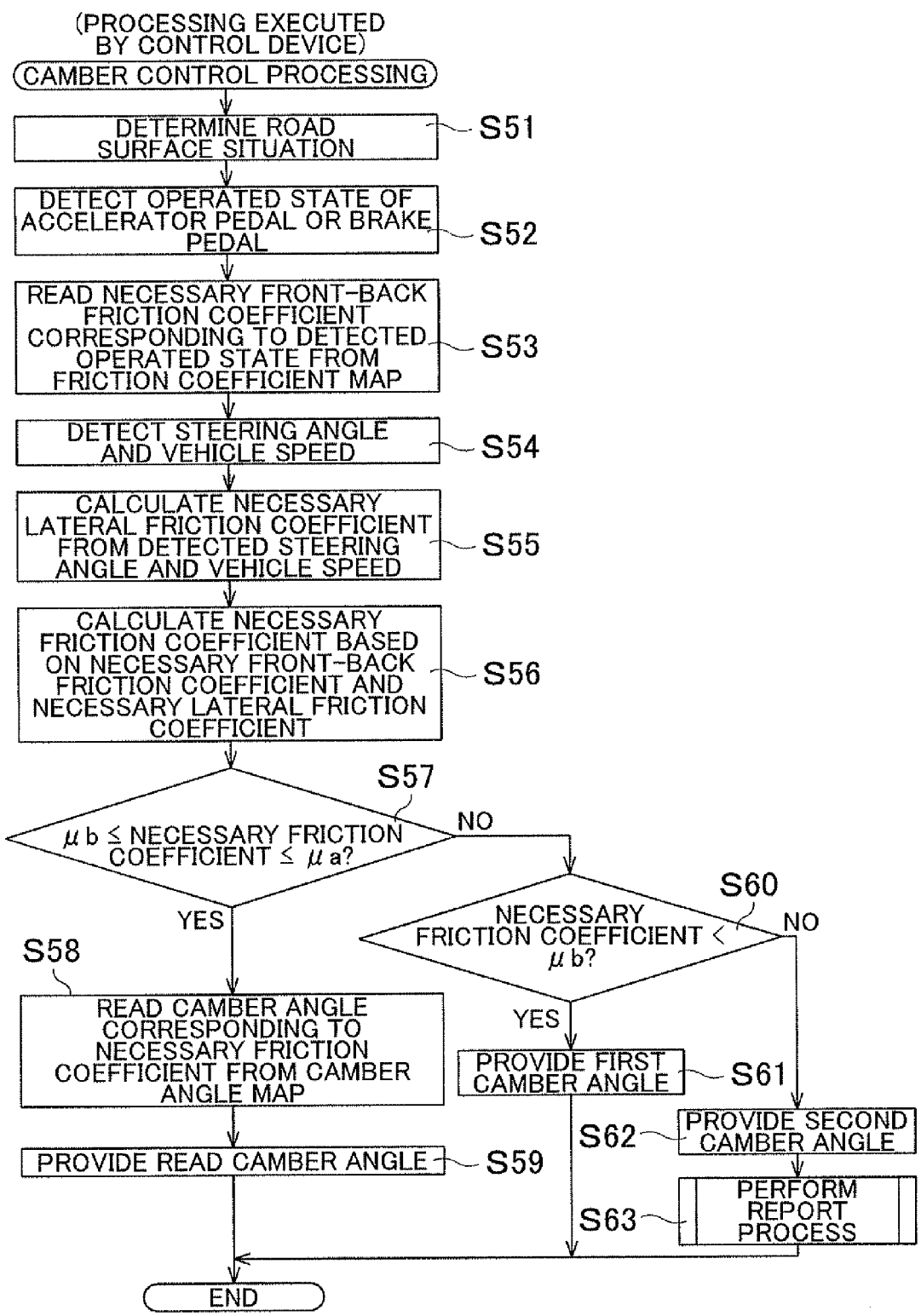
FIG. 19 is a flowchart showing a camber control process.

Next, referring to FIG. 19, a camber control process of the fifth embodiment will be described. FIG. 19 is a flowchart showing the camber control process. This process is a process executed repeatedly (for example, at intervals of 0.2 ms) by the CPU 71 while the power of the vehicle control device 500 is activated.

Regarding the camber control process, the CPU 71 first determines the road surface situation (S51). This process is performed by checking the detection result of the road surface situation switch sensor device 558a (see FIG. 16), and acquiring the operated state of the road surface situation switch caused by the driver. That is, as described above, the CPU 71 determines the road surface situation as the dry paved road in the case where the operated position of the road surface situation switch is confirmed to be in the first position, determines it as the unpaved road when in the second position, and determines it as the paved road in the rain when in the third position.

Next, in the process of S52, the operated states of the accelerator pedal 52 and the brake pedal 53 are detected (S52), and the necessary front-back friction coefficient corresponding to the detected operated states is read from the friction coefficient map 572a (see FIG. 17) (S53). Accordingly, the friction coefficient in the front-back direction of the vehicle (up-down direction in FIG. 1) necessary for preventing a slip or a lock of the wheel 2 can be obtained.

Next, in the process of S54, the steering angle of the wheel 2 and the ground speed (vehicle speed) of the vehicle 1 are detected (S54), and the necessary lateral friction coefficient is calculated from the detected steering angle and vehicle speed (S55). Note that, as described above, the CPU 71 detects the steering angle of the wheel 2 and the ground speed of the vehicle 1 based on the detection results of the steering wheel sensor device 54a and the vehicle speed sensor device 32.

The necessary lateral friction coefficient is a friction coefficient in the right-left direction of the vehicle (right-left direction in FIG. 1) necessary for preventing a slip of the wheel 2 in the vehicle 1 during a turn, and is calculated as follows.

That is, the relation among a steering angle σ of the wheel 2, an Ackerman turning radius R0, and a wheelbase I of the vehicle 1 can be represented as $\tan \sigma = I/R0$. This relational expression can be approximated as $\sigma = I/R0$ in the case where the steering angle σ is a minute angle. By modifying this to represent the Ackerman turning radius R0, $R0 = I/\sigma$ can be obtained.

The relation between an actual turning radius R of the vehicle 1 and a ground speed (vehicle speed) v of the vehicle 1 is represented as $R/R0 = 1 + K \cdot v2$ from the steering characteristic of the vehicle 1 using a stability factor K measured for the vehicle 1. By modifying this to represent the actual turning radius R and a substitution using the obtained Ackerman turning radius R0, $R = I(1+K \cdot v2)/\sigma$ can be obtained.

A centrifugal force F applied to the vehicle 1 during the turn is represented as $F = m \cdot v2/R$, where m is the weight of the vehicle 1. By a substitution using the obtained actual turning radius R, $F = m \cdot v2 \cdot \sigma/(I(1+K \cdot v2))$ can be obtained. Since a value greater than the centrifugal force F suffices as the friction force for avoiding a slip of the wheel 2 in the lateral direction (right-left direction of the vehicle 1), a necessary lateral friction coefficient μw can be represented as $\mu w = F/m = v2 \cdot \sigma/(I(1+K \cdot v2))$ by dividing the centrifugal force F by the weight m.

After the necessary front-back friction coefficient and the necessary lateral friction coefficient have been obtained in the processes of S53 and S55, the necessary friction coefficient is calculated based on the necessary front-back friction coefficient and the necessary lateral friction coefficient (that is, as a resultant force of vectors in the front-back direction and the right-left direction of the vehicle 1) (S56), and the process proceeds to S57.

In the process of S57, the necessary friction coefficient calculated in the process of S56 and the maximum value μa and the minimum value μb of the friction coefficient which can be exhibited by the wheel 2 are compared to determine whether the necessary friction coefficient is greater than or equal to the minimum value μb and less than or equal to the maximum value μa (S57).

Note that the maximum value μa and the minimum value μb of the friction coefficient which can be exhibited by the wheel 2 are read from the camber angle map 572b (see FIG. 18), as described above. In this case, the CPU 71 selects the map according to the road surface situation determined in the process of S51 from the three types of the maps, and reads the maximum value μa and the minimum value μb based on the content of the selected map.

In the case where it is determined that the necessary friction coefficient is greater than or equal to the minimum value μb and less than or equal to the maximum value μa as a result of the determination in S57 (S57: Yes), the camber angle corresponding to the necessary friction coefficient (that is, at which the friction coefficient becomes equivalent to the necessary friction coefficient) is read from the camber angle map 572b

(S58) and the read camber angle is provided to the wheel 2 (S59) to terminate the camber control process.

Specifically, in this case, the necessary friction coefficient calculated in the process of S56 is μx and the relation satisfies μb≦μx≦μa (S57: Yes), for example. Thus, the camber angle corresponding to the necessary friction coefficient μx is read as θx from the camber angle map 572b shown in FIG. 18 (S58), and the read camber angle θx is provided to the wheel 2 (S59).

Accordingly, since the friction coefficient can be controlled such that the change of the friction coefficient exhibited by the wheel 2 becomes minimum, the rolling resistance can be suppressed to a smaller value to achieve further fuel saving while ensuring the acceleration/brake performance or the turning performance as necessary.

On the other hand, in the case where it is determined that the necessary friction coefficient is not greater than or equal to the minimum value μb and less than or equal to maximum value μa in the process of S57 (S57: No), whether the necessary friction coefficient is smaller than the minimum value μb is determined next (S60). In the case where it is determined that the necessary friction coefficient is smaller than the minimum value μb as a result (S60: Yes), the first camber angle is provided to the wheel 2 (S61) to terminate the camber control process.

Specifically, in this case, a necessary friction coefficient μy calculated in the process of S56 is smaller than the minimum value μb (μy<μb) (S60; Yes). Instead of reading the camber angle corresponding to the necessary friction coefficient μy as, for example, θy from the camber angle map 572b shown in FIG. 18 as described above, the first camber angle θb is determined as the camber angle to be provided to the wheel 2 and is provided to the wheel 2 in this case (S61).

In this manner, in this embodiment, it is determined that a further reduction in the rolling resistance (achievement in fuel saving driving) cannot be expected even if a camber angle of a greater absolute value than the first camber angle θb is provided to the wheel 2 in the case where the necessary friction coefficient μy calculated in the process of S56 is less than the minimum value μb of the friction coefficient which can be exhibited by the wheel 2, and a smallest angle (angle closest to 0 degrees) within a range where the minimum value μb can be exhibited, i.e., the first camber angle θb, is provided to the wheel 2, as shown in FIG. 18. Accordingly, an unnecessary increase of the camber angle can be avoided to ensure the driving stability of the vehicle 1.

On the other hand, in the case where it is not determined that the necessary friction coefficient is smaller than the minimum value μb in the process of S60 (S60: No), the necessary friction coefficient is greater than maximum value μa. Thus, in this case (S60: No), the second camber angle is provided to the wheel 2 (S62) and a report process (S63) is executed to terminate the camber control process.

Specifically, in this case, a necessary friction coefficient μz calculated in the process of S56 is greater than the maximum value μa (μb<μz) (S60: No). Instead of reading the camber angle corresponding to the necessary friction coefficient μz as, for example, θz from the camber angle map 572b shown in FIG. 18 as described above, the second camber angle θa is determined as the camber angle to be provided to the wheel 2 and is provided to the wheel 2 in this case (S62).

In this manner, in this embodiment, it is determined that a further increase in the friction coefficient (improvement in the grip performance) cannot be expected even if a camber angle of a greater absolute value than the second camber angle θa is provided to the wheel 2 in the case where the necessary friction coefficient μz calculated in the process of S56 exceeds the maximum value μa of the friction coefficient which can be exhibited by the wheel 2, and a smallest angle (angle closest to 0 degrees) within a range where the maximum value μa can be exhibited, i.e., the second camber angle θa, is provided to the wheel 2, as shown in FIG. 18. Accordingly, an unnecessary increase of the camber angle can be avoided to ensure the driving stability of the vehicle 1.

In the report process (S63), the driver is informed of a slip or a lock of the wheel 2 (or a possibility thereof) due to a sudden acceleration or a sudden brake by an output from a speaker and a display of a monitor device. Note that, in the case where the vehicle 1 is in an acceleration state, means to reduce the speed of the vehicle 1 (for example, applying a brake to the vehicle 1 by activating a brake device or reducing the output of an engine or the like) may be taken in the process of S63. Accordingly, the speed of the vehicle 1 can be reduced mechanically without depending on the operation of the driver, thus contributing to an improvement in security.

Next, referring to FIG. 20, a sixth embodiment will be described. In the fifth embodiment, the case where the first tread 21 and the second tread 22 are provided to the wheel 2 has been described. In the sixth embodiment, the first tread 221, the second tread 22, and the third tread 323 are provided to the wheel 302 in the same manner as the case of the third embodiment described above.

Note that the same portions as those of the respective embodiments described above are denoted by the same reference numerals, and descriptions thereof will be omitted. In the sixth embodiment, a case where the vehicle 301 (wheel 302, see FIG. 12 or 13) of the third embodiment is controlled by the vehicle control device 500 of the fifth embodiment will be described as an example. Note that, in the sixth embodiment, the configuration of the camber angle map differs from that of the fifth embodiment as described later.

Figure 20:
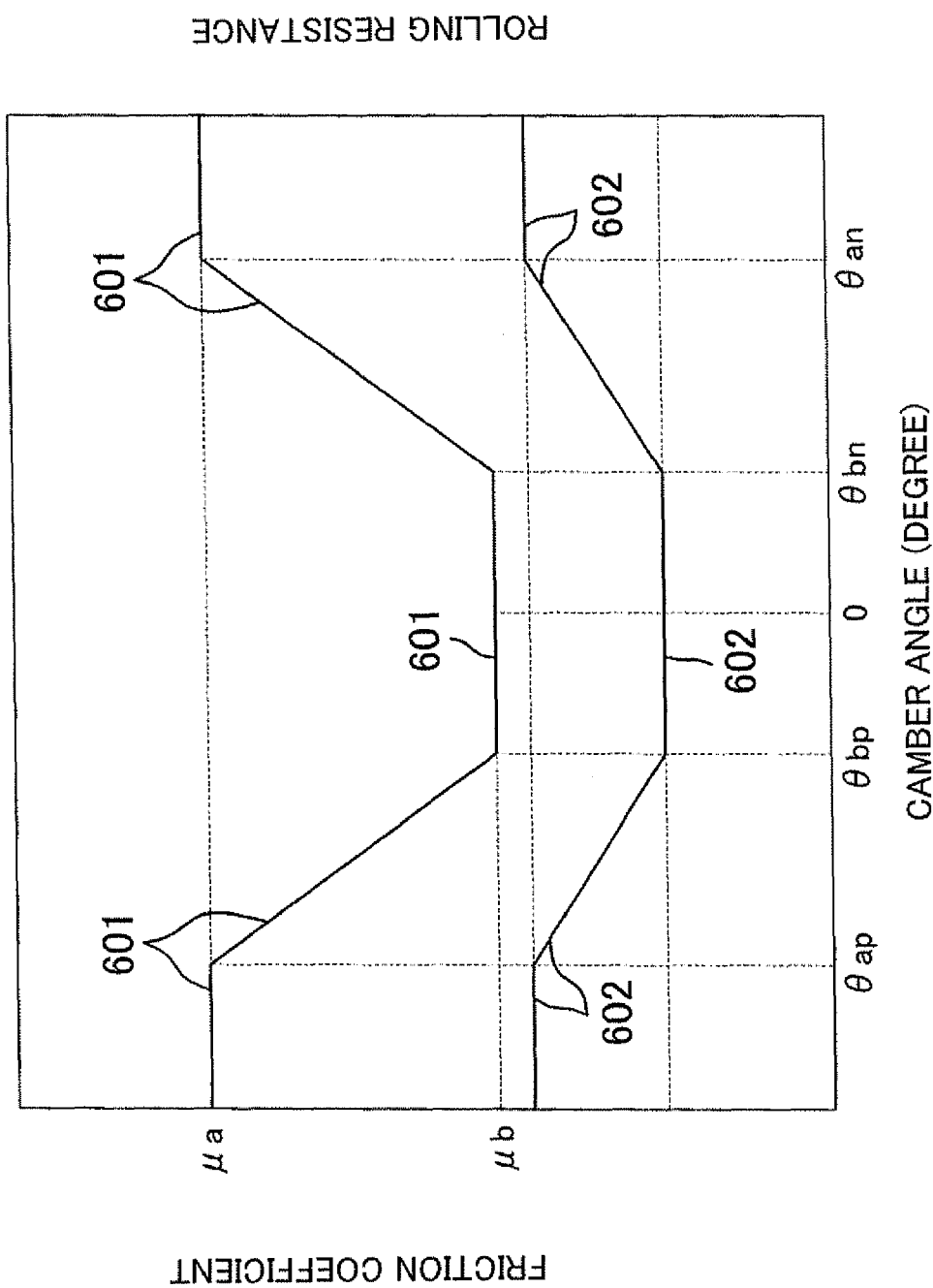
FIG. 20 is a schematic view showing the content of a camber angle map according to a sixth embodiment.

FIG. 20 is a schematic view showing the content of the camber angle map according to the sixth embodiment. The camber angle map is a map storing the relation of the friction coefficient as well as the rolling resistance with the camber angle of the wheel 302, and stores values measured in a preliminary test using the wheel 302. In the same manner as the fifth embodiment described above, the CPU 71 calculates the camber angle to be provided to the wheel 302 based on the content of the camber angle map.

Note that, in FIG. 20, a solid line 601 corresponds to the friction coefficient, and a solid line 602 corresponds to the rolling resistance. The camber angle map according to the sixth embodiment stores the three types of maps corresponding to the three types of operated states of the road surface situation switch, in the same manner as the case of the fifth embodiment. In FIG. 20, only one type of the map (dry paved road map) is shown as a representative example and the other two types are omitted for simplification and an easier understanding of the drawing.

According to the camber angle map of the sixth embodiment, in the case where there is a change from a state where the camber angle is 0 degrees (that is, a state where only the second tread 22 contacts the ground and the first tread 221 and the third tread 323 are distant from the road surface to run on) toward the negative camber side (θbn side), the friction coefficient is maintained at the minimum value μb until the camber angle becomes θbn since only the second tread 22 contacts the ground and the first tread 221 (and the third tread 323) is distant from the ground, as shown in FIG. 20. Note that the same applies to the rolling resistance, and the minimum value is maintained within this zone.

When the camber angle changes from θbn toward the negative camber side (θan side), the friction coefficient (and the rolling resistance) gradually increases as the ground contact (ground pressure or ground contact area) in the first tread 21 with the high grip characteristic gradually increases (the ground contact (ground pressure or ground contact area) in the second tread 22 with the low rolling resistance gradually decreases) along with the change.

Then, when the camber angle reaches θan (hereinafter referred to as "third camber angle θan"), the friction coefficient reaches the maximum value μa by the second tread 22 departing from the road surface to run on to cause a state where only the first tread 221 contacts the road surface to run on.

In this case, even if the camber angle further changes from the third camber angle θan toward the negative camber side (right side in FIG. 20), the friction coefficient barely changes and the friction coefficient is maintained at the maximum value μa since the second tread 22 is already distant from the road surface to run on and only the first tread 221 contacts the road surface to run on. The rolling resistance changes in the same manner to become a maximum value at the point where the camber angle reaches the third camber angle θan and to be maintained at approximately a constant value thereafter.

In the same manner, in the case where there is a change from the state where the camber angle is 0 degrees (that is, the state where only the second tread 22 contacts the ground and the first tread 221 and the third tread 323 are distant from the road surface to run on) toward the positive camber side (θbp side), the friction coefficient is maintained at the minimum value μb until the camber angle becomes θbp since only the second tread 22 contacts the ground and the third tread 323 (and the first tread 221) is distant from the ground, as shown in FIG. 20. Note that the same applies to the rolling resistance, and the minimum value is maintained within this zone.

When the camber angle changes from θbp toward the positive camber side (θap side), the friction coefficient (and the rolling resistance) gradually increases as the ground contact (ground pressure or ground contact area) in the third tread 323 with the high grip characteristic gradually increases (the ground contact (ground pressure or ground contact area) in the second tread 22 with the low rolling resistance gradually decreases) along with the change.

Then, when the camber angle reaches θap (hereinafter referred to as "fourth camber angle θap"), the friction coefficient reaches the maximum value μa by the second tread 22 departing from the road surface to run on to cause a state where only the third tread 323 contacts the road surface to run on.

In this case, even if the camber angle further changes from the fourth camber angle θap toward the positive camber side (left side in FIG. 20), the friction coefficient barely changes and the friction coefficient is maintained at the maximum value μa since the second tread 22 is already distant from the road surface to run on and only the third tread 323 contacts the road surface to run on. The rolling resistance changes in the same manner to become the maximum value at the point where the camber angle reaches the fourth camber angle θap and to be maintained at approximately the constant value thereafter.

Figure 21:
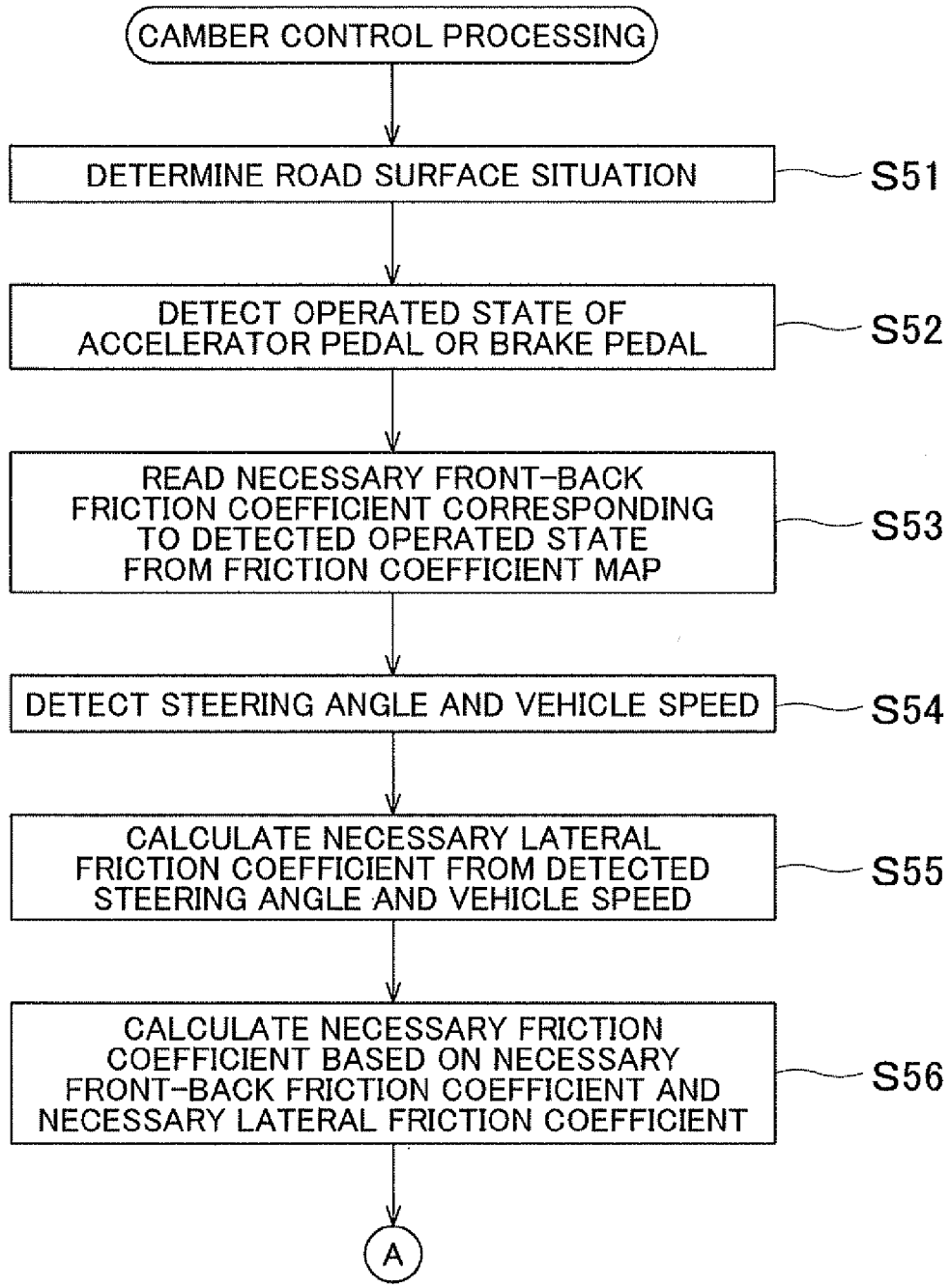
FIG. 21 is a flowchart showing a camber control process.

Next, referring to FIG. 21, a camber control process of the sixth embodiment will be described. FIG. 21 is a flowchart showing the camber control process. This process is a process executed repeatedly (for example, at intervals of 0.2 ms) by the CPU 71 while the power of the vehicle control device 500 is activated.

In the sixth embodiment, regarding the camber control process, the CPU 71 determines the road surface situation (S51), then detects the operated states of the accelerator pedal 52 and the brake pedal 53 (S52), and reads the necessary front-back friction coefficient corresponding to the detected operated states from the friction coefficient map 572a (see FIG. 17) (S53), in the same manner as the case of the fifth embodiment.

After the process of S53 has been executed, the steering angle of the wheel 302 and the ground speed (vehicle speed) of the vehicle 1 are detected (S54), the necessary lateral friction coefficient is calculated from the detected steering angle and vehicle speed (S55), the necessary friction coefficient is then calculated based on the necessary front-back friction coefficient and the necessary lateral friction coefficient (S56), and whether the calculated necessary friction coefficient is greater than or equal to the minimum value μb and less than or equal to maximum value μa is determined (S57).

In the case where it is determined that the necessary friction coefficient is greater than or equal to the minimum value μb and less than or equal to maximum value μa as a result (S57: Yes), whether the operated angle of the steering wheel 54 is greater than or equal to a predetermined value, i.e., whether a turn of a predetermined level or greater (tight turn) is instructed by the driver, is determined next (S601).

In the case where it is determined that the operated angle of the steering wheel 54 is greater than or equal to the predetermined value as a result (S601: Yes), it is determined that the tight turn is instructed by the driver and that there is a possibility of a slip. Thus, in this embodiment, a camber angle corresponding to the necessary friction coefficient (that is, at which the friction coefficient becomes equivalent to the necessary friction coefficient) and which provides a negative camber to the turning outer wheel and a positive camber to the turning inner wheel is read from the camber angle map shown in FIG. 20 (S658), and the read camber angle is provided to the wheel 302 (S59) to terminate the camber control process.

Accordingly, in the same manner as the case of the third embodiment, the camber angle can be provided such that the right and left wheels 320 are both inclined to the inward side of the turn (see FIG. 13). As a result, lateral forces can be applied to the respective right and left wheels 302 to use the lateral forces of the two wheels 302 as the turning force and further improve the turning performance.

On the other hand, in the case where it is determined that the operated angle of the steering wheel 54 does not reach the predetermined value in the process of S601 (S601; No), it is determined that the tight turn is not instructed and that it is a moderate turn or a straight-ahead driving. Thus, in this embodiment, a camber angle corresponding to the necessary friction coefficient (that is, at which the friction coefficient becomes equivalent to the necessary friction coefficient) and which provides a negative camber to both the right and left wheels is read from the camber angle map shown in FIG. 20 (S602), and the read camber angle is provided to the wheel 302 (S59) to terminate the camber control process. Accordingly, a stable posture of the vehicle 301 can be maintained.

On the other hand, in the case where it is determined that the necessary friction coefficient is not greater than or equal to the minimum value μb and less than or equal to maximum value μa in the process of S57 (S57: No), whether the necessary friction coefficient is smaller than the minimum value μb is determined next (S60). In the case where it is determined that the necessary friction coefficient is smaller than the minimum value μb (S60: Yes), a constant camber angle is provided to the wheel 302 (S661) to terminate the camber control process.

Note that, in this embodiment, the constant camber angle is set to 0 degrees. Accordingly, since only the second tread 22 can be caused to contact the ground in a state where the first tread 221 and the third tread 323 do not contact the road surface to run on, the rolling resistance of the entire wheel 302 can be reduced to further improve the fuel saving performance. In this case, by the first tread 221 and the third tread 323 not contacting the ground and the second tread 22 contacting the ground at the camber angle of 0°, the wear of the respective treads 221, 22, and 323 can be suppressed to achieve a longer duration of life. Further, an unnecessary increase of the camber angle can be avoided to ensure the driving stability of the vehicle 1.

On the other hand, in the case where it is not determined that the necessary friction coefficient is smaller than the minimum value μb, i.e., the necessary friction coefficient is greater than the maximum value μa in the process of S60 (S60: No), whether the operated angle of the steering wheel 54 is greater than or equal to a predetermined value, i.e., whether a turn of a predetermined level or greater (tight turn) is instructed by the driver, is determined next (S603).

In the case where it is determined that the operated angle of the steering wheel 54 is greater than or equal to the predetermined value as a result (S604: Yes), it is determined that the tight turn is instructed by the driver and that there is a possibility of a slip. Thus, in this embodiment, the third camber angle described above is provided to the turning outer wheel and the fourth camber angle described above is provided to the turning inner wheel (S605).

Accordingly, the camber angle can be provided such that the negative camber is provided to the turning outer wheel, the positive camber is provided to the turning inner wheel, and the right and left wheels 320 are both inclined to the inward side of the turn in the same manner as the case of the third embodiment (see FIG. 13). As a result, lateral forces can be applied to the respective right and left wheels 302 to use the lateral forces of the two wheels 302 as the turning force and further improve the turning performance.

On the other hand, in the case where it is determined that the operated angle of the steering wheel 54 does not reach the predetermined value in the process of S603 (S603: No), it is determined that the tight turn is not instructed and that it is a moderate turn or a straight-ahead driving. Thus, in this embodiment, the third camber angle is provided to both the right and left wheels (S604). Accordingly, the negative camber can be provided to both the right and left wheels to maintain the stable posture of the vehicle 301.

In this embodiment, in the same manner as the case of the fifth embodiment described above, it is determined that a further increase in the friction coefficient (improvement in the grip performance) cannot be expected even if a camber angle of a greater absolute value than the third or fourth camber angle is provided to the wheel 302 in the case where the necessary friction coefficient calculated in the process of S56 exceeds the maximum value μa of the friction coefficient which can be exhibited by the wheel 2, and a smallest angle (angle closest to 0 degrees) within a range where the maximum value μa can be exhibited, i.e., the third or fourth camber angle, is provided to the wheel 302. Accordingly, an unnecessary increase of the camber angle can be avoided to ensure the driving stability of the vehicle 301.

After the process of S604 or S605 has been executed, the report process (S63) is executed to terminate the camber control process.

Next, referring to FIGS. 22 and 23, a seventh embodiment will be described. Note that the same portions as those of the respective embodiments described above are denoted by the same reference numerals, and descriptions thereof will be omitted. In the seventh embodiment, a case where the vehicle 1 (wheel 2) of the first embodiment is controlled by a vehicle control device 700 will be described as an example.

In this embodiment, the positive camber is normally provided to the wheel 2 such that the second tread 22 with the low rolling resistance is used, while the negative camber is provided such that the first tread 21 with the high grip characteristic is used in the case where a predetermined condition is satisfied. Accordingly, compatibility can be provided between the fuel saving driving and improvement in the acceleration/brake performance and the turning performance.

Figure 22:
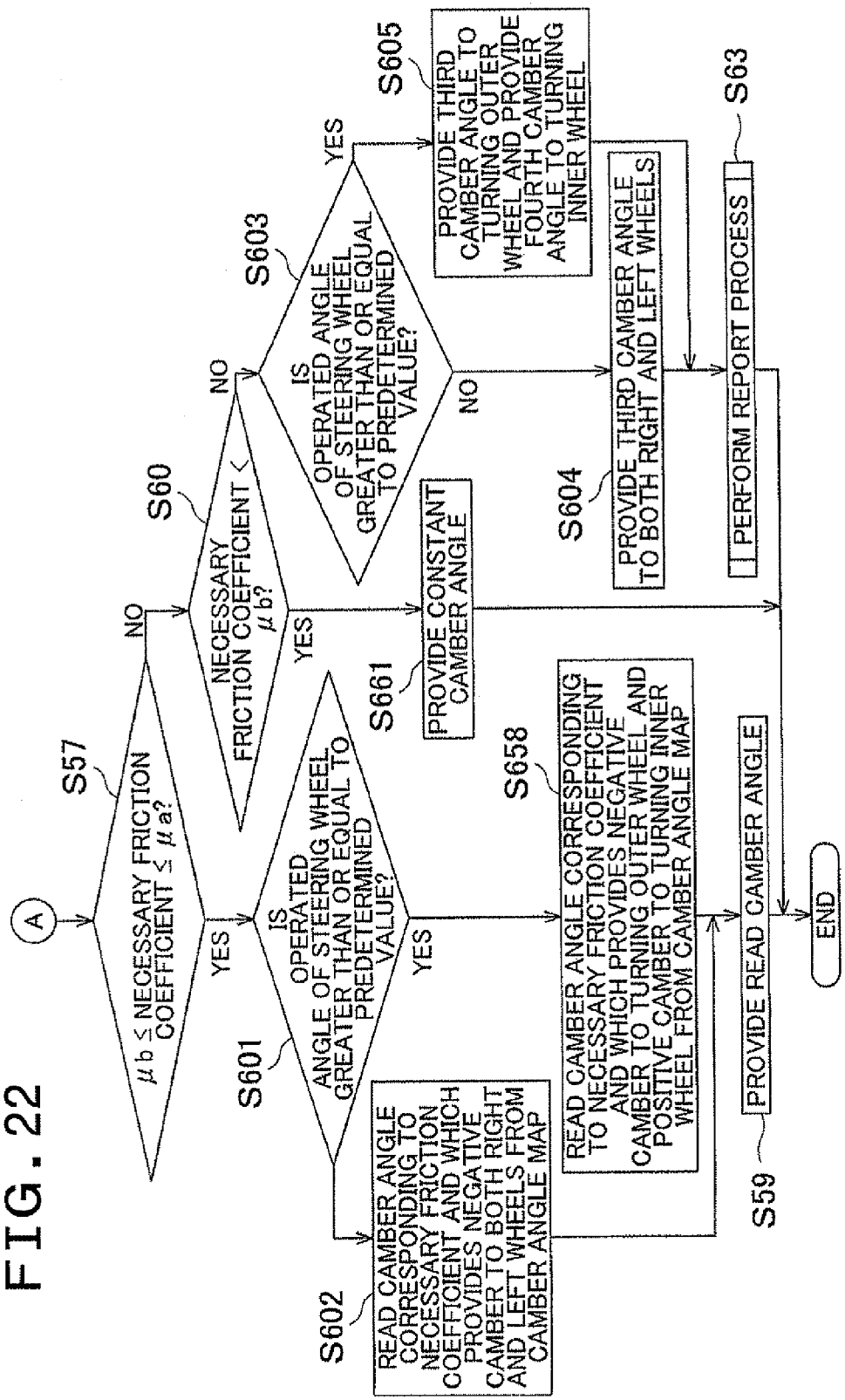
FIG. 22 is a continuation of the flowchart of FIG. 21.

FIG. 22 is a block diagram showing the electrical configuration of the vehicle control device 700 according to the seventh embodiment. As shown in FIG. 22, the vehicle control device 700 includes the CPU 71, an EEPROM 772, and the RAM 73, which are connected to the input/output port 75 via the bus line 74.

The EEPROM 772 is a nonvolatile memory for rewritably storing a control program executed by the CPU 71, fixed value data, or the like, and is configured to be capable of holding data after the power is turned off. The EEPROM 772 is provided with a past memory 772a.

The past memory 772a is a memory which stores slip history information and steering operation information in association with position information. The CPU 71 determines whether the current position of the vehicle 1 is a place where a slip frequency or a steering operation frequency is high based on the content of the past memory 772a as described later (see S87 to S90 of FIG. 23).

Note that, while the power of the vehicle control device 700 is turned on, the CPU 71 regularly detects the slip state of the wheel 2 or the steering operation state of the vehicle 1 at predetermined intervals, and writes the detection result in the past memory 772a in a state associated with the position information to sequentially update (accumulate) the content of the slip history information and the steering operation information as needed.

A navigation device 758 is a device which can display the current position of the vehicle 1, route guidance to a destination, or the like, and mainly includes a GPS receiver (not shown) which receives the position information (for example, latitude information and longitude information) from a OPS satellite, a traffic information receiver (not shown) which receives traffic information such as traffic jam information from an information center such as the VICS center, a database in which the traffic jam information is accumulated, or the like, a man-machine interface device (an operation switch, an LCD device, and a speaker device), a DVD device which reads information from a DVD storing various information such as map data, and a gyroscope which detects the angular speed of a rotation of the vehicle 1.

The CPU 71 can obtain the current position of the vehicle 1 based on the position information and the angular speed of the rotation input from the navigation device 758 and the moving speed (ground speed) input from vehicle speed sensor device 32, and can acquire the situation of a route that the vehicle 1 is to follow (for example, whether there is an intersection, a railroad crossing, a tollgate, or the like is at a predetermined distance ahead) based on the map data input from the DVD device.

An inter-vehicle distance sensor device 759 is a device which measures the distance to an object and the speed to output the results thereof to the CPU 71, and includes a transmission portion which transmits millimeter waves (electromagnetic waves of approximately 30 GHz to 300 GHz), a reception portion which receives the electromagnetic wave reflected from the object, and a measurement portion which measures a frequency difference from an original signal based on the electromagnetic wave received by the reception portion (all not shown).

The CPU 71 can acquire the distance to the object and the speed (relative speed with respect to the object) based on the frequency difference measured by the measurement portion. Note that this embodiment is provided with one millimeter wave radar 759 in the front of the vehicle 1, and is configured to measure a relative positional relation (for example, inter-vehicle distance or relative speed) with another vehicle being driven (or stopped) in front of the vehicle 1.

Next, referring to FIG. 23, a camber control process of the seventh embodiment will be described. FIG. 23 is a flowchart showing the camber control process. This process is a process executed repeatedly (for example, at intervals of 0.2 ms) by the CPU 71 while the power of the vehicle control device 700 is activated.

Regarding the camber control process, the CPU 71 first detects the current position of the vehicle 1, and acquires the situation of the route to follow (S71). Note that the current position and the situation of the route to follow are acquired by using the navigation device 758 as described above. The situation of the route to follow is a situation on the route that the vehicle 1 is to follow guided by the navigation device 758, and corresponds to a situation at a predetermined distance ahead in the proceeding direction (50 m ahead in this embodiment) with respect to the current position of the vehicle 1.

After the situation of the route to follow has been acquired in the process of S71, whether the acquired situation of the route to follow is an intersection is determined next (S72). In the case where it is determined as an intersection as a result (S72: Yes), whether the situation of the route to follow is straight, i.e., whether the route to follow guided by the navigation device 758 proceeds straight at the intersection, is determined next (S73).

In the case where it is determined as not straight as a result (S73: No), it is estimated that the route to follow guided by the navigation device 758 turns right or turns left at the intersection, and that the deceleration (brake) operation or the turning operation is performed for the vehicle 1 to turn right and turn left at the intersection. Thus, the negative camber is provided to the wheel 2 (876) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the brake performance and the turning performance of the vehicle 1 can be improved by leveraging the high grip performance of the first tread 21.

On the other hand, in the case where it is determined as straight in the process of S73 (S73: Yes), the route to follow guided by the navigation device 758 passes through the intersection. In this case, (S73: Yes), intersection driving information is read from the past memory 772a (S74), and whether a stopping frequency at the intersection to be passed through is greater than or equal to a predetermined value is determined (S75).

In the case where it is determined that the stopping frequency at the intersection to be passed through is greater than or equal to the predetermined value as a result (S75: Yes), the frequency of stopping (for example, stopping due to a traffic light or stopping to check the right and left although there is no traffic light) at the intersection is high, and it is estimated that the possibility of the vehicle 1 performing the deceleration (brake) operation at the intersection is high. Thus, the negative camber is provided to the wheel 2 (876) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the brake performance of the vehicle 1 can be improved by leveraging the high grip performance of the first tread 21.

On the other hand, in the case where it is determined that the stopping frequency at the intersection to be passed through is less than the predetermined value in the process of S75 (S75: No), the frequency of stopping (for example, stopping due to a traffic light or stopping to check the right and left although there is no traffic light) at the intersection is low, and it is estimated that the vehicle 1 passes through the intersection at the same speed. Thus, the process proceeds to S77, and whether the situation of the route to follow is a railroad crossing is determined next (S77).

In the case where it is determined that the situation of the route to follow is not an intersection in the process of S72 (S72: No), it is estimated that an operation for a right or left turn, a temporary stop, or the like at the intersection described above is unnecessary. Thus, the process proceeds to S77, and whether the situation of the route to follow is a railroad crossing is determined next (S77).

In the case where it is determined as a railroad crossing as a result (S77: Yes), it is estimated that the vehicle 1 performs the deceleration (brake) operation for a temporary stop at the railroad crossing. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the brake performance of the vehicle 1 can be improved by leveraging the high grip performance of the first tread 21.

On the other hand, in the case where it is determined that as not a railroad crossing in the process of S77 (S77: No), it is estimated that the temporary stop at the railroad crossing is not necessary. Thus, whether the situation of the route to follow is a tollgate is determined next (S78).

In the case where it is determined as a tollgate as a result (378; Yes), it is estimated that the vehicle 1 performs the deceleration (brake) operation for a temporary stop (or a decelerated driving in an ETC lane) at the tollgate. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the brake performance of the vehicle 1 can be improved by leveraging the high grip performance of the first tread 21.

On the other hand, in the case where it is determined as not a tollgate in the process of S78 (S78: No), it is estimated that a temporary stop or a deceleration at a tollgate is not necessary. Thus, whether the situation of the route to follow is a curve is determined next (S79).

In the case where it is determined as a curve as a result (S79: Yes), it is estimated that the vehicle 1 performs the deceleration (brake) operation in entering the curve and it is estimated that preventing a slip of the wheel 2 when passing through the curve is necessary. Thus, the negative camber is provided to the wheel 2 (876) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG.

5), the brake performance and the turning performance of the vehicle 1 can be improved by leveraging the high grip performance of the first tread 21.

On the other hand, in the case where it is determined as not a curve in the process of S79 (879: No), it is estimated that a preparation such as the deceleration for the curve is not necessary. Thus, whether the situation of the route to follow is a ramp is determined next (S80).

In the case where it is determined as a ramp (for example, an uphill or a downhill) as a result (S80: Yes), it is estimated that the deceleration (brake) operation is performed when the vehicle 1 enters, for example, the downhill and it is estimated that preventing a slip of the wheel 2 when climbing the uphill or a lock of the wheel 2 at the time of a brake on the downhill is necessary. Thus, the negative camber is provided to the wheel 2 (876) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the acceleration/brake performance and the turning performance of the vehicle 1 can be improved by leveraging the high grip performance of the first tread 21.

On the other hand, in the case where it is determined as not a ramp in the process of S80 (S80: No), it is estimated that a preparation such as the deceleration for the ramp is not necessary. Thus, whether the situation of the route to follow is a junction is determined next (S81).

In the case where it is determined as a junction as a result (S81: Yes), it is estimated that the vehicle 1 performs the acceleration operation/deceleration (brake) operation or the turning operation at the junction. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the acceleration/brake performance and the turning performance of the vehicle 1 can be improved by leveraging the high grip performance of the first tread 21.

On the other hand, in the case where it is determined as not a junction in the process of S81 (S81: No), it is estimated that a preparation such as the acceleration for a junction is not necessary. Thus, whether the situation of the route to follow is an unpaved road is determined next (S82).

In the case where it is determined as an unpaved road as a result (S82: Yes), it is estimated that the friction coefficient of the road surface is low and the vehicle 1 (wheel 2) may slip. Thus, the negative camber is provided to the wheel 2 (876) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the acceleration/brake performance and the turning performance of the vehicle 1 can be improved by leveraging the high grip performance of the first tread 21.

In the case where it is determined as not an unpaved road in the process of S82 (S82: No), it is estimated that the state of the road surface to run on is good and the possibility of a slip is low. Thus, whether the situation of the route to follow is a traffic jam is determined next (S83).

Note that whether the situation of the route to follow is a traffic jam is determined by using the traffic information receiver included in the navigation device 758 and based on the traffic jam information received by the traffic information receiver from the VICS center, as described above.

In the case where it is determined as a traffic jam as a result (S83: Yes), it is estimated that there is a possibility of a vehicle in front being driven at low speed due to the traffic jam and the vehicle 1 performing a sudden brake operation in order to avoid a crash with the vehicle in front and that the possibility of the vehicle 1 accelerating thereafter is high during the low-speed driving in the traffic jam, for example. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the acceleration performance and the brake performance of the vehicle 1 can be improved by leveraging the high grip performance of the first tread 21.

On the other hand, in the case where it is determined as not a traffic jam in the process of S83 (S83: No), it is estimated that a preparation such as a deceleration for a traffic jam is not necessary. Thus, whether the situation of the route to follow is a traffic regulation is determined next (S84).

Note that whether the situation of the route to follow is a traffic regulation is determined by using the traffic information receiver included in the navigation device 758 and based on the traffic information received by the traffic information receiver from the VICS center, as described above.

In the case where it is determined as a traffic regulation as a result (S84: Yes), it is estimated that there is a possibility of a vehicle in front being driven at low speed due to the traffic regulation and the vehicle 1 performing a sudden brake operation in order to avoid a crash with the vehicle in front and that the possibility of the vehicle 1 accelerating thereafter is high during the low-speed driving due to the traffic regulation, and it is estimated that there is a possibility of a slip in the case of a rain/snow information zone, for example. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the acceleration performance and the brake performance of the vehicle 1 can be improved by leveraging the high grip performance of the first tread 21.

On the other hand, in the case where it is determined as not a traffic regulation in the process of S84 (S84. No), it is estimated that a preparation such as a deceleration for a traffic regulation is not necessary. Thus, the detection result of the inter-vehicle distance sensor device 759 is checked (S85) and whether the inter-vehicle distance with the vehicle in front is less than or equal to a predetermined value is determined (S86) next.

In the case where it is determined that the inter-vehicle distance with the vehicle in front is less than or equal to the predetermined value as a result (S86: Yes), it is estimated that the inter-vehicle distance with the vehicle in front is insufficient and there is a possibility of the vehicle 1 performing a sudden brake operation in order to avoid a crash with the vehicle in front when the vehicle in front decelerates or the like. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG.

5), the brake performance of the vehicle 1 can be improved by leveraging the high grip performance of the first tread 21.

On the other hand, in the case where it is determined that the inter-vehicle distance exceeds the predetermined value in the process of S86 (S86: No), it is estimated that the inter-vehicle distance with the vehicle in front is sufficiently ensured and a preparation for a deceleration or the like is not necessary. Thus, the slip history information is read from the past memory 772a (S87) and whether the slip frequency in the route to follow is greater than or equal to the predetermined value is determined (S88) next.

In the case where it is determined that the slip frequency in the route to follow is greater than or equal to the predetermined value as a result (S88: Yes), it is estimated that the frequency of a slip in the route to follow is high (for example, a case where sand, oil, or the like is on the road surface due to an influence of a neighborhood environment or the like, although map information of the navigation device 758 indicates a paved road) and the possibility of the vehicle 1 (wheel 2) slipping is high. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the acceleration/brake performance and the turning performance of the vehicle 1 can be improved by leveraging the high grip performance of the first tread 21.

On the other hand, in the case where it is determined that the slip frequency in the route to follow is lower than the predetermined value in the process of S88 (S88: No), it is estimated that the frequency of a slip in the route to follow is low and the possibility of the vehicle 1 (wheel 2) slipping is low. Thus, steering history information is read from the past memory 772a (S89) and whether the steering frequency in the route to follow is greater than or equal to a predetermined value is determined (890) next.

In the case where it is determined that the steering frequency in the route to follow is greater than or equal to the predetermined value as a result (890: Yes), it is estimated that the frequency of the steering operation in the route to follow is high (for example, an obstacle (for example, a sinkhole on the road surface to run on) exists on the route to follow and the route to follow requires a steering operation in order to avoid the obstacle) and the possibility of the vehicle 1 (wheel 2) slipping is high. Thus, the negative camber is provided to the wheel 2 (S76) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the acceleration/brake performance and the turning performance of the vehicle 1 can be improved by leveraging the high grip performance of the first tread 21.

On the other hand, in the case where it is determined that the steering frequency in the route to follow is lower than the predetermined value in the process of S90 (S90: No), it is estimated that the frequency of the steering operation in the route to follow is low and the possibility of the vehicle 1 (wheel 2) slipping is low. Thus, the positive camber is provided to the wheel 2 (S91) to terminate the camber control process.

Accordingly, by the ground contact (ground pressure or ground contact area) Rin in the first tread 21 being decreased and the ground contact (ground pressure or ground contact area) Rout in the second tread 22 being increased (see FIG. 6), the rolling efficiency of the wheel 2 can be improved and the fuel saving performance of the vehicle 1 can be improved by leveraging the low rolling resistance of the second tread 21.

In this manner, according to this embodiment, the compatibility can be provided between the two performances of the acceleration performance/brake performance and the fuel saving performance which conflict with each other by adjusting the camber angle of the wheel 2 with the camber angle adjustment device 4 to change the ratio of the ground contact (ground pressure or ground contact area) Rin in the first tread 21 and the ground contact (ground pressure or ground contact area) Rout in the second tread 22.

Figure 23:
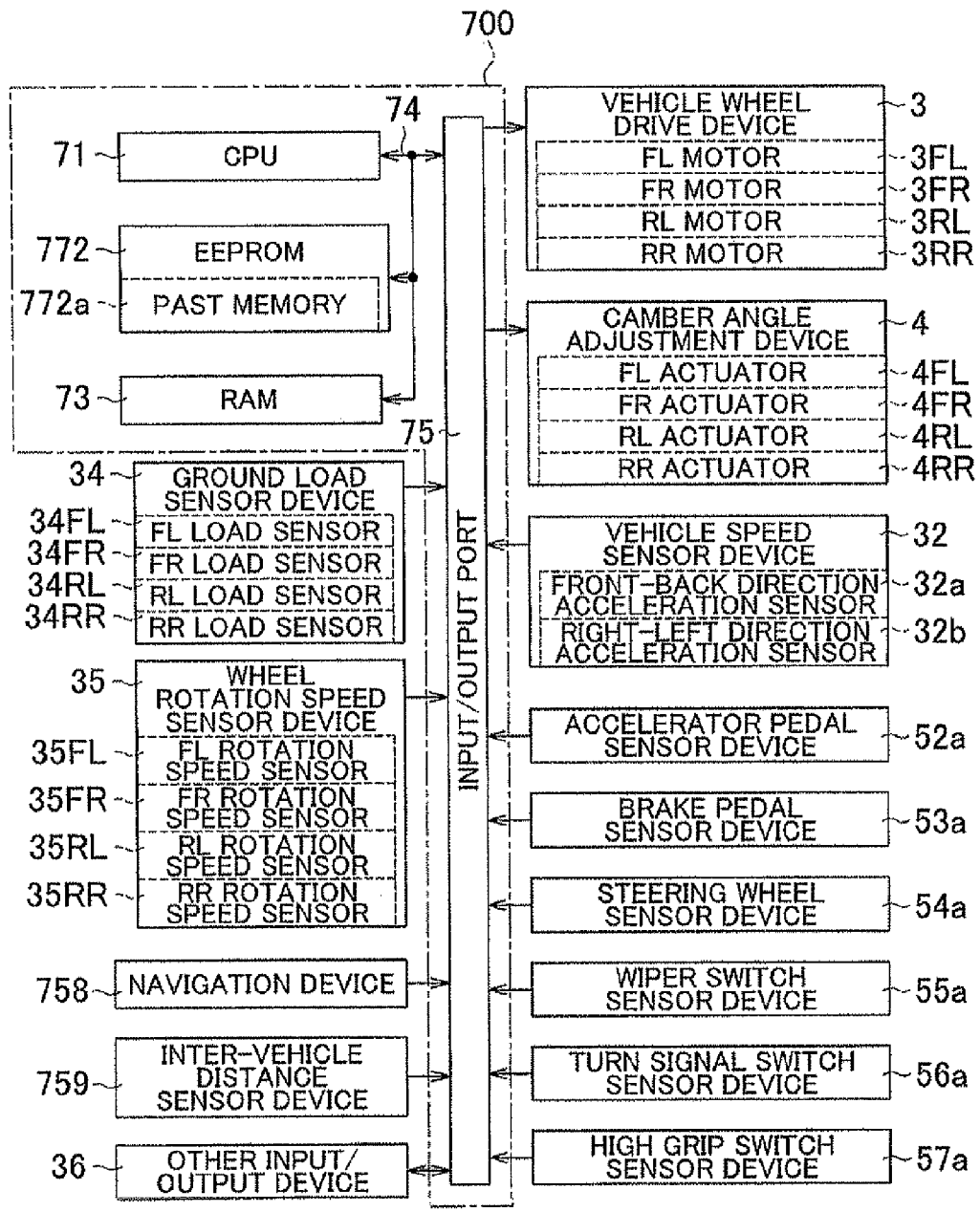
FIG. 23 is a block diagram showing the electrical configuration of a vehicle control device according to a seventh embodiment.

In the flowchart (camber control processing) shown in FIG. 23, the processes of S76 and S91 correspond to the activation control means, the processes of S71, S74, S87, and S89 correspond to the vicinity information acquisition means, the processes of S72, S73, S75, S77 to S84, S88, and S90 correspond to the characteristic determination means, and the processes of S76 and S91 correspond to the camber angle change means according to claim 1. The process of S71 corresponds to the situation acquisition means and the processes of S72, S73, S75, S77 to S84, S88, and S90 correspond to the characteristic determination means according to claim 2. The process of S85 corresponds to the relative position acquisition means and the process of S86 corresponds to the characteristic determination means according to claim 3.

Next, referring to FIGS. 24 and 25, an eighth embodiment will be described. In the first embodiment, the case where the compatibility is provided between the driving performance (acceleration performance and brake performance) and the fuel saving performance by adjusting the camber angles θR and θL of the wheels 2 has been described. However, in the eighth embodiment, compatibility is provided between an improvement in the quiet performance of suppressing the tire noise and fuel efficient driving by adjusting the camber angles θR and θL of the wheels 2.

Note that the same portions as those of the respective embodiments described above are denoted by the same reference numerals, and the descriptions thereof will be omitted. In the eighth embodiment, a case where the vehicle 1 (wheel 2) of the first embodiment is controlled by a vehicle control device 800 will be described as an example.

In this embodiment, the positive camber is normally provided to the wheel 2 such that the second tread 22 with the low rolling resistance is used, while the negative camber is provided such that the first tread 21 with the high grip characteristic is used in the case where a predetermined condition is satisfied. Accordingly, the compatibility can be provided between the fuel saving driving and the improvement of the quiet performance.

FIG. 23 is a block diagram showing the electrical configuration of the vehicle control device 800 according to the eighth embodiment. As shown in FIG. 23, the EEPROM 772 of the vehicle control device 800 is provided with the past memory 772a and a quiet requirement memory 772b.

The quiet requirement memory 772b is a memory which stores quiet requirement level information in association with the position information. The CPU 71 determines, as described later, which area the current position of the vehicle 1 is in regarding the degree of quietness required (in this embodiment, whether it is an area (first quiet requirement area) which requires quiet driving of driving with the tire noise being suppressed all day or an area (second quiet requirement area) which requires the quiet driving only during specific hours) based on the content of the quiet requirement memory 772b (see S803 and 8807 of FIG. 25).

A driving mode switch sensor device 860 is a device for detecting the operated state of a driving mode switch (not shown) and outputting the detection result thereof to the CPU 71, and mainly includes a positioning sensor (not shown) which detects the operated state (operated position) of the driving mode switch and a control circuit (not shown) which processes the detection result of the positioning sensor to be output to the CPU 71.

Note that the driving mode switch is a switch (operation member) operated by the driver, and the driving mode of the vehicle 1 is set according to the operated state (operated position) thereof. That is, when the driving mode switch is turned on, a quiet driving mode is selected as the driving mode, and the quiet driving is executed in the case where the situation of the vehicle 1 satisfies a predetermined condition (for example, in the case of driving a narrow street or in the case of passing near a facility such as a hospital). On the other hand, when the driving mode switch is turned off the quiet driving mode is deactivated, and a fuel saving driving mode is selected (see S801 of FIG. 25).

A manual transfer switch sensor device 861 is a device for detecting the operated state of a manual transfer switch (not shown) and outputting the detection result thereof to the CPU 71, and mainly includes a positioning sensor (not shown) which detects the operated state (operated position) of the manual transfer switch and a control circuit (not shown) which processes the detection result of the positioning sensor to be output to the CPU 71.

Note that the manual transfer switch is an operation member operated by the driver, and the activation control of the camber angle adjustment device 4 is performed according to the operated state (operated position) thereof. That is, by turning on the manual transfer switch, the driver can forcibly set the characteristic of the wheel 2 to a state where the quietness (that is, the tread with the low rubber hardness) is selected (see S808 of FIG. 25).

Next, referring to FIG. 25, a camber control process of the eighth embodiment will be described. FIG. 25 is a flowchart showing the camber control process. This process is a process executed repeatedly (for example, at intervals of 0.2 ms) by the CPU 71 while the power of the vehicle control device 800 is activated.

Regarding the camber control process, the CPU 71 first determines whether the driving mode of the vehicle 1 is set to the quiet driving mode (S801). Note that this determination is based on whether the driver has turned on the driving mode switch to select the quiet driving mode, i.e., the detection result of the driving mode switch by the driving mode switch sensor device 860 (see FIG. 24), as described above.

In the case where it is determined that the driving mode of the vehicle 1 is set to the quiet driving mode as a result of the process of S801 (S801: Yes), the current position of the vehicle 1 is first acquired (S802) to check whether the vehicle 1 is in a situation for executing the quiet driving, and whether the current position of the vehicle 1 is in the first quiet requirement area is determined next (S803). Note that the current position is acquired by using the navigation device 758, as described above.

In the case where it is determined that the current position of the vehicle 1 is in the first quiet requirement area as a result of the process of S803 (S803: Yes), the vehicle 1 is in the area which requires the quiet driving of driving with the tire noise being suppressed all day (for 24 hours). Thus, the negative camber is provided to the wheel 2 (S804) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the tire noise can be suppressed and the quiet performance of the vehicle 1 can be improved as a result by leveraging the high grip performance of the first tread 21 (tread with the high rubber hardness).

Figure 24:
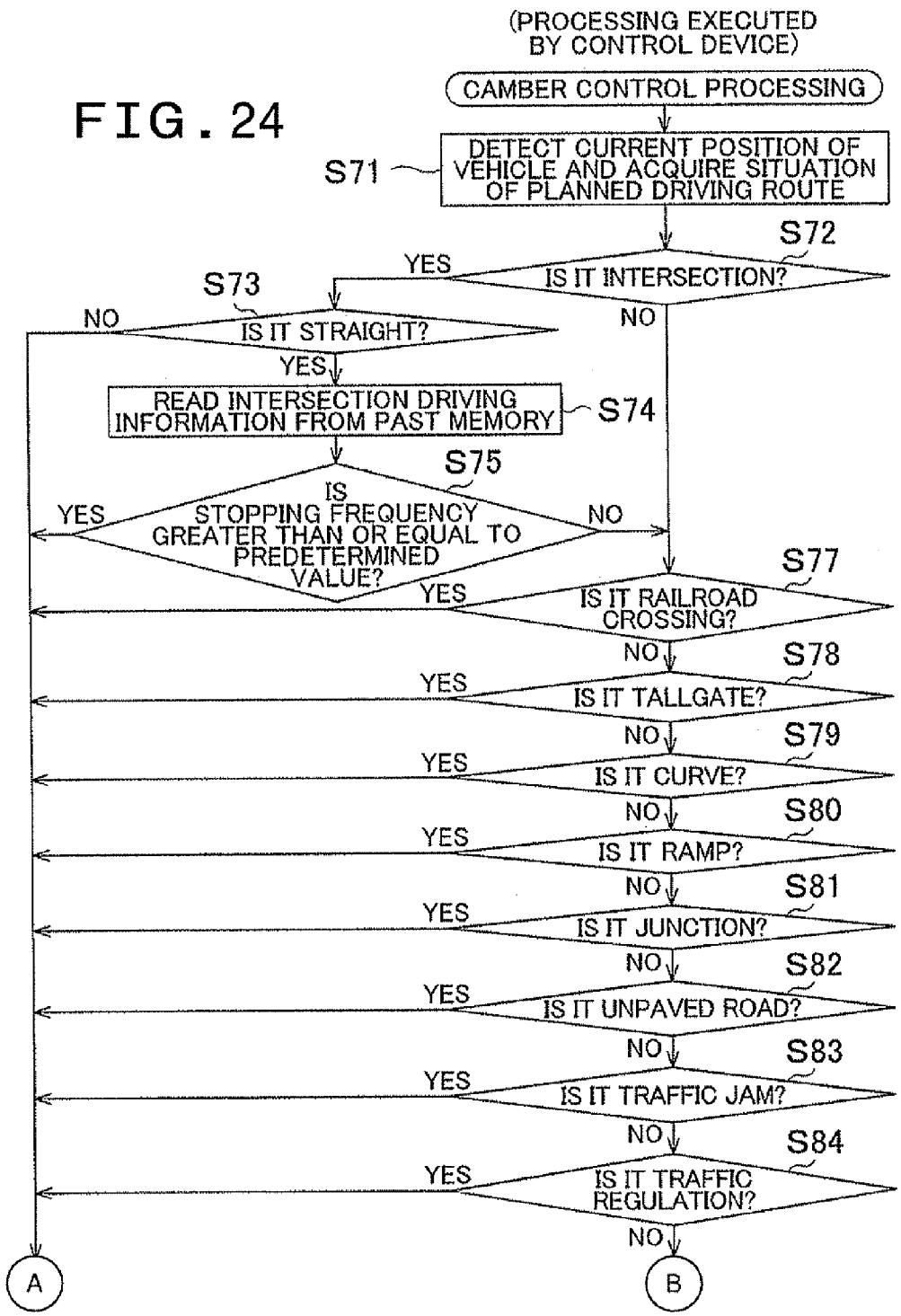
FIG. 24 is a flowchart showing a camber control process.

Note that whether the vehicle 1 is in the first quiet requirement area is determined based on the current position (position information) of the vehicle 1 acquired by the process of S802 and the quiet requirement level information stored in the quiet requirement memory 772b (see FIG. 24). Examples of the first quiet requirement area include an area within a predetermined range from a facility such as a hospital or a school.

On the other hand, in the case where it is determined that the vehicle 1 is not in the first quiet requirement area as a result of the determination in the process of S803 (S803: No), the vehicle 1 is in one of an area which requires the quiet driving only during predetermined hours or an area which does not require the quiet driving.

Thus, in this case (S803: No), the current time is first acquired (S805), whether the current time is late night (in this embodiment, hours between 10 p.m. and 6 a.m.) is determined (S806). In the case where it is determined that the current time is late night (S806: Yes), whether the current position of the vehicle 1 is in the second quiet requirement area, i.e., whether the vehicle 1 is in the area which requires the quiet driving only during predetermined hours (that is, late night), is determined next (S807).

In the case where it is determined that the vehicle 1 is in the second quiet requirement area as a result of the determination in S807 (S807: Yes), the current position of the vehicle 1 is in the area which requires the quiet driving at the current time. Thus, the negative camber is provided to the wheel 2 (8804) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the tire noise can be suppressed and the quiet performance of the vehicle 1 can be improved as a result by leveraging the high grip performance of the first tread 21 (tread with the high rubber hardness).

Note that, in the same manner as the case described above, whether the vehicle 1 is in the second quiet requirement area is determined based on the current position (position information) of the vehicle 1 acquired by the process of S802 and the quiet requirement level information stored in the quiet requirement memory 772b (see FIG. 24). Examples of the second quiet requirement area include an area within a predetermined range from a residence. For the acquisition of the current time, a timer device embedded in the CPU 71 may be used or a timer device embedded in the navigation device 758 may be used.

In the case where it is determined that the current time is not late night as a result of the determination in the process of S806 (S806: No), the quiet driving does not need to be performed since it is outside the hours even if the vehicle 1 is in the second quiet requirement area, for example. Thus, in this case (S806: No), the process of S807 is skipped, and the process proceeds to S808.

In the process of S808, whether the manual transfer switch is turned on, i.e., whether performing the quiet driving is instructed by the driver, is determined (S808). In the case where it is determined that the manual transfer switch is turned on as a result (S808), the quiet driving is instructed by the driver although the vehicle 1 is not in the area which requires the quiet driving and the quiet driving does not need to be performed. Thus, the negative camber is provided to the wheel 2 (S804) to terminate the camber control process.

Accordingly, by the ground contact (ground pressure or ground contact area) Rin in the first tread 21 being increased and the ground contact (ground pressure or ground contact area) Rout in the second tread 22 being decreased (see FIG. 5), the tire noise can be suppressed and the quiet performance of the vehicle 1 can be improved as a result by leveraging the high grip performance of the first tread 21 (tread with the high rubber hardness).

On the other hand, in the case where it is determined that the manual transfer switch is not turned on (is turned off) (S808), the vehicle 1 is not in the area which requires the quiet driving, the quiet driving does not need to be performed, and the quiet driving is not instructed by the driver. Thus, the positive camber is provided to the wheel 2 (S809) to terminate the camber control process.

Accordingly, by the ground contact (ground pressure or ground contact area) Rin in the first tread 21 being decreased and the ground contact (ground pressure or ground contact area) Rout in the second tread 22 being increased (see FIG. 6), the rolling efficiency of the wheel 2 can be improved and the fuel saving performance of the vehicle 1 can be improved by leveraging the low rolling resistance of the second tread 21.

In the case where it is determined that the driving mode of the vehicle 1 is not set to the quiet driving mode as a result of the determination in the process of S801 (S801: No), the driving mode switch is turned off and the fuel saving driving mode is instructed by the driver. Thus, the positive camber is provided to the wheel 2 (S809) to terminate the camber control process.

Accordingly, by the ground contact (ground pressure or ground contact area) Rin in the first tread 21 being decreased and the ground contact (ground pressure or ground contact area) Rout in the second tread 22 being increased (see FIG. 6), the rolling efficiency of the wheel 2 can be improved and the fuel saving performance of the vehicle 1 can be improved by leveraging the low rolling resistance of the second tread 21.

In this manner, according to this embodiment, the compatibility can be provided between the two performances of the quiet performance and the fuel saving performance which conflict with each other by adjusting the camber angle of the wheel 2 with the camber angle adjustment device 4 to change the ratio of the ground contact (ground pressure or ground contact area) Rin in the first tread 21 and the ground contact (ground pressure or ground contact area) Rout in the second tread 22.

In the flowchart (camber control processing) shown in FIG. 23, the processes of S76 and S91 correspond to the activation control means, the processes of S71, S74, S87, and S89 correspond to the vicinity information acquisition means, the processes of S72, S73, S75, S77 to S84, S88, and S90 correspond to the characteristic determination means, and the processes of S76 and S91 correspond to the camber angle change means according to claim 1. The process of S71 corresponds to the situation acquisition means and the processes of S72, S73, S75, S77 to S84, S88, and S90 correspond to the characteristic determination means according to claim 2. The process of S85 corresponds to the relative position acquisition means and the process of S86 corresponds to the characteristic determination means according to claim 3.

Figure 25:
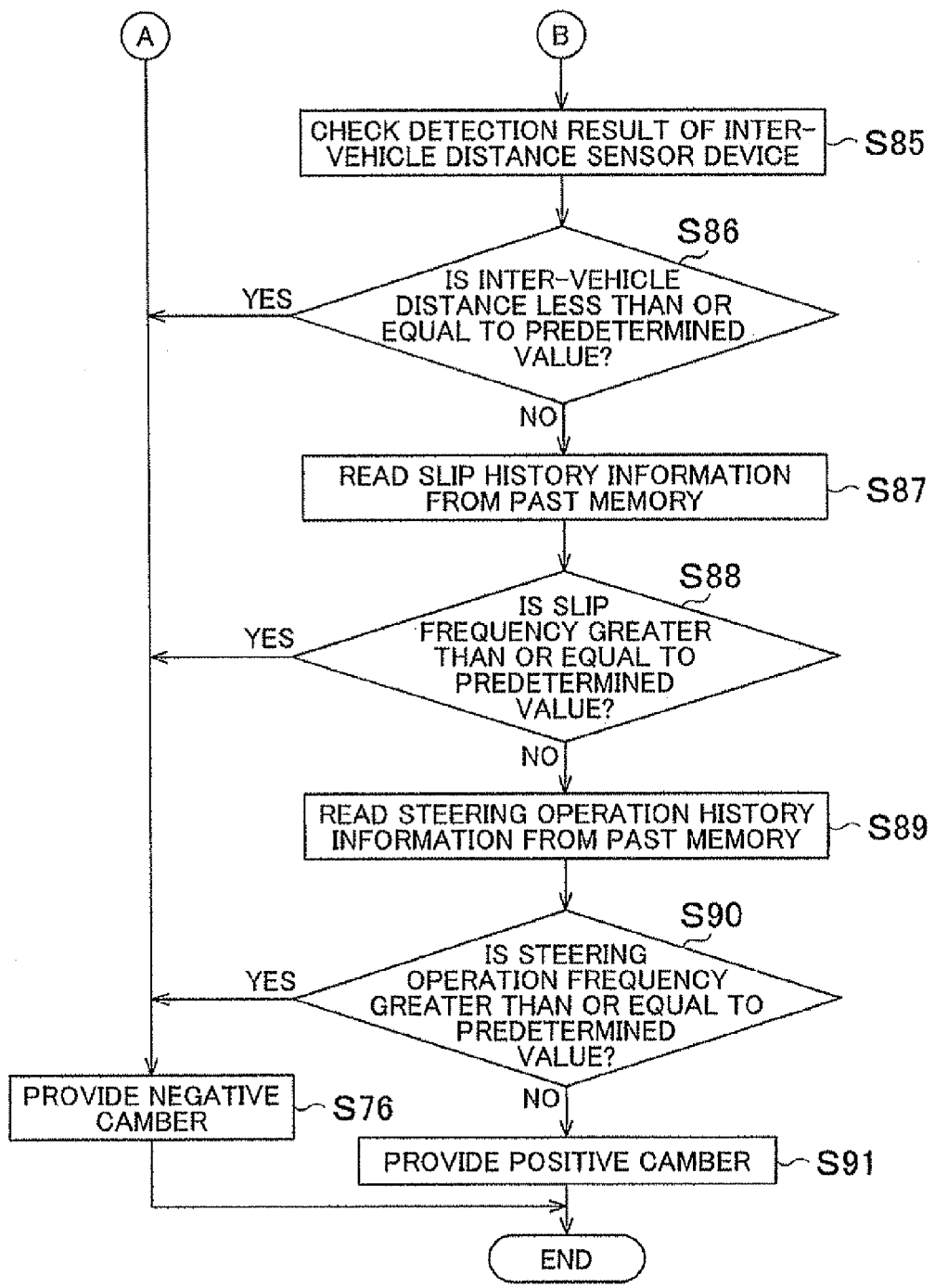
FIG. 25 is a continuation of the flowchart of FIG. 24.
Figure 26:
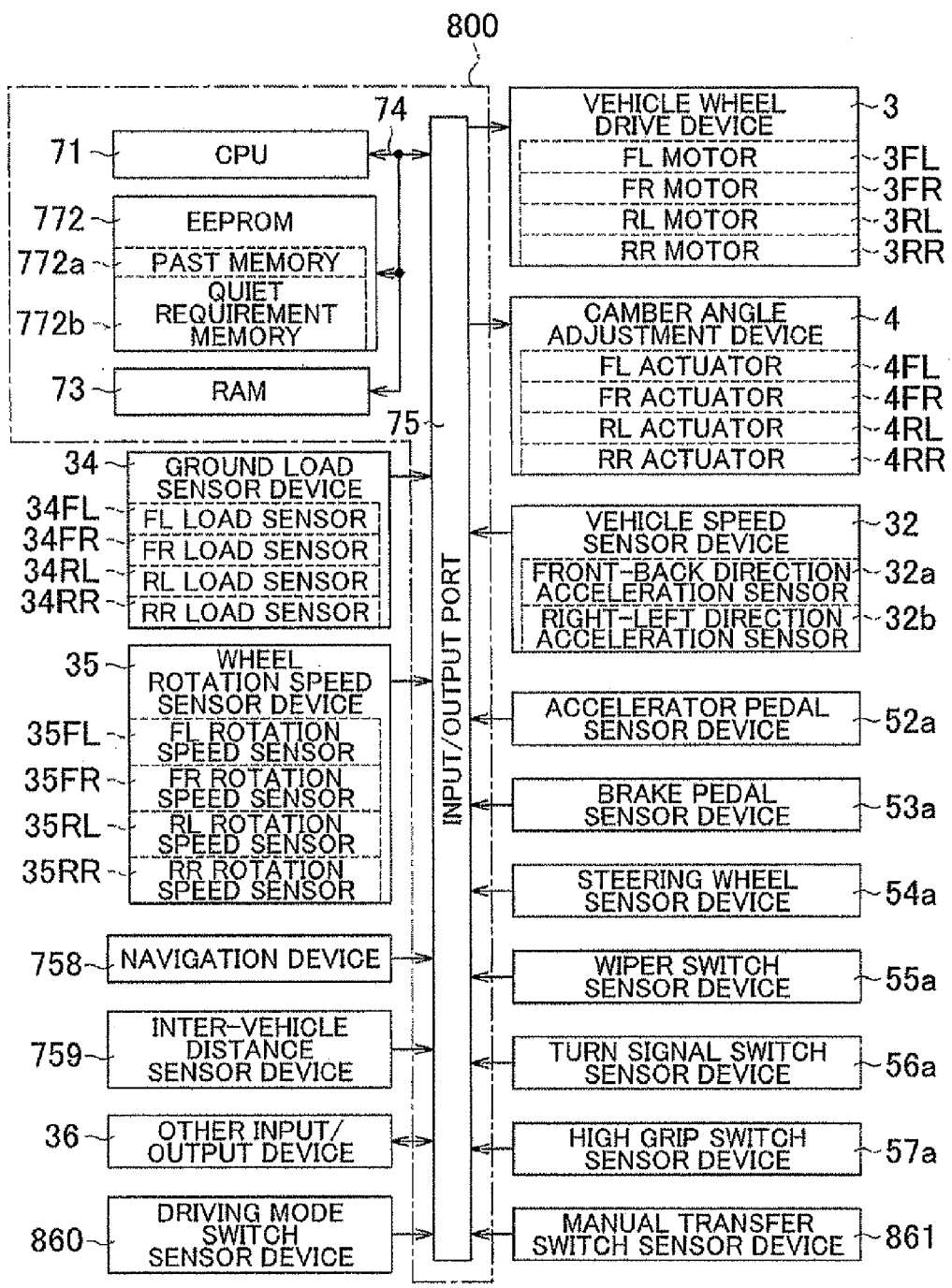
FIG. 26 is a block diagram showing the electrical configuration of a vehicle control device according to an eighth embodiment.

In the flowchart (camber control processing) shown in FIG. 25, the processes of S804 and S809 correspond to the activation control means, the process of S802 corresponds to the vicinity information acquisition means, the processes of S801, S803, and S806 to S808 correspond to the characteristic determination means, and the processes of S804 and S809 correspond to the camber angle change means according to claim 1. The process of S805 corresponds to the time acquisition means according to claim 4.

The present invention has been described above based on the embodiments. However, the present invention is not in any way limited to the embodiments described above, and it can easily be speculated that various modifications and variations are possible without departing from the gist of the present invention.

For example, values given in the embodiments described above are examples, and other values may obviously be employed. Also, a configuration is obviously possible in which a part or all of the configuration of the respective embodiments described above is combined with a part or all of the configuration of another embodiment.

In the first to third embodiments described above, the case where the negative camber is provided to the wheel 2 when the operated amount (stepped amount) of the accelerator pedal 52 or the brake pedal 53 by the driver is greater than or equal to the predetermined value has been described (see S2, S3, and S6 of FIG. 7). However, it is not necessarily limited thereto, and it may obviously be configured such that the camber angle of the wheel 2 is determined based on other state quantities. In the same manner, in the fifth and sixth embodiments, the case where a parameter (abscissa) of the friction coefficient map 572a is configured by the operated amount (stepped amount) of the accelerator pedal 52 or the brake pedal 53 has been described. However, it is not necessarily limited thereto, and the parameter may obviously be configured by other state quantities.

An example of the other state quantities is the operated speed of the accelerator pedal 52 and the brake pedal 53. For example, even if the stepped amount of the accelerator pedal 52 or the brake pedal 53 is the same, it may be configured such that the negative camber (positive camber) is provided in the case where the operated speed thereof is faster (slower) than a reference value.

Another example of the other state quantities is a gear shift operation of a transmission. For example, it may be configured such that, in the case where a gear shift operation (shift down operation) of increasing the deceleration of the transmission is performed, it is determined that a relatively large acceleration/deceleration is caused by the gear shift operation to provide the negative camber to the wheel 2. Accordingly, a slip or a lock of the wheel 2 can be suppressed to improve the acceleration performance and the brake performance of the vehicle 1.

In the first to third embodiments described above, the case where the negative camber is provided to the wheel 2 when the operated angle of the steering wheel 54 by the driver is greater than or equal to the predetermined value has been described (see S4 and S6 of FIG. 7). However, it is not necessarily limited thereto, and it may obviously be configured such that the camber angle of the wheel 2 is determined based on other state quantities.

An example of the other state quantities is the operated speed of the steering wheel 54. For example, even if the operated angle of the steering wheel 54 is the same, it may be configured such that the negative camber (positive camber) is provided in the case where the operated speed thereof is faster (slower) than a reference value.

In the first to third embodiments described above, the process of making a determination based on the operated state of each of the pedals 52 and 53 has been described as an example of acceleration/deceleration state determination means according to claim 3. However, it is not necessarily limited thereto, and it is obviously possible to make the determination based on the actual acceleration/deceleration detected by the vehicle speed sensor device 32 (the front-back direction acceleration sensor 32a and the right-left direction acceleration sensor 32b), for example. That is, it may be configured such that the negative camber is provided to the wheel 2 in the case where the acceleration/deceleration of the vehicle is greater than or equal to a predetermined value, and the positive camber is provided in the case where the predetermined value is not reached. In this case, it may be determined based on the acceleration/deceleration in two directions of the front-back direction of the vehicle and the right-left direction of the vehicle, or it may be determined based on the acceleration/deceleration in only one of the two directions.

In the first to third embodiments described above, the process of making a determination based on the operated state of the wiper switch 55 has been described as an example of road surface determination means according to claim 5. However, it is not limited thereto, and it may be configured such that the negative camber is provided to the wheel 2 in the case where the amount of precipitation is detected by the rainfall sensor and a detected value thereof is greater than or equal to a predetermined value, for example. Alternatively, it may be configured such that the state of the road surface is detected by a non-contact optical sensor or the like, and the negative camber or the positive camber is provided to the wheel based on the detection result (such as state of water film on the road surface, snow accumulation state of the road surface, frozen state of the road surface, or pavement state) thereof.

In the first to third embodiments described above, the order of determination on whether to provide the negative camber is in the order of the state of the wiper switch 55, the state of the accelerator pedal 52, the state of the brake pedal 53, the state of the vehicle speed, the state of the turn signal switch 56, the state of the high grip switch 57, and the state of the steering wheel 54 (see S1 to S4). However, the order is not limited thereto, and it may obviously be shuffled to obtain another order. Also, a part of the determination steps may obviously be omitted.

In the respective embodiments described above, the case where the camber angles θR and θL provided to the right and left wheels 2 are the same angles (θR=θL) has been described. However, it is not necessarily limited thereto, and camber angles θR and θL differing from each other (θR<θL or θL<θR) may obviously be provided to the right and left wheels 2.

In the first to third embodiments described above, the case where the first tread 21 or 221 is arranged on the inside of the vehicle and the second tread 22 is arranged on the outside of the vehicle has been described. However, the positional relation is not limited thereto, and may obviously be changed appropriately for each wheel 2.

For example, the arrangement may be such that the first tread 21 or 221 is on the outside of the vehicle and the second tread 22 is on the inside of the vehicle, and the arrangement may be such that the first tread 21 or 221 is on the outside of the vehicle in the front wheel and the second tread 22 is on the inside of the vehicle in the rear wheel. Alternatively, the positional relation may differ for each wheel 2.

In the second to fourth embodiments described above, the case where the constant camber angle is 0° has been described. However, it is not necessarily limited thereto, and the constant camber angle may obviously be set to provide the positive camber or the negative camber.

In the respective embodiments described above, the case where the wheel has two types of treads and the case where the wheel has three types of treads have been described, but these wheels may obviously be combined. For example, it may be such that the wheel 2 or 202 having two types of treads is used for the front wheel and the wheel 303 having three types of treads is used for the rear wheel, or vice versa.

In the respective embodiments described above, the case where the first tread 21 or 221 or the third tread 323 has the characteristic of a higher grip performance compared to the second tread 22 and the second tread 22 has the characteristic of a lower rolling resistance compared to the first tread 21 or 221 or the third tread 323 has been described, but the respective treads 21, 221, 22, and 323 may obviously be configured to have other characteristics. For example, two types of tread patterns (grooves) may be provided such that one tread has a characteristic of a high drainage performance and the other tread has a characteristic of small node noise.

In the fourth embodiment described above, the case where the camber angle of the wheel 2 is controlled according to whether the wheel 2 is slipping has been described (see S43 to S45 of FIG. 15). However, it is not necessarily limited thereto, and the camber angle of the wheel 2 may obviously be controlled based on other states.

An example of the other states is the friction coefficient μ of the road surface on which the wheel 2 is to run. Note that the friction coefficient μ can be estimated by the ground load sensor device 34 as described above. Alternatively, the camber angle of the wheel 2 may be controlled based on whether the wheel 2 is locked (provided with the negative camber when locked).

In the fifth and sixth embodiments described above, the case where the friction coefficient map 572a is configured such that the change in the necessary front-back friction coefficient with respect to the accelerator operated amount and the change in the necessary front-back friction coefficient with respect to the brake operated amount become the same changes has been described (see FIG. 17). However, the configuration is one example, and other configurations are also obviously possible.

For example, the maximum value of the necessary front-back friction coefficient when the accelerator operated amount is 100% and the maximum value of the necessary front-back friction coefficient when the brake operated amount is 100% may be different values. Also, although the case where the necessary front-back friction coefficient changes linearly with respect to the change in the accelerator operated amount or the like has been described, the change may obviously be a curve.

In the fifth and sixth embodiments described above, the case where the vehicle control device 500 includes only one friction coefficient map 572a has been described. However, it is not necessarily limited thereto, and a plurality of friction coefficient maps may obviously be provided.

For example, it may be configured such that a plurality of friction coefficient maps (for example, three types of the dry paved road map, the unpaved road map, and the paved-road-in-rain map corresponding to the operation range of the road surface situation switch) configured respectively of different contents corresponding to the road surface situations are prepared, and the necessary front-back friction coefficient is read from the map corresponding to the operated state of the road surface situation switch in the process of S53 of FIG. 19.

In the seventh embodiment, the configuration in which the negative camber is not provided in the case where the route to follow proceeds straight at an intersection and the stopping frequency is less than the predetermined value has been described (see S72 to S75 of FIG. 23). However, it is not necessarily limited thereto, and, for example, in the case where the route to follow is the intersection (S72: Yes), it may be configured such that the negative camber is provided to the wheel 2 (876) always (that is, without executing the processes of S73 to S75) as a preparation for a stop at the intersection.

In the seventh embodiment, the case where the situation of the route that the vehicle 1 is to follow is determined based on the route that the vehicle 1 is to follow guided by the navigation device 758 has been described. However, it is not necessarily limited thereto, and it may obviously be configured such that the situation of the route that the vehicle 1 is to follow is determined based on other information.

That is, the determination may be made based on the situation near the current position of the vehicle 1 (for example, a situation within a predetermined radius (for example, 50 m) from the vehicle 1, a situation at a predetermined distance (for example, 50 m) ahead in the route that the vehicle 1 is to follow, a situation at a predetermined distance (for example, 50 m) behind in the route that the vehicle 1 is to follow, or a combination of the respective situations) regardless of the presence or absence of the guidance by the navigation device 758.

In the respective embodiments described above, the two performances of the driving performance (acceleration force, brake force, and turning force) obtained by the high grip performance and the fuel saving performance obtained by the low rolling performance (low rolling resistance) or the two performances of the quiet performance obtained by the high grip performance (that is, the tread with the low rubber hardness) and the low rolling performance (that is, the tread with the high rubber hardness) have been described as examples of the two performances obtained by the characteristics of the first tread 21 or 221 and the second tread 22. However, it is not necessarily limited thereto, and the respective treads 21, 221, and 22 may obviously be configured to provide other two performances.

Example combinations of the two performances include: drainage performance obtained by a groove pattern suitable for removal of a water film formed on the road surface and low-noise performance obtained by a groove pattern suitable for reducing a pattern noise, grip performance on an unpaved road obtained by a block pattern which bites into the road surface of the unpaved road and grip performance on a dry paved road obtained by a tread not having a groove to ensure a ground contact area, performance of exhibiting driving force or brake force on a snow road or icy road and performance of exhibiting driving force or brake force on a paved road surface at normal temperature.

Although the description has been omitted in the eighth embodiment described above, the respective treads 21, 221, and 22 may have the same patterns or different patterns, regarding the tread pattern (design or figure configured of grooves and cuts) of the respective treads 21, 221, and 22 of the wheel 2. In this case, the rubber hardness may differ between the two in the case where the two tread patterns of the first tread 21 or 221 and the second tread 22 are the same, and the rubber hardness of the two may be the same or different in the case where the two tread patterns of the first tread 21 or 221 and the second tread 22 are different. That is, it suffices that one tread be superior in the quiet performance than the other tread and the other tread be superior in the fuel saving performance than the one tread.

Although the description has been omitted in the respective embodiments described above, the tread pattern (design or figure configured of grooves and cuts) may be provided to the respective treads 21, 221, and 22 of the wheel 2 or may be omitted. In this case, the rubber hardness may differ between the two in the case where formation of the two tread patterns of the first tread 21 or 221 and the second tread 22 are omitted (for a so-called slick tire), and the rubber hardness of the two may be different or the same in the case where the tread pattern is provided to only one of the first tread 21 or 221 and the second tread 22. That is, it suffices that one tread be superior in the quiet performance than the other tread and the other tread be superior in the fuel saving performance than the one tread.

In the eighth embodiment, the case where the fuel saving driving is performed when the driving mode is not the quiet driving mode (that is, when the driving mode switch is not turned on) has been described. However, it is not necessarily limited thereto, and it may be configured such that the camber control process of the seventh embodiment is executed in the case where the driving mode switch is turned off (that is, the quiet driving mode is not selected), for example.

That is, it may be such that the camber control process of FIG. 25 is executed in the case where a first operation of the operation member (the driving mode switch in the embodiment described above) operated by the driver is performed (turned on in the embodiment described above) and the camber control process of FIG. 23 is executed in the case where a second operation of the operation member (the driving mode switch in the embodiment described above) is performed (turned off in the embodiment described above). In this case, the process of S801 of FIG. 25 is omitted.

In the eighth embodiment described above, the case where the negative camber is provided to the wheel 2 uniformly regardless of the speed of the vehicle 1 when the predetermined condition is satisfied (S803: Yes, S807: Yes, S808: Yes) has been described. However, it is not necessarily limited thereto, and it may be configured such that the positive camber is provided to the wheel 2 when the speed of the vehicle 1 is lower than a predetermined speed (for example, 10 km per hour), for example. Since noise due to the tire noise can be suppressed at low speed, the quietness can be ensured. Thus, the compatibility can be provided between the quiet performance and the fuel saving performance.

In the eighth embodiment described above, the case where whether the negative camber is provided to the wheel 2 is determined based on whether the current time is late night when the vehicle 1 is in the second quiet requirement area has been described. However, it is not necessarily limited thereto, and the it may be configured such that the determination is made based on whether a light of the vehicle 1 is turned on, for example.

The invention claimed is:

1. A vehicle control device which activates a camber angle adjustment device which adjusts a camber angle of a wheel to control the camber angle of the wheel, comprising:
 activation control means for controlling an activation state of the camber angle adjustment device,
 wherein the wheel includes a first tread and a second tread aligned in a width direction of the wheel with respect to the first tread and arranged on an inside or an outside of the vehicle,
 wherein the first tread and the second tread are configured to have characteristics different from each other such that the first tread is configured to have a characteristic of a higher grip force compared to the second tread and the second tread is configured to have a characteristic of a smaller rolling resistance compared to the first tread,
 wherein the activation control means includes:
  vicinity information acquisition means for acquiring vicinity information on a vicinity of the vehicle;
  characteristic determination means for determining a characteristic necessary for the wheel, based on the vicinity information acquired by the vicinity information acquisition means, and camber angle change means for activating the camber angle adjustment device to change the camber angle of the wheel such that the wheel exhibits the characteristic determined by the characteristic determination means; and wherein the vicinity information acquisition means includes:

current position detection means for detecting a current position of the vehicle:

map data storage means for storing map data; and situation acquisition means for acquiring a situation of a route that the vehicle is to follow as the vicinity information based on the map data stored in the map data storage means and the current position of the vehicle detected by the current position detection means.

2. A vehicle control device which activates a camber angle adjustment device which adjusts a camber angle of a wheel to control the camber angle of the wheel, comprising:

activation control means for controlling an activation state of the camber angle adjustment device, wherein the wheel includes a first tread and a second tread aligned in a width direction of the wheel with respect to the first tread and arranged on an inside or an outside of the vehicle, wherein the first tread and the second tread are configured to have characteristics different from each other such that the first tread is configured to have a characteristic of a higher grip force compared to the second tread and the second tread is configured to have a characteristic of a smaller rolling resistance compared to the first tread, wherein the activation control means includes:

vicinity information acquisition means for acquiring vicinity information on a vicinity of the vehicle;

characteristic determination means for determining a characteristic necessary for the wheel, based on the vicinity information acquired by the vicinity information acquisition means, and camber angle change means for activating the camber angle adjustment device to change the camber angle of the wheel such that the wheel exhibits the characteristic determined by the characteristic determination means, wherein:

the vicinity information acquisition means includes relative position acquisition means for acquiring a relative position of the vehicle relative to another vehicle as the vicinity information, and the characteristic determination means determines the characteristic necessary for the wheel based on the relative position acquired as the vicinity information by the relative position acquisition means.

3. A vehicle control device which activates a camber angle adjustment device which adjusts a camber angle of a wheel to control the camber angle of the wheel, comprising:

activation control means for controlling an activation state of the camber angle adjustment device, wherein the wheel includes a first tread and a second tread aligned in a width direction of the wheel with respect to the first tread and arranged on an inside or an outside of the vehicle, wherein the first tread and the second tread are configured to have characteristics different from each other such that the first tread is configured to have a characteristic of a higher grip force compared to the second tread and the second tread is configured to have a characteristic of a smaller rolling resistance compared to the first tread, wherein the activation control means includes:

vicinity information acquisition means for acquiring vicinity information on a vicinity of the vehicle;

characteristic determination means for determining a characteristic necessary for the wheel, based on the vicinity information acquired by the vicinity information acquisition means, and camber angle change means for activating the camber angle adjustment device to change the camber angle of the wheel such that the wheel exhibits the characteristic determined by the characteristic determination means, wherein:

the activation control means includes time acquisition means for acquiring the current time, and the characteristic determination means determines the characteristic necessary for the wheel based on the current time acquired by the time acquisition means and the vicinity information acquired by the situation acquisition means.

* * * * *